(12) United States Patent
Noda et al.

(10) Patent No.: US 7,701,096 B2
(45) Date of Patent: Apr. 20, 2010

(54) TOTALLY ENCLOSED TYPE MAIN DRIVE MOTOR FOR VEHICLE

(75) Inventors: Shinichi Noda, Kanagawa (JP); Taihei Koyama, Tokyo (JP); Yoshitaka Kobayashi, Saitama (JP); Nobuyuki Yagi, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 257 days.

(21) Appl. No.: 11/664,288

(22) PCT Filed: Sep. 29, 2005

(86) PCT No.: PCT/JP2005/017947

§ 371 (c)(1),
(2), (4) Date: Mar. 30, 2007

(87) PCT Pub. No.: WO2006/038515

PCT Pub. Date: Apr. 13, 2006

(65) Prior Publication Data

US 2008/0030086 A1    Feb. 7, 2008

(30) Foreign Application Priority Data

Oct. 1, 2004 (JP) ............................. 2004-290412
Oct. 4, 2004 (JP) ............................. 2004-291622

(51) Int. Cl.
H02K 9/10 (2006.01)

(52) U.S. Cl. ....................................... 310/57

(58) Field of Classification Search ... 310/57; H02K 9/10

See application file for complete search history.

(56) References Cited

U.S. PATENT DOCUMENTS 5,789,833 A * 8/1998 Kinoshita et al. ............. 310/64

(Continued)

FOREIGN PATENT DOCUMENTS

CN    1159089 A    9/1997

(Continued)

OTHER PUBLICATIONS

Notification of Reasons for Refusal mailed by the Japanese Patent Office on Feb. 17, 2009, for Japanese Patent Application No. 2004-290412.

(Continued)

*Primary Examiner*—Quyen Leung
*Assistant Examiner*—Naishadh N Desai
(74) *Attorney, Agent, or Firm*—Finnegan, Henderson, Farabow, Garrett & Dunner, L.L.P.

(57) ABSTRACT

A totally enclosed type main drive motor for a vehicle includes a stator core arranged on an inner circumference of an outer casing frame, a bracket arranged on one end of the outer casing frame to have a bearing built-in, a housing arranged on the other end of the outer casing frame to have a bearing built-in, a rotor shaft having its both ends supported by the respective bearings, a rotor core arranged on the rotor shaft, a fan arranged on one end of the rotor shaft, openings formed in both axial ends of a peripheral wall of the outer casing frame, connective air ducts arranged outside the peripheral wall so as to communicate with the openings and a cooler for connecting these connective air ducts with each other and also releasing heat of air flowing in the connective air ducts to outside air. The outer casing frame is attached to the vehicle so that a central axis of the outer casing frame extends horizontally and intersects with a traveling direction of the vehicle at right angles. With rotation of the fan, air inside the outer casing frame flows in the cooler in circulation to cool down the air. The totally enclosed type main drive motor is provided with guide plates that collect traveling wind flowing around the outer casing frame to the cooler.

9 Claims, 36 Drawing Sheets

U.S. PATENT DOCUMENTS

| | | | |
|---|---|---|---|
| 2001/0017498 A1* | 8/2001 | Matsuoka et al. | 310/90 |
| 2004/0150270 A1 | 8/2004 | Nagayama et al. | |
| 2006/0028075 A1* | 2/2006 | Noda et al. | 310/64 |
| 2007/0273220 A1* | 11/2007 | Koyama et al. | 310/58 |
| 2008/0030086 A1* | 2/2008 | Noda et al. | 310/57 |

FOREIGN PATENT DOCUMENTS

| | | | |
|---|---|---|---|
| CN | 1503433 A | | 6/2004 |
| DE | 196 48 455 A1 | | 11/1996 |
| JP | 61-092954 | | 5/1986 |
| JP | 61-92954 | | 5/1986 |
| JP | 61092954 A | * | 5/1986 |
| JP | 09-205758 | | 8/1997 |
| JP | 11-356011 | | 12/1999 |
| JP | 2004-194498 | | 7/2004 |
| JP | 2006-109570 | | 4/2006 |

OTHER PUBLICATIONS

First Office Action issued by the Chinese Patent Office on Mar. 20, 2009, for Chinese Patent Application No. 2005800391095, and English-language translation of text portion thereof.

International Search Report issued by the Japanese Patent Office for International Application No. PCT/JP2005/017947.

* cited by examiner

θ3, θ4 : MOUNTING ANGLES OF BOTH EDGES OF GUIDE PLATE (DEGREES)

TOTALLY ENCLOSED TYPE MAIN DRIVE MOTOR FOR VEHICLE

TECHNICAL FIELD

The present invention relates to a totally enclosed type drive motor (main motor for driving a vehicle) for driving a railway and particularly, the invention relates to a totally enclosed type drive motor having a totally enclosed structure that does not take outside air into the motor.

BACKGROUND OF ART

As the main drive motor for vehicle mounted on a bogie frame (bogie) under a floor of a railway vehicle, an open type main motor (in an open type self-ventilation cooling system) has been adopted conventionally. In the open type main motor, its rotor shaft is provided with a fan rotatable with the rotor shaft. With the rotation of the fan, outside air is sucked into the main motor. Then, the outside air circulates in the main motor and cools down a rotor and a stator.

In this open type self-ventilation cooling system, a ventilation strainer is arranged at an intake part (intake port) of the system in order to prevent an interior of the motor from being damaged by dust mixed in so-sucked cooling air (inflowing outside air). This ventilation strainer traps the dust in the inflowing outside air by means of a filter in the strainer.

In order to prevent an excessive rising of temperature of the motor, which is caused by an increase in the inflowing outside air due to the filter's clogging, it is necessary to clean up the filter at relatively-short intervals.

However, with a difficulty that the filter can trap dust perfectly, the dust entering into the motor adheres to its inside for gradual deposition to cause motor's insulating performance and cooling effect to deteriorate. Therefore, it is necessary to disassemble the motor periodically and clean up it to remove the inside dust.

On the contrary, in order to meet the request of labor-saving in maintenance and the request for low-noise operation, there is developed a totally enclosed type main drive motor including an interior fan. This totally enclosed type main drive motor for vehicle is adapted so as to prevent the dust in addition to the outside air from entering the interior since it is shut off from the outside. Thus, the same main drive motor is adapted so as to prevent inside windings from being damaged by the dust, thereby suppressing an increase in the frequency of maintenance and inspection due to this damage.

Additionally, since this totally enclosed structure can prevent a dispersion of noise generated due to the interior fan's rotating, it is also possible to provide an eco-friendly motor.

Meanwhile, a main drive motor for vehicle is required to have a large capacity with the speeding-up for a train. However, due to a situation where the mounting position belongs to a limited narrow space in a bogie frame mentioned later and also the above speeding-up for a train, both miniaturization and weight saving are required for the main drive motor for vehicle.

In order to deal with these conflicting requests, it is contemplated to improve the heating resistance of insulating resin for windings. From the viewpoint of preventing deterioration of the insulating resin and maintaining the insulating characteristic for long-period operation, nevertheless, it is necessary to improve the cooling performance of a main motor for driving a vehicle.

For instance, Japanese Patent Laid-Open Publication No. 9-205758 discloses a type of totally enclosed type main drive motor intended to improve this cooling performance. FIG. 1 is an axial sectional view of an upper part of this totally enclosed type main drive motor for a vehicle. FIG. 3 is a sectional view taken along a line III-III of FIG. 1. FIG. 4 is a plan view of a condition that the totally enclosed type main drive motor for vehicle is mounted on a vehicle bogie. FIG. 5 is a sectional view taken along a line V-V of FIG. 4.

In FIG. 2 to FIG. 4, a vehicle body 101 shown with a chain double-dashed line is mounted on a bogie frame 102 H-shaped in plan view. The totally enclosed type main drive motor for vehicle is built in between an attachment seat 104 on an inner frame 102 of the bogie frame 102 and an axle 105.

The motor includes an outer casing frame 1 in the form of a bottomed cylinder made from mild steel plates and is attached to the vehicle so that a central axis of the outer casing frame 1 is horizontal and perpendicular to the traveling direction of the vehicle. On an upper part of the peripheral wall of the outer casing frame 1, an upper attachment seat 2 is formed so as to project to rearward in the vehicle traveling direction. On the lower part of the peripheral wall of the outer casing frame 1, a lower attachment seat 3 is formed so as to project to rearward in the vehicle traveling direction. On the upper part of the peripheral wall of the outer casing frame 1, additionally, a pair of hooks 4A, 4B are formed so as to project to forward in the vehicle traveling direction.

As shown in FIGS. 2 and 4, the upper attachment seat 2 is mounted on the top end of the attachment seat 104 through a key 106 and further fixed to the attachment seat by bolts 5. The lower attachment seat 3 is fixed to a lower beam 107 of the bogie frame 102 by bolts 5 while making contact with the front surface of the lower beam. Again, the upper attachment seat 2 and the lower attachment seat 3 are respectively formed with hook holes 6 for suspension.

In the totally enclosed type main drive motor for vehicle, as shown in FIG. 4, a small spur gear 9 is connected to a leading end of a rotor shaft 7 through a flexible joint 8. A large spur gear 10 fixed to an axle 105 meshes with this small spur gear 9. Note that the small spur gear 9 and the large spur gear 10 are accommodated in a gear box 11.

As shown in FIG. 1, an annular bracket 13 is mounted on an opening surface of the outer casing frame 1. On the circumferential part of the bracket 13, a fitting part 14 is formed so as to project to the inside of the outer casing frame 1. This fitting part 14 is inserted into the inside of the outer casing frame 1 and fixed to the outer casing frame 1 by a plurality of bolts (not shown).

A roller bearing 15 is inserted into a bearing hole formed at a center part of the bracket 13 and fixed to it. The roller bearing 15 has its outer ring fixed to an external side of the center part of the bracket 13 by a plurality of bolts 16 (see FIG. 3). Throughout both inside of the motor and the outside, the rotor shaft 7 is inserted into an inner ring of the roller bearing 15 and fixed to it.

From the inside of the outer casing frame 1, a housing 17 is inserted into a through-hole formed at the center of an end wall on the opposite side of the opening end of the outer casing frame 1 and fixed to the outer casing frame 1 by a plurality of bolts (not shown) from the inside of the frame.

A ball bearing 18 is inserted into a bearing hole formed at the center of the housing 17. The ball bearing 18 has its outer ring fixed to the housing by a bearing presser 19. This bearing presser 19 has a fitting part inserted into the bearing hole from the outside of the housing 17 and is fixed to the housing 17 from the outside, by bolts (not shown).

The rotor shaft 7 is fitted into the roller bearing 15 and the ball bearing 18 under pressure, in advance. A rotor core 20 is fitted to a substantially-intermediate part of the rotor shaft 7 in the longitudinal direction under pressure. On one end of the rotor core 20, a core presser 21 annularly formed by a thick plate is fitted to the rotor shaft 7 under pressure. On the other end of the rotor core 20, a core presser 22 is fitted to the rotor shaft 7 under pressure. Between the core presser 21 and the bracket 13, a fan 23 is fitted to the rotor shaft 23 under pressure.

As shown in FIG. 1, the rotor core 20 has a plurality of ventilation holes 24 formed around a central axis of the rotor core 20 so as to extend in the axial direction. Rotor bars 25 are inserted into an outer circumferential part of the rotor core 20 and fixed to it. End rings 26 are brazed to respective both ends of the rotor bar 25.

While, a stator core 27 is press-fitted to an inner circumference of the outer casing frame 1, at its intermediate part. Arranged on the inner circumferential side of the stator core 27 is a stator coil 28 that is inserted into slots (not shown) and includes both ends projecting from the stator core 27. With this structure, this main motor constitutes a squirrel-cage induction motor.

The outer casing frame 1 has oblong ventilation openings 29A, 29B formed at both axial ends of an upper part of the peripheral wall of the outer casing frame 1. These ventilation openings 29A, 29B are positioned on the side of the axle 105, in the upper part of the outer casing frame 1. Connective parts 30A, 30B in the form of crowned tubes with opened bottoms are welded to an outer surface of the peripheral wall of the outer casing frame 1 and also communicated with the ventilation openings 29A, 29B, respectively.

A plurality of ventilation tubes (pipes) 31 made from steel plates are welded to opposing inside surfaces of the connective parts 30A, 30B in a state that respective ends of the tubes 31 penetrate the parts 30A, 30B. These ventilation tubes 31 are made from thin mild steel plates and penetrate a plurality of cooling fins 32 standing on the outer casing frame 1 at even intervals. The cooling fins 32 are respectively welded to the ventilation tubes 31 and have respective lower ends welded to the upper surface of the outer casing frame 1. A cooler 33 is formed by the connective parts 30, the ventilation tubes 31 and the cooling fins 32.

In the so-constructed totally enclosed type main drive motor for vehicle, at a train's traveling, the fan 23 is also rotated with the rotation of the rotor shaft 7, so that "in-motor" air blown out of the fan 23 enters into the connective part 30A through the ventilation opening 29A illustrated on the left side of FIG. 1, subsequently flows through the ventilation tubes 31 and finally enters into the other connective part 30B on the right side.

Then, this air enters from the connective part 30B on the right side into the interior of the outer casing frame 1 via the ventilation opening 29B and is sucked into the fan 23 through the intermediary of a gap defined between the inner circumference of the stator core 27 and the outer circumference of the rotor core 20.

Additionally, the air entering into the right interior of the outer casing frame 1 partially flows toward the fan 23 through the ventilation holes 24 formed in the rotor core 20 and is sucked into the fan 23 similarly. Thereafter, the air flows in the above way.

In the so-constructed totally enclosed type main drive motor for vehicle, as the stator core 27, the stator coil 28, the rotor core 20 and the rotor bars 25 are cooled down by the air flowing in the motor, the stator coil 28 and the rotor bars 25 both insulated from the stator core 27 by resin, such as epoxy, are capable of maintaining their insulation characteristics of insulating resin to the stator core 27 and the rotor core 20 for the long term. Additionally, since the motor does not take in cooling air from the outside, it is possible to prevent both adhesion and deposition of dust and also possible to prevent an increase in the frequency of maintenance and inspection.

Meanwhile, when incorporating the so-constructed totally enclosed type main drive motor into a bogie, it is performed to gradually lower the motor from the upside of the bogie before mounting the vehicle body thereon. Then, the upper attachment seat 2 on the left side of FIG. 5 is mounted on the top end of the attachment seat 104 of the bogie frame 102 through the key 106 and successively, the upper attachment seat 2 and the lower attachment seat 3 are fixed to the attachment seat 104 and the lower beam 107 by the bolts 5, respectively.

Further, in case of checking on the totally enclosed type main drive motor for vehicle periodically, the bolts 5 are unfastened after detaching the bogie frame 102 from the vehicle body 101 and successively, the motor is lifted up through the use of the hook holes 6.

Note that this totally enclosed type main drive motor for vehicle in the assembled condition shown in FIG. 5 is positioned between the left attachment seat 104 and a right case for the axle 105. Additionally, as shown in FIG. 4, the motor is accommodated between bilateral wheels 108A, 108B in the axial direction, together with the flexible joint 8 and the gear box 11. As shown in FIG. 5, the motor is opposed, on the upper side, to the lower end surface of the vehicle body 101 and also opposed, on the lower side, to a rail 109 at an interval of a height limit H between a set-up leg 29 of the outer casing frame 1 and the top surface of the rail 109. Thus, the motor is assembled in a limited space with no room.

Regarding the so-constructed totally enclosed type main drive motor for vehicle, for not only the above-mentioned miniaturization and large capacity but price-reduction of the vehicle and labor-saving in maintenance/inspection, it is also required to reduce the number of motors composing a train. For that purpose, the motor is required to have a larger capacity.

To this end, there may be contemplated a method of supply the interior of the outer casing frame 1 with large volume of cooling air via a duct by an air blower in a different position. However, this method causes the price of a vehicle to be increased due to the arrangement of the duct. Additionally, as the frequency of maintenance/inspection is increased due to the exchange of a filter in a ventilation strainer and the noise radiated to the outside is also increased, the method cannot agree to the request of the times.

To this end, it may be also contemplated to increase an area of each cooling fin 30 shown in FIG. 3. However, as previously mentioned with reference to FIGS. 4 and 5, this totally enclosed type main drive motor for vehicle is accommodated between the attachment seat 104 and the right case for the axle 105 and arranged in the limited narrow space due to the above arrangement where the motor is opposed, on the upper side, to the lower end surface of the vehicle body 101 and also opposed, on the lower side, to the rail 109 through the height limit H. Accordingly, it is impossible to adopt this countermeasure, similarly.

FIG. 6 is a graph showing velocities of the traveling winds passing through the main motor under a vehicle floor with a vehicle's traveling. In the figure, a line A designates a velocity of wind flowing through the upper part of the main motor, a line B a velocity of wind flowing on the lateral surface of the central part of the traction moor and a line C designates a velocity of wind flowing through the lower part of the main motor. From this graph, it will be understood that the wind velocities of the lower part and the central part of the main motor are larger than the wind velocity of the lateral surface of the central part.

The requests of enhanced power-output and prolonged insulation-life against the totally enclosed type main drive motor driven under such a condition, which could be brought by improving its cooling efficiency, are increasingly apt to grow larger from now on, in the light of coping with the speeding up of vehicles and also laborsaving the maintenance/inspection for vehicles. Additionally, it should be noted that the conventional motor involves the following problems.

First, since the cooler has ventilation passages 14a formed by a number of gathered pipes and compartmentalized by a number of radiator fins 32, dust and paper/rag in the outside air are easy to adhere to the cooler, so that the cooling performance deteriorates since such impurities clog gaps among the pipes with the passage of usage period. Therefore, it is necessary to remove dust and rag from the cooler by blowing air (compressed air) against the cooler periodically. Nevertheless, due to the complexity of the pipes 31 intersecting with the radiator fins 32, it is difficult to eliminate the dust etc. adhering to deep portions of the cooler.

Secondly, since the ventilation route from the ventilation opening 29A to the pipes 31 has a ventilation area sharply narrowed by wall parts among the pipes 31, the ventilation resistance of loss at respective inlets for the pipes increases. FIG. 2 is representative of the flowing of winds in the totally enclosed type main drive motor for vehicle of FIG. 1 by means of arrows. From the figure, it is found that backtracking vortexes are produced at the inlets of the pipes 31.

Therefore, the circulation movement in the cooler and the motor as a whole deteriorates to cause a reduction in the cooling efficiency of the whole motor.

In a totally enclosed type main drive motor having the conventional piping structure, it is unavoidable that the motor is large-sized because of its inferior cooling efficiency, in comparison with an opened self-ventilation cooler type main drive motor.

Thirdly, due to the structure where the circumferences of the pipes 31 are joined to the radiator fins 32 by welding, an operator has to perform just as many welding operations for the pipes and the radiation fins as there are, causing an inferior commercial production and a rise in manufacturing cost.

Therefore, an object of the present invention is to provide a totally enclosed type main drive motor for vehicle, which can improve the cooling effect and reduce both size and weight of the motor and that allows a laborsaving of maintenance, a reduction in manufacturing cost and a prolongation of the motor's operational life.

DISCLOSURE OF THE INVENTION

In order to attain the above object, the present invention provides a totally enclosed type main drive motor for a vehicle, which comprises: a stator core arranged on an inner circumference of a cylindrical outer casing frame; a bracket having a built-in bearing arranged on one end of the outer casing frame; a housing having a built-in bearing arranged on the other end of the outer casing frame; a rotor shaft having its both ends supported by the bearing of the bracket and the bearing of the housing; a rotor core arranged in a substantially central part of the rotor shaft in a longitudinal direction thereof; a fan arranged on one end of the rotor shaft; openings formed in both axial ends of a peripheral wall of the outer casing frame, respectively; a pair of connective air ducts arranged outside the peripheral wall so as to communicate with the openings; and a cooler containing a ventilation pipe connecting the connective air ducts with each other and also releasing heat of air flowing in the ventilation pipe to outside air, wherein the outer casing frame is attached to the vehicle so that a central axis of the outer casing frame extend horizontally and intersects with a vehicle's traveling direction at right angles, whereby a rotation of the fan allows air in the outer casing frame to flow into the cooler in circulation thereby cooling the air. In the totally enclosed type main drive motor, the present invention is characterized in the provision of traveling-wind guiding means for collecting traveling wind flowing around the outer casing frame to the cooler.

Also, the present invention provides a totally enclosed type main drive motor for a vehicle, which comprises: a rotor core having a plurality of rotor ventilation holes formed on an inner circumferential side of the rotor core; an inside-air circulating fan arranged on an end of a rotor shaft, the end being positioned in the motor; openings arranged on both end sides of a stator frame; and a cooler arranged outside the stator frame, wherein a space inside the cooler is communicated with the openings on both sides of the stator frame, thereby allowing in-motor air to circulate in the cooler in order to cool it. In the totally enclosed type main drive motor, the present invention is characterized in that connective air ducts are arranged outside the openings on both end sides of the stator frame, respectively; a tube-shaped cooling air duct having a wall surface is arranged between the connective air ducts; the connective air ducts have respective inside spaces whose respective one ends are communicated with an in-motor space through the openings of the stator frame and whose respective other ends are communicated with an inside space of the cooling air duct; and that a plurality of radiator fins are arranged on an outer circumferential surface of the cooling air duct.

According to the above constitution, when the motor is operated, the cooling air duct absorbs heat and release the heat to the atmosphere through a number of radiator fins. Then, since cooling ambient air during a vehicle's traveling flows along the outer circumferential surface of the cooling air duct, dust and rag mixed into the outside air do not adhere to the cooling air duct and the radiator fins for stagnancy, so that the adhesion of dust can be avoided in spite of a longstanding operation. Additionally, a cleaning operation, such as blowing using compressed air, allows the dust to be removed easily and certainly.

BEST MODE FOR CARRYING OUT THE INVENTION

One embodiment of the present invention will be described with reference to drawings, below.

Figure 7:
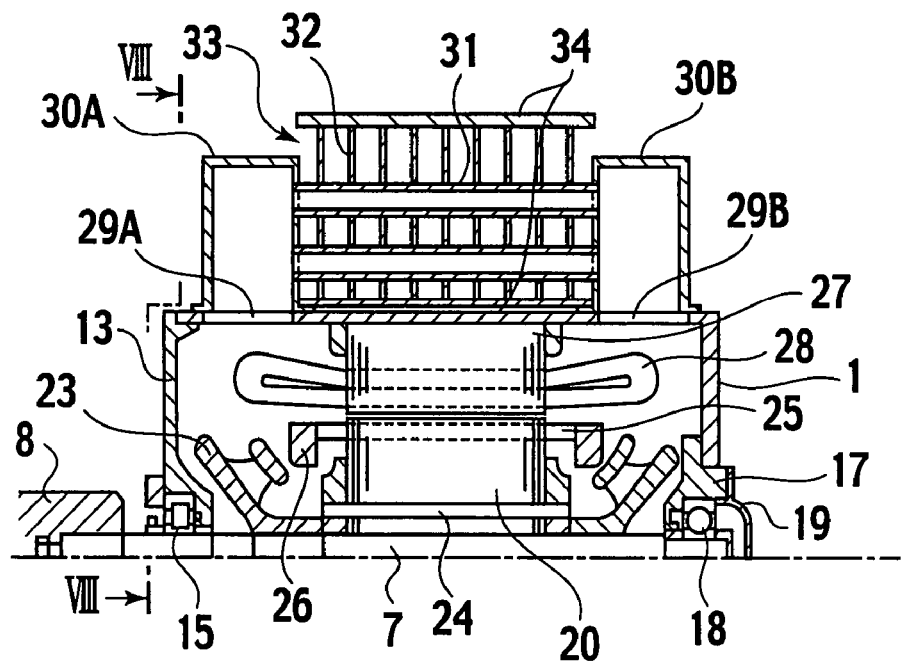
FIG. 7 is an axial sectional view of an upper part of a first embodiment of the present invention.

As shown in FIG. 7, a cylindrical stator core 27 is fitted on an inner circumferential surface of a cylindrical outer casing frame 1. This stator core 27 is provided, on its inner circumferential side and over the whole circumference, with a number of axial grooves into which stator coils 28 are inserted. A bracket 13 having a built-in roller bearing 15 is attached to one end of the outer casing 1, while a housing 17 having a built-in ball bearing 18 is attached to the other end of the outer casing 1. Both ends of a rotor shaft 7 are supported by the roller baring 15 and the ball bearing 18.

A rotor core 20 is fixed on a center part of the rotor shaft 7 in the longitudinal direction. The rotor core 20 is provided, on its outer circumferential part and over the whole circumference, with a plurality of axial grooves into which rotor bars 25 are accommodated. Again, the rotor shaft 7 has a fan 23 attached to one end of the shaft to circulate air in the outer casing frame 2.

The rotor core 20 is provided, on its inner circumferential side and over the whole circumference, with a plurality of axial ventilation holes 24. In a peripheral wall of the outer casing frame 2, openings 29A, 29B are formed on both axial ends of the peripheral wall. Outside the outer casing frame 2, a pair of connective air ducts 30A, 30B are attached to the periphery wall so as to cover the openings 29A, 29B respectively.

A cooler 33 is arranged between the connective air ducts 30, 30. The cooler 33 includes a plurality of ventilation tubes 31 connecting the air ducts 30A, 30B with each other and a plurality of fins 32 standing on the peripheral wall of the outer casing frame 1 at intervals. Each ventilation tube 31 is connected to the respective fins 32 while penetrating the fins 32.

Figure 8:
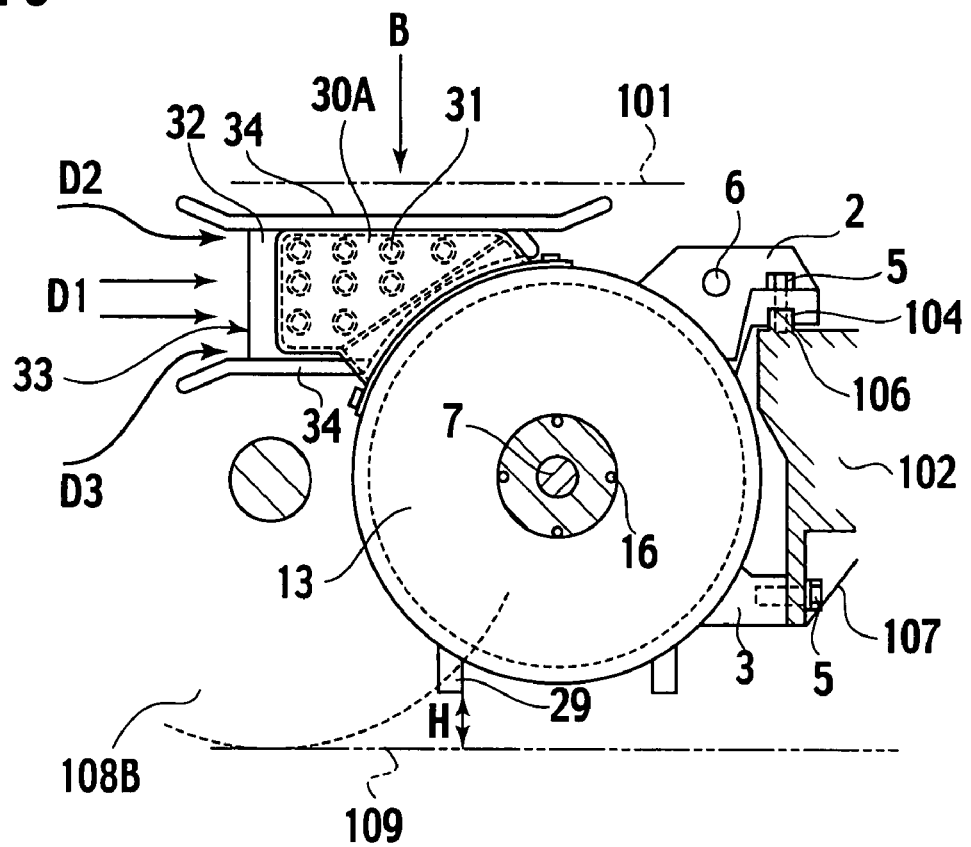
FIG. 8 is a sectional view taken along a line VIII-VIII of FIG. 7.

Further, on an upper-and-rear side of the peripheral wall of the outer casing frame 1, as shown in FIG. 8, an upper attachment seat 2 is formed so as to project toward the rear side in a traveling direction of vehicle. On the lower-and-rear side of the peripheral wall of the outer casing frame 1, an upper attachment seat 2 is formed so as to project toward the rear side in the traveling direction of vehicle. The upper attachment seat 2 is mounted on a top end of an attachment seat 104 of a bogie frame 102 through a key 106 and fixed to the attachment seat 104 by a bolt 5. The lower attachment seat 3 is fixed to a lower beam 107 of the bogie frame 102 by a bolt 5 while abutting on a front surface of the lower beam 107.

According to the present invention, a pair of guide plates 34 are provided to gather traveling wind flowing around the outer casing frame 1 to the cooler 33. These guide plates 34 are fixed on upper and lower end surfaces of the respective fins 32 horizontally and arranged to oppose each other while interposing the fins 32 therebetween in a vertical direction.

The upper guide plate 34 has its front end projecting from the cooler 33 forwardly in the vehicle traveling direction and the rear end projecting from the cooler 33 backwardly in the vehicle traveling direction. These ends are bent oblique-upwardly by a predetermined angle. While, the lower guide plate 34 has its front end projecting forwardly in the vehicle traveling direction and is bent oblique-downwardly by a predetermined angle. With this constitution, as not only traveling wind D1 in bid to flow through the cooler 33 horizontally but traveling wind D2 in bid to pass through the upside of the cooler 33 and traveling wind D3 in bid to pass through the underside of the cooler 33 flow through the cooler 33, the cooling efficiency of the cooler 33 is improved.

Provided that the guide plates 34 are made from material superior in thermal conductivity, such as aluminum, the cooling efficiency of the cooler 33 is further improved since heat is transferred from the respective fins 32 to the guide plates 34. Note that the cross sections of the guide plates 34 shown in FIG. 8 may be curved in arcs in view of reducing the ventilation resistances of cooling airs indicated with arrows D2, D3.

Next, we describe the results of a temperature rise test for confirming an effect of the present invention. This test was performed with respect to each rated speed of respective operating revolutions while using a sinusoidal power as the power source and additionally streaming with dummy traveling wind (2 m/s) around the main drive motor in order to simulate the effect during a train's traveling.

Figure 9:
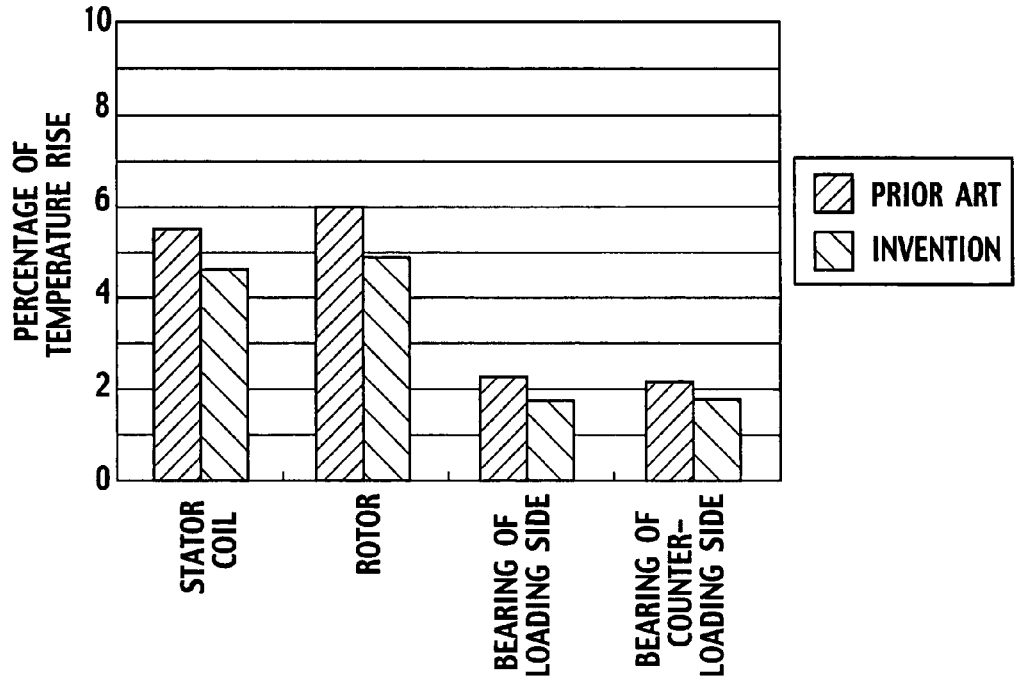
FIG. 9 is a graph showing the results of a temperature rise test for confirming an effect of the first embodiment.

FIG. 9 shows the results of the test. In the figure, measuring scales in a vertical axis denote respective percentages of temperature rise, while a horizontal axis designates points of measurement. From the results, it will be found that the main motor of the present invention works on the reduction in temperatures as a whole, particularly, great reduction in temperatures of the rotor and the stator coil.

According to the present invention, as part of traveling winds produced by vehicle's traveling, which part would not pass through the cooler 33 in the prior art, is introduced into the cooler 33 to cool down the fins 32, it is possible to provide a totally enclosed type main drive motor for vehicle, which is capable of improving its cooling effect and extending the life span. Additionally, with the improved cooling performance, it is possible to reduce both size and weight of the motor and increase its output.

Figure 10:
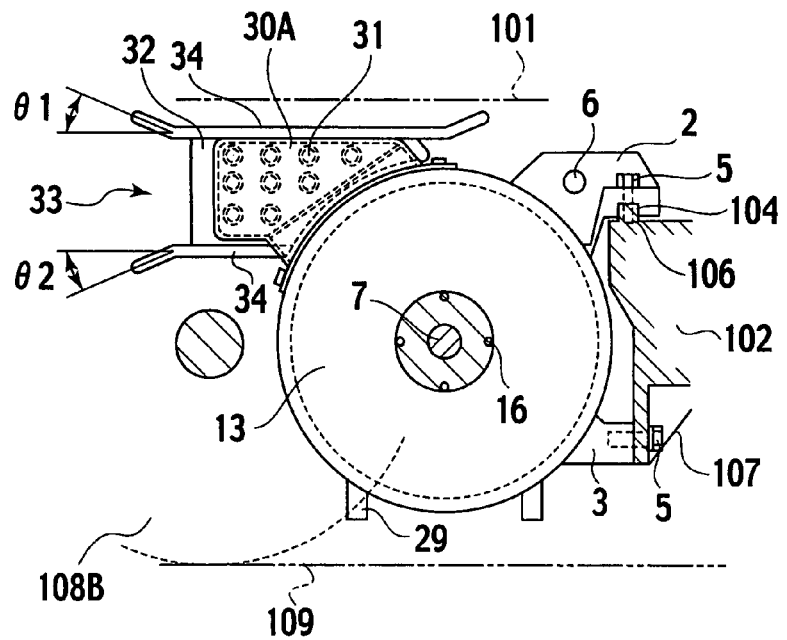
FIG. 10 is a side view of a second embodiment of the present invention.

Next, we explain the second embodiment of the present invention. FIG. 10 is a side view of the second embodiment of the present invention.

Figure 11:
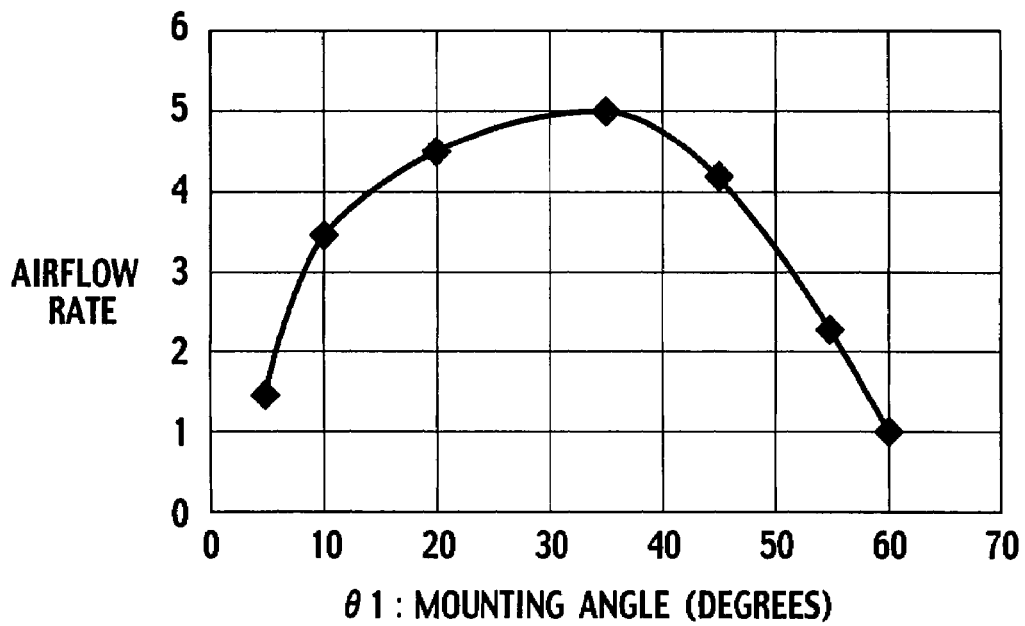
FIG. 11 is a graph showing a relationship between an angle of an end of an upper guide plate and an airflow passing through a cooler.

In this embodiment, a bending angle $\theta 1$ of an end of the upper guide plate 34 to the vehicle's traveling direction, the end projecting ahead of the cooler 33 in the vehicle's traveling direction, is set within a range from 10° to 45°. Then, as understood by a characteristic graph of FIG. 11, the quantity of wind changing its flowing way from the upside of the cooler 33 to the fins 32 collectively gets larger.

Figure 12:
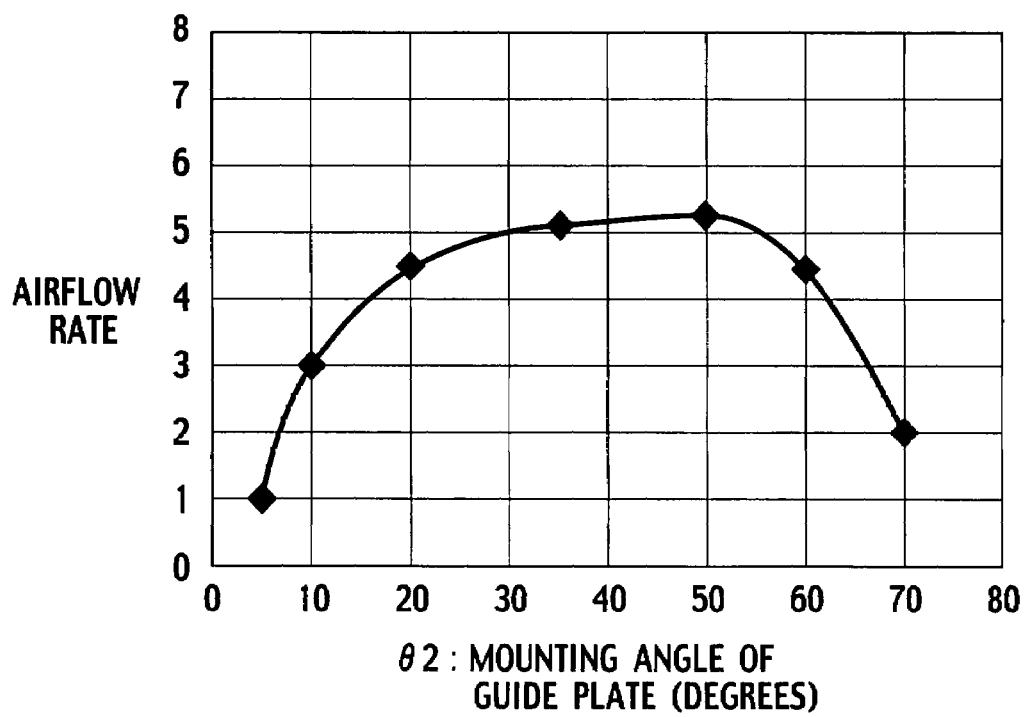
FIG. 12 is a graph showing a relationship between an angle of an end of a lower guide plate and an airflow passing through the cooler.

While, a bending angle $\theta 2$ of an end of the lower guide plate 34 to the vehicle's traveling direction, the end projecting ahead of the cooler 33 in the vehicle's traveling direction, is set within a range from 10° to 60°. Then, as understood by a characteristic graph of FIG. 12, the quantity of wind changing its flowing way from the underside of the cooler 33 to the fins 32 collectively gets larger.

Figure 13:
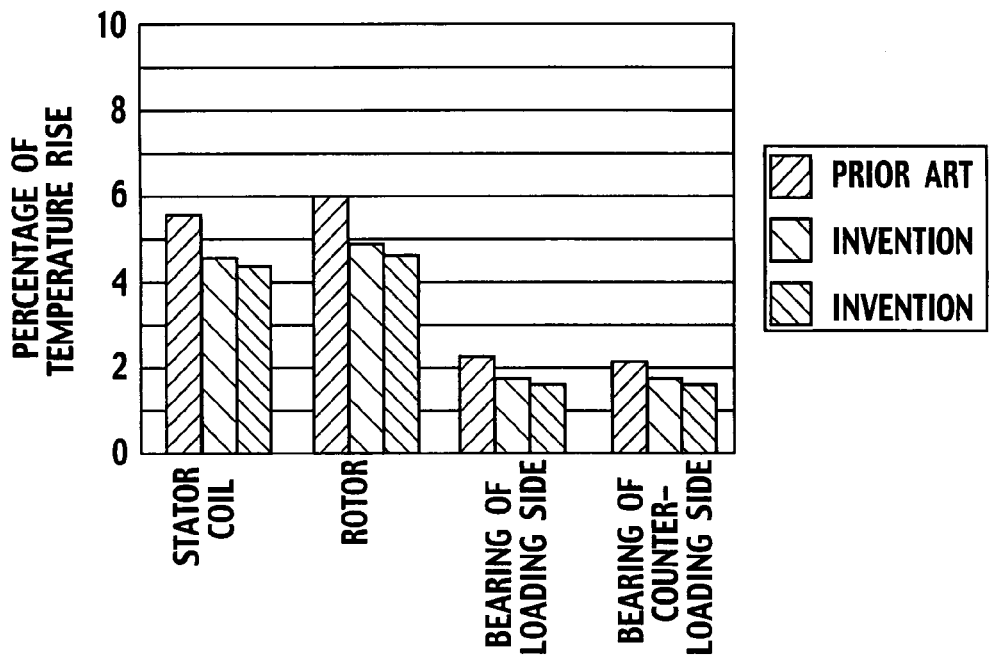
FIG. 13 is a graph showing the results of a temperature rise test for confirming an effect of the second embodiment.

FIG. 13 is a graph showing the results of a temperature rise test. In respective points of measurement, a left column denotes the prior art motor, an intermediate column the present invention where the angle $\theta 2$ is out of the range from 10° to 60°, and a right column denotes the present invention where the angle $\theta 2$ is within the range from 10° to 60°. Comparing with the conventional example, it will be found that the temperatures of the present invention are reduced as a whole and particularly, the temperature reductions about the stator coil and the rotor are large. Further, the temperature reduction in case that the angle $\theta 2$ is within the range from 10° to 60° is larger than that of case that the same angle is not included in the same range.

Figure 14:
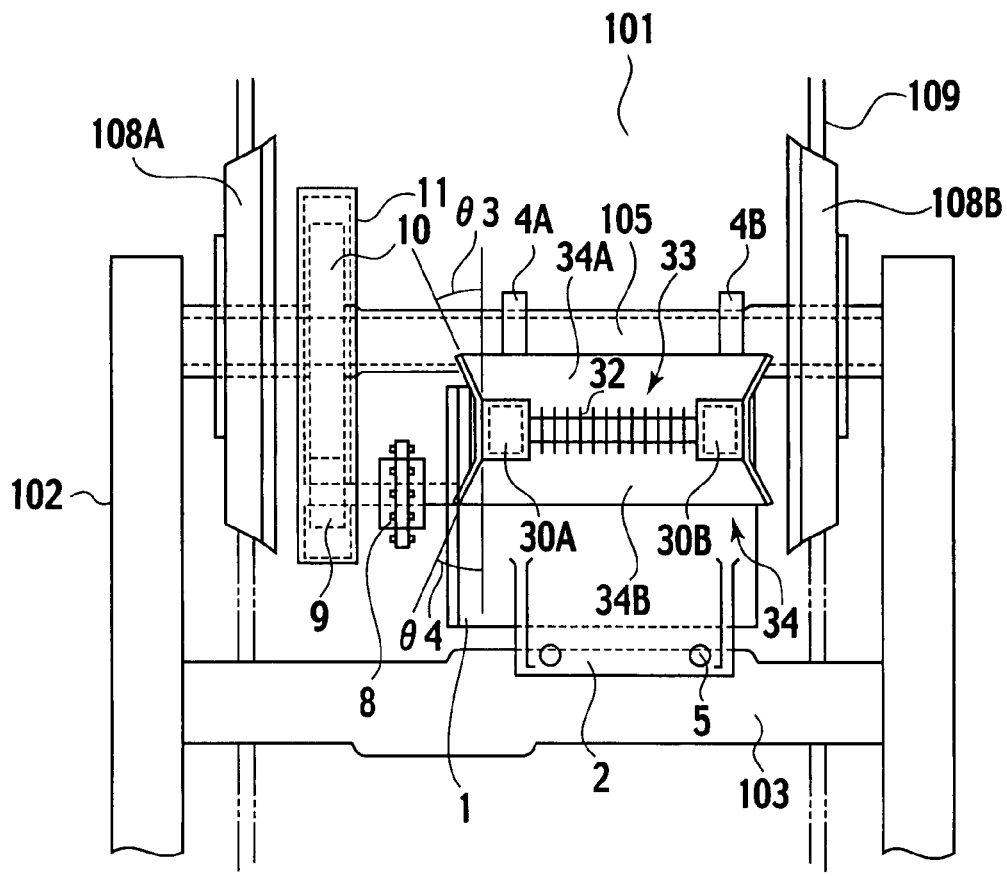
FIG. 14 is a plan view of a condition where a totally enclosed type main drive motor for vehicle of a third embodiment is mounted on a bogie of a vehicle.

Next, the third embodiment of the present invention will be described. FIG. 14 is a plan view showing a condition that a totally enclosed type main drive motor for vehicle of the third embodiment is mounted on a bogie of a vehicle.

In this embodiment, the guide plates 34 are respectively arranged on both front and rear sides of the cooler 33. The guide plate 34A on the front side is trapezoid-shaped in plan view to have a wide enlarged toward the front side in succession and both side edges slanted to the vehicle traveling direction by an angle $\theta 3$. While, the guide plate 34B on the rear side is trapezoid-shaped in plan view to have a wide enlarged toward the rear side in succession and both side edges slanted to the vehicle traveling direction by an angle $\theta 4$. Note that the angles $\theta 3$, $\theta 4$ are set within the range from 10° to 60°.

In the totally enclosed type main drive motor equipped with the guide plates 34 constructed above, the traveling wind, which might flow on both sides of the cooler 33 conventionally, gathers toward the fins 32 of the cooler 33 and flows therethrough against the rear side.

Note that the guide plates 34 may be formed so that their both side edges curve in arc in view of reducing the ventilation resistance of traveling wind.

Provided that the guide plates 34 are made from material superior in thermal conductivity, such as aluminum, it is possible to improve the cooling efficiency further since heat is transferred from the respective fins 32 to the guide plates 34 also serving as cooling fins.

Thus, according to this embodiment, since the ventilation efficiency is improved with the increasing of airflow passing through the cooler 33, the airflow characteristics is improved to allow heat of circulating air inside the main motor to be discharged to the outside air more effectively. Accordingly, the cooling performance can be improved furthermore.

Figure 15:
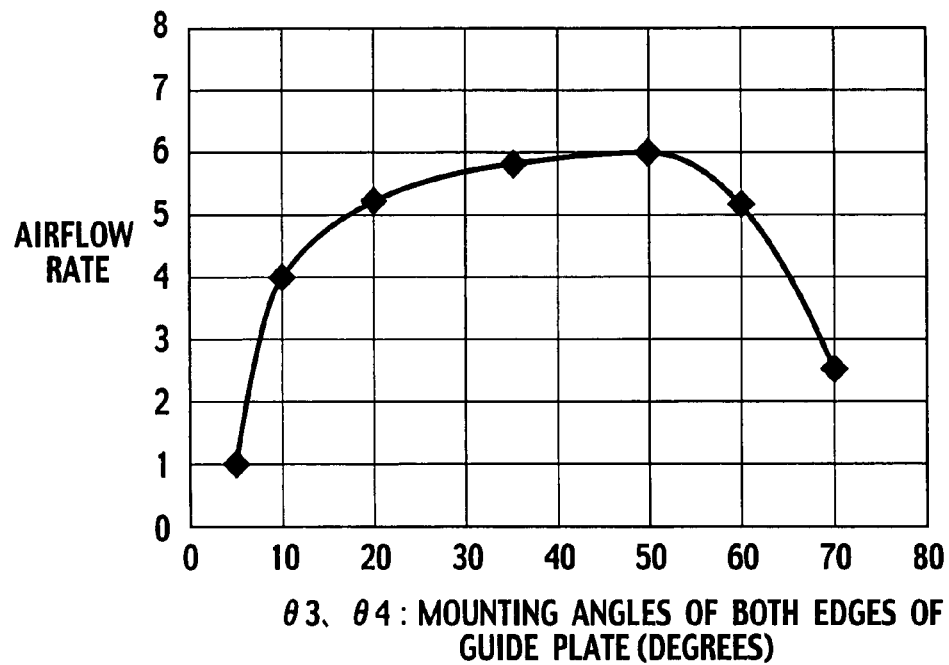
FIG. 15 is a graph showing a relationship between angles of both edges of a guide plate and airflows passing through a cooler.

FIG. 15 is a graph showing the relationship between the angles $\theta 3$, $\theta 4$ of both side edges of the guide plates 34 and a percentage of airflow collecting against the fins 32 upon defying its conventional passage via both sides of the cooler 33. From the graph, it will be understood that when the angles $\theta 3$, $\theta 4$ are set within the range from 10° to 60°, the percentage of airflow gathering toward the fins 32 upon defying its conventional passage via both sides of the cooler 33 gets larger.

Figure 16:
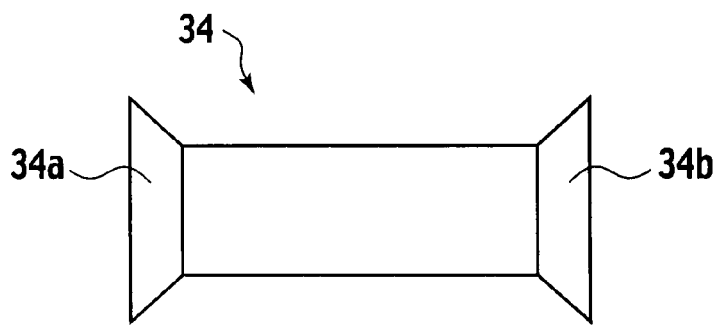
FIG. 16 is a plan view of a totally enclosed type main drive motor for vehicle in accordance with a fourth embodiment.

Next, we describe the fourth embodiment of the present invention. FIG. 16 is a plan view (viewed from a direction B of FIG. 8) of a guide plate of a totally enclosed type main drive motor for vehicle of the fourth embodiment.

In this embodiment, the guide plate 34 has an end 34*a* projecting ahead of the cooler 33 and another end 34*b* projecting rearward of the cooler 33, both of which are trapezoid-shaped so that each wide enlarges toward the front side or the rear side successively.

With the above formation, it becomes possible to introduce lots of wind, which has passed through the upside of the guide plate 4 conventionally, into the cooler 33, improving the cooling efficiency furthermore.

Figure 17:
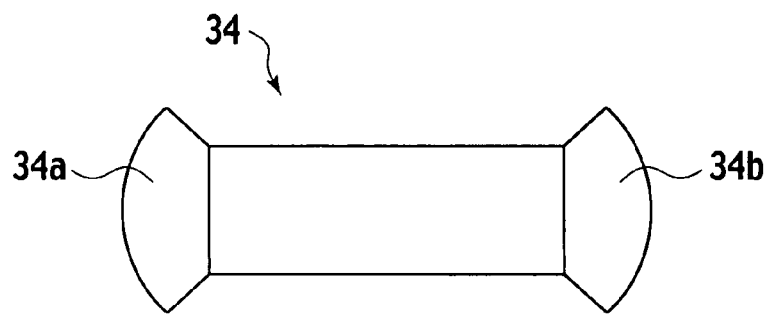
FIG. 17 is a plan view of a totally enclosed type main drive motor for vehicle in accordance with a fifth embodiment.

Next, we describe the fifth embodiment of the present invention. FIG. 17 is a plan view (viewed from a direction B of FIG. 7) of a guide plate of a totally enclosed type main drive motor for vehicle in accordance with the fifth embodiment of the present invention.

In this embodiment, the guide plate 34 has an end 34*a* projecting ahead of the cooler 33 and another end 34*b* projecting rearward of the cooler 33, both of which are fan-shaped so that each wide enlarges toward the front side or the rear side successively.

With the above formation, it becomes possible to introduce lots of wind, which has passed through the upside of the guide plate 4 conventionally, into the cooler 33, improving the cooling efficiency furthermore.

Figure 18:
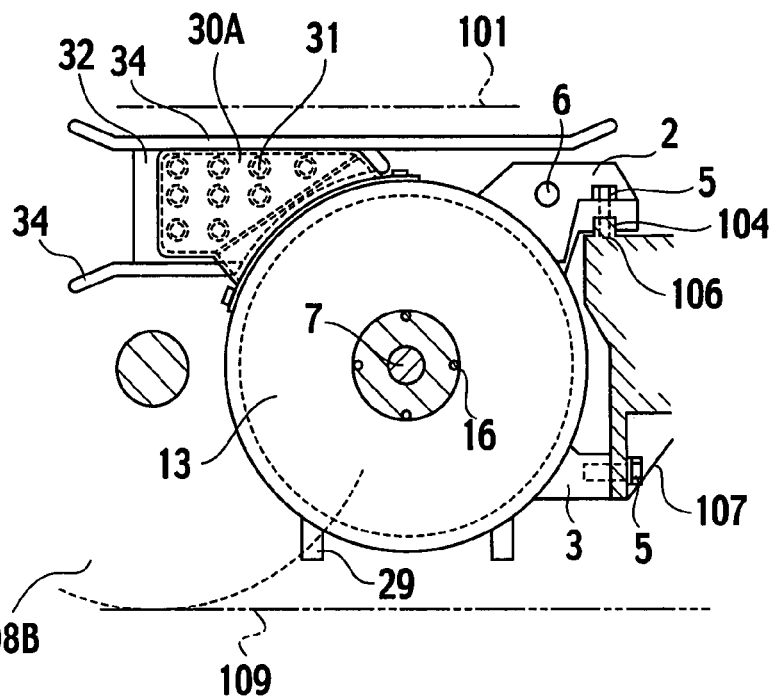
FIG. 18 is a partial longitudinal sectional view of a totally enclosed type main drive motor for vehicle in accordance with a sixth embodiment.

Next, we describe the sixth embodiment of the present invention. FIG. 18 is a partial longitudinal sectional view of a guide plate of a totally enclosed type main drive motor for vehicle in accordance with the sixth embodiment of the present invention.

In this embodiment, the upper guide plate 34 is formed so as to extend up to the upper attachment seat 2. With this formation, the traveling wind is introduced into even an area containing the upside of the upper attachment seat 2, so that the quantity of wind flowing through the upper surface of the outer casing frame 1 does increase. Thus, it becomes possible to radiate heat of air circulating in the outer casing frame 1 to the outside air more effectively, improving the cooling efficiency furthermore.

Figure 19:
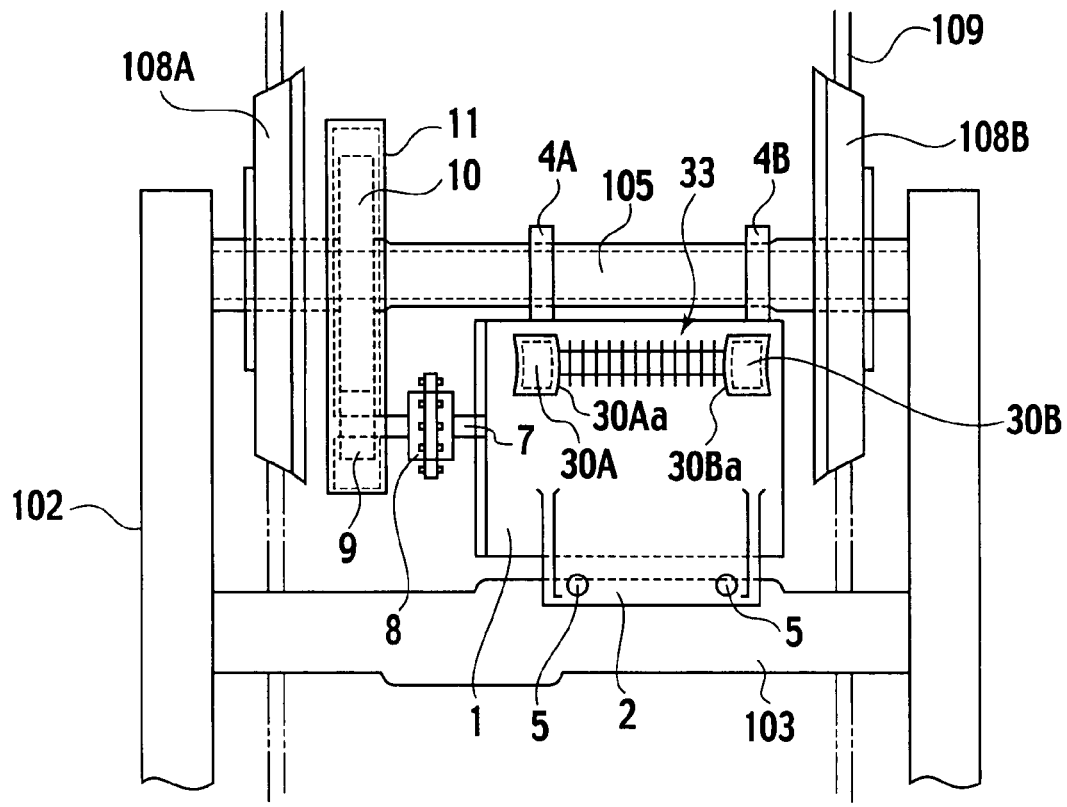
FIG. 19 is a plan view of a totally enclosed type main drive motor for vehicle in accordance with a seventh embodiment.

Next, we describe the seventh embodiment of the present invention. FIG. 19 is a plan view of a guide plate of a totally enclosed type main drive motor for vehicle of the seventh embodiment of the present invention.

In this embodiment, the connective air ducts 30A, 30B of the cooler 33 have opposing inside surfaces 30Aa, 30Ba arc-shaped in cross sections so as to project in a direction to approach each other. With this formation, it becomes possible to introduce lots of wind, which has passed through both sides the cooler 33 conventionally, into the cooler 33 and also possible to radiate heat of air circulating in the outer casing frame 1 to the outside air more effectively, improving the cooling efficiency furthermore.

Figure 20:
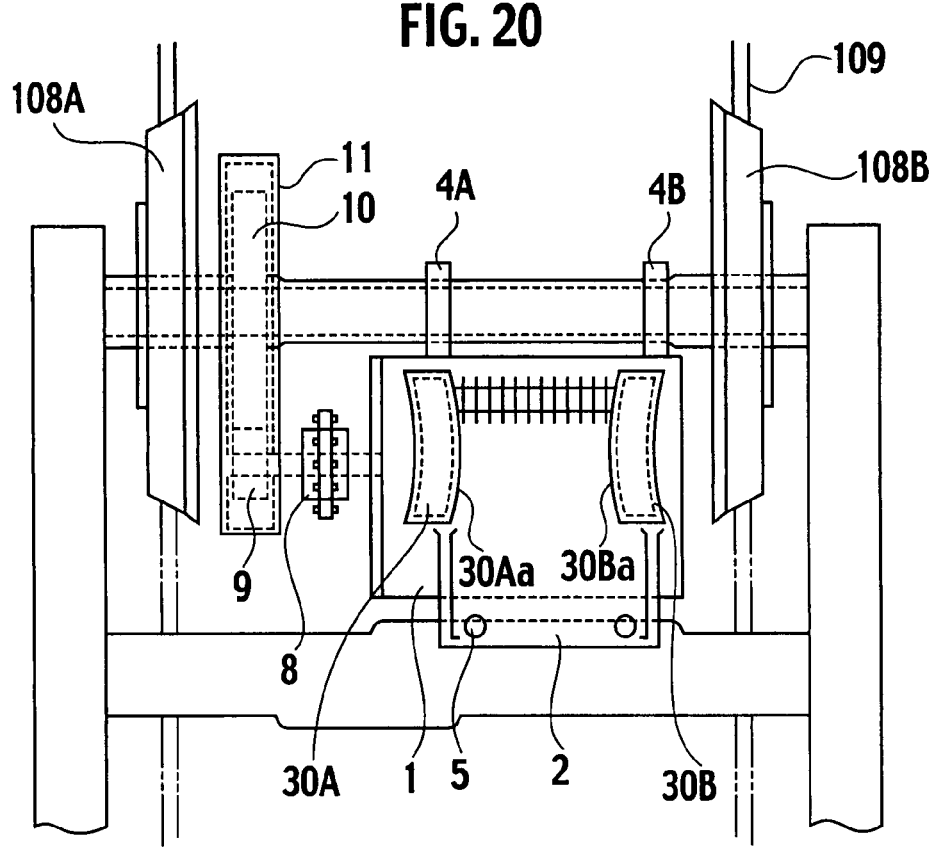
FIG. 20 is a plan view of a totally enclosed type main drive motor for vehicle in accordance with an eighth embodiment.

Next, we describe the eighth embodiment of the present invention. FIG. 20 is a plan view of a guide plate of a totally enclosed type main drive motor for vehicle of the eighth embodiment of the present invention.

In this embodiment, the connective air ducts 30A, 30B of the cooler 33 have opposing inside surfaces 30Aa, 30Ba arc-shaped in cross sections so as to project in a direction to approach each other and also formed so as to extend up to the upper attachment seat 2. With this constitution, it becomes possible to introduce lots of wind, which has passed through both sides the cooler 33 conventionally, into the cooler 33 and additionally, the airflow flowing through the upper surface of the outer casing frame 2 further increases since the traveling wind is introduced up to the upper attachment seat 2. Thus, it becomes possible to radiate heat of air circulating in the outer casing frame 1 to the outside air more effectively, improving the cooling efficiency furthermore.

Note that if the guide plates as described in the first to the sixth embodiments are combined with the seventh and the eighth embodiments, then it is possible to improve the cooling efficiency furthermore.

We described one embodiment of the present invention by way of a concrete example. However, the present invention is not limited to the above embodiment only and therefore, various changes and modifications may be applied to the above embodiment within a range that does not deviate from the content of the invention.

A totally enclosed type main drive motor of the ninth embodiment for vehicle of the present invention will be described with reference to FIGS. 21 and 22.

Figure 21:
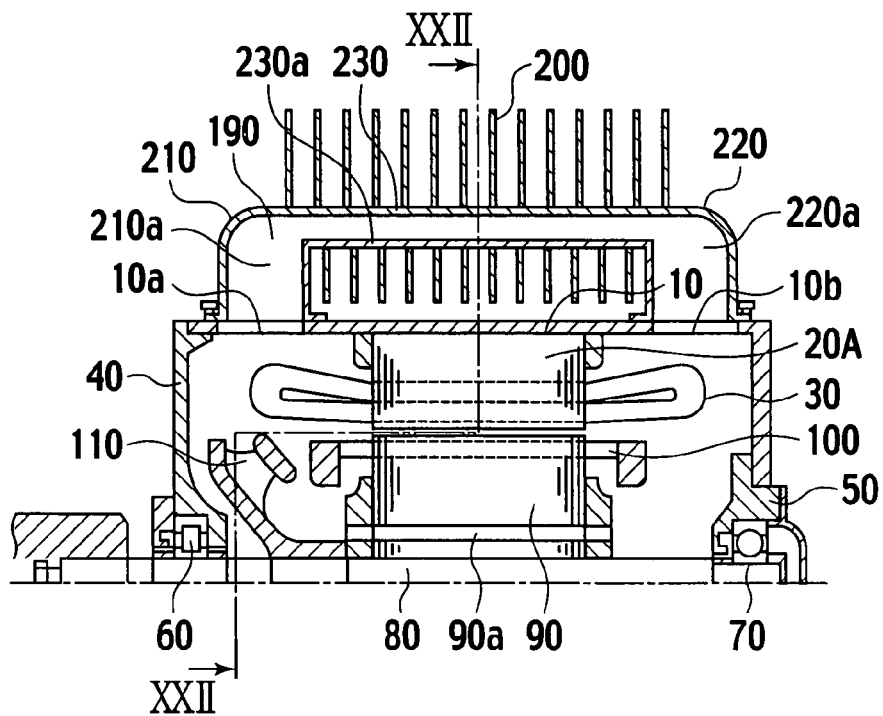
FIG. 21 is a view showing a totally enclosed type main drive motor for vehicle in accordance with a ninth embodiment of the present invention.
Figure 22:
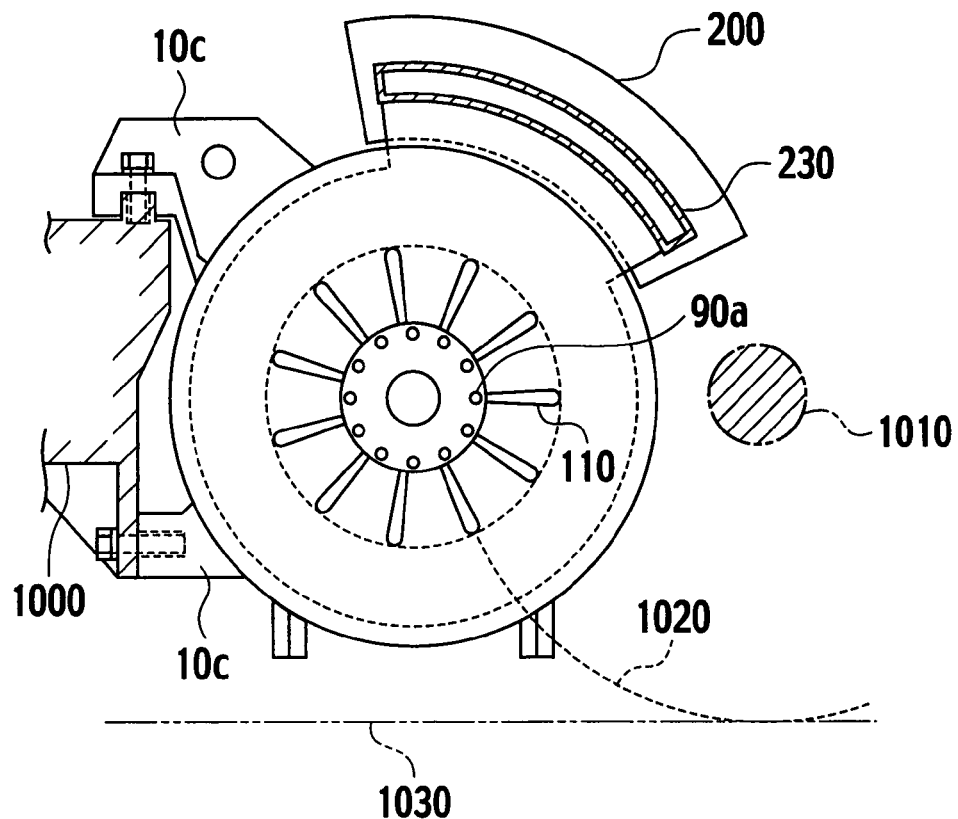
FIG. 22 is a view showing a totally enclosed type main drive motor for vehicle in accordance with a ninth embodiment of the present invention.
Figure 23:
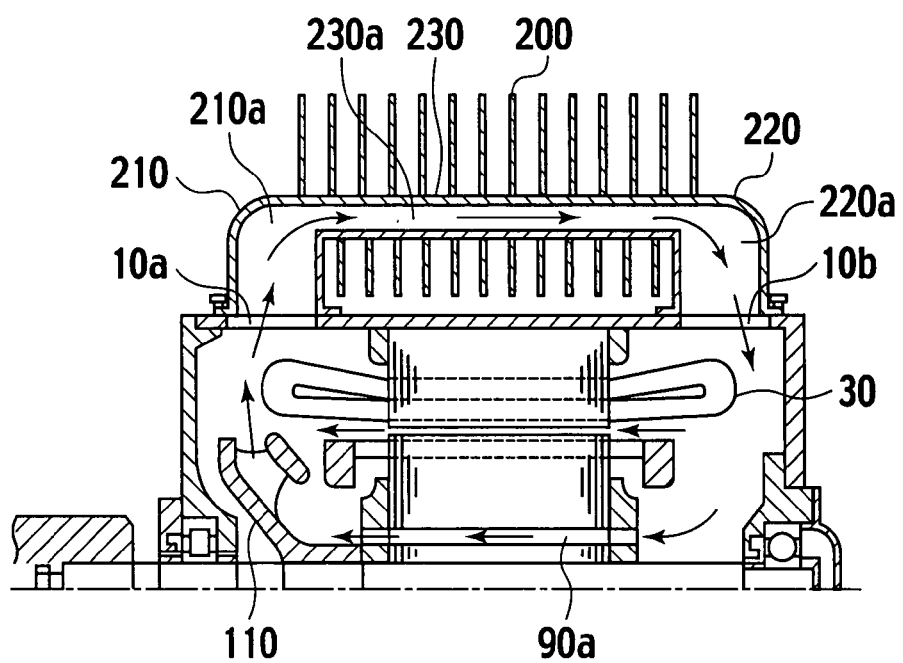
FIG. 23 is a view explaining a fluid flow in the ninth embodiment of the present invention.

In FIGS. 21 and 22, a cylindrical stator core 20A is attached to an inner circumferential surface of a stator 10. Stator coils 30 are accommodated in a number of grooves formed over the whole circumference of an inner circumferential part of the stator core 20A. A bearing bracket 40 having a bearing 60 built-in and a bearing housing 50 having a bearing 70 built-in are attached to both ends of the stator frame 10 respectively. The bearings 60, 70 supports a rotor shaft 80. A rotor core 90 is attached to a longitudinal center part of the rotor shaft 80. The rotor core 90 is provided, on its outer circumferential part and around the whole circumference, with a number of grooves in which rotor bars 100 are accommodated. On the inner circumferential side of the rotor core 90, a plurality of rotor ventilation holes 90a are formed over the circumference. A circulating fan 110 for circulating interior air is mounted on one end of the rotor shaft 80, the end being positioned in the motor.

The stator frame 10 is provided, on both ends thereof in the longitudinal direction, with ventilation openings 10a, 10b. Connective air ducts 210, 220 are attached to the outside of the stator frame 10 so as to cover the ventilation openings 10a, 10b, respectively.

The difference from the conventional motor resides in a cooler comprising the connective air ducts 210, 220, a cooling air duct 230 and radiator fins 200. Arranged between the connective air ducts 210 and 220 is the cylindrical cooling air duct 230 that extends in the same direction as the longitudinal direction of the stator frame 10 and includes a flattened surface (including an arc surface). Namely, in view from the axial direction, the cooler has a substantial reversed-C (⊐) shaped configuration consisting of the connective air ducts 210, 220 and the cooling air duct 230. Further, the radiator fins 200 in large quantity are formed on the outer circumferential wall of the cooling air duct 230 so as to extend in a direction perpendicular to the longitudinal direction of the cooling air duct 230. Then, in view from a direction perpendicular to a motor shaft, the radiator fins 200 are shaped to be substantially rectangular on the whole.

Note that the connective air ducts 210, 220 and the cooling air duct 230 both forming the cooler may be either manufactured individually and subsequently integrated into one body by welding etc. or manufactured in the form of axially separated pieces and subsequently integrated into one body by welding etc. Alternatively, these components may be formed integrally from the beginning by using any technique. In this case, boundaries between the connective air ducts 210, 220 and the cooling air duct 230 would get fuzzy but the connective air ducts 210, 220 would point to respective vicinities of their ends connected to the stator frame 10.

We explain the operation of the above-constructed totally enclosed type main drive motor for vehicle of this embodiment.

As shown in FIGS. 21 and 22, when the motor operates, in-motor air is blown up into an outer circumferential space of the circulating fan 110 in the radial direction due to the rotation of the circulating fan 110 and subsequently enters into an intake path 160a in the connective air duct 210 via the ventilation opening 10a. After flowing through respective ventilation paths 20a and a first exhaust path 170a in the cooling air duct 230, the air enters into an in-motor space on the counter-driving side via the ventilation opening 10b. The inside air entering into the motor flows through a gap between the outer circumferential surface of the rotor core 90 and the inner circumferential surface of the stator core 20A and the ventilation holes 900a of the rotor core 90 in the axial direction and finally returns to the inner diametral side of the circulating fan 110.

Figure 1:
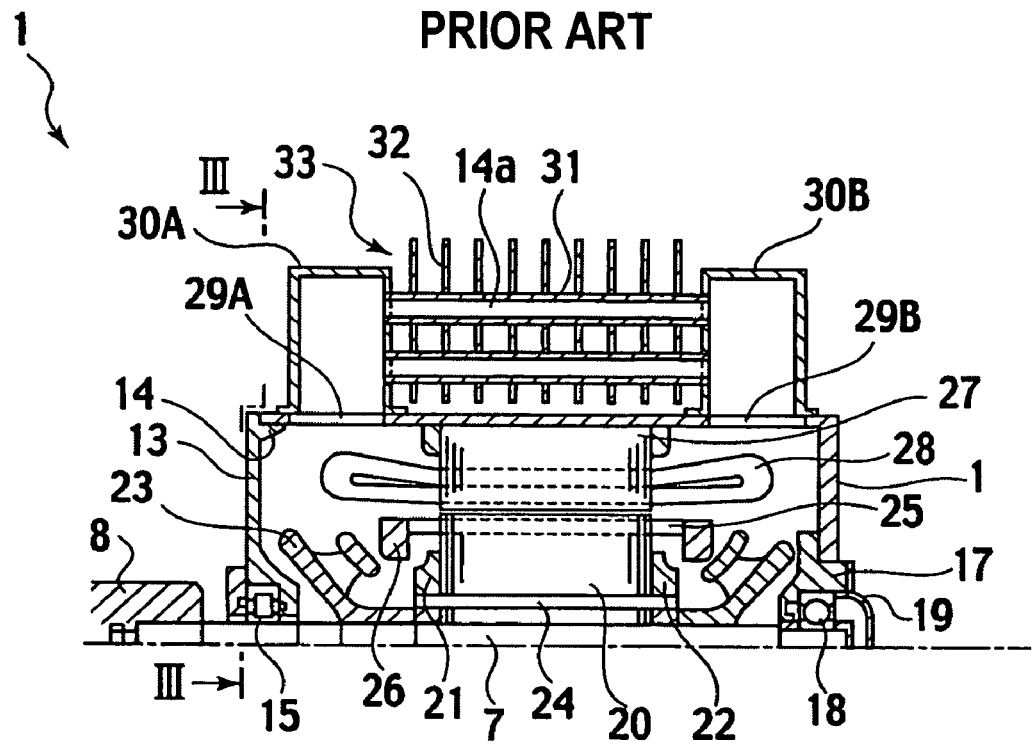
FIG. 1 is an axial sectional view of an upper part of a totally enclosed type main drive motor for vehicle in prior art.
Figure 2:
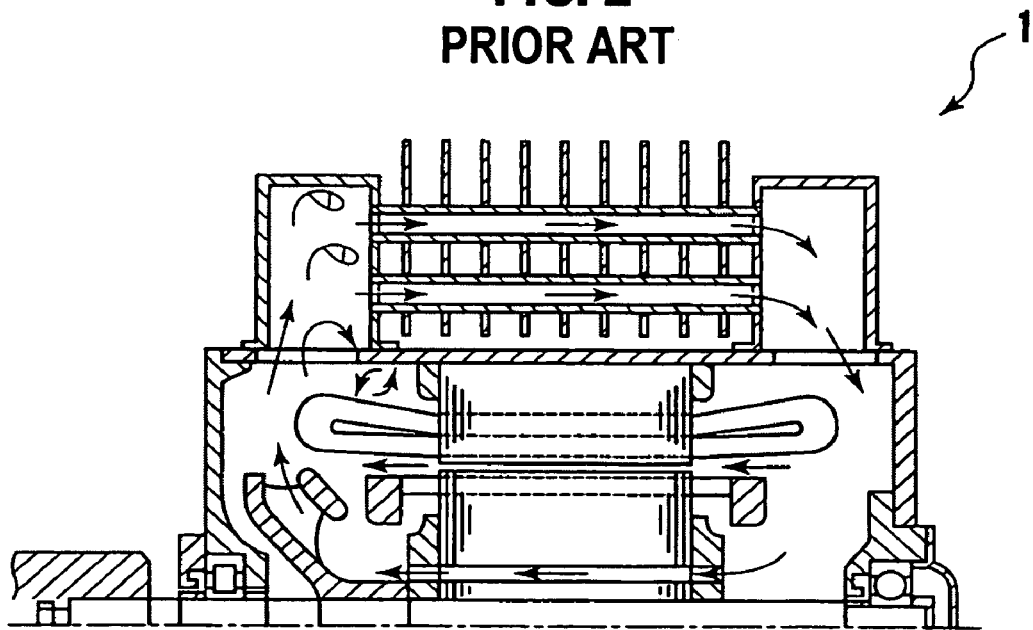
FIG. 2 is a view explaining fluid flows in the totally enclosed type main drive motor for vehicle of FIG. 1.
Figure 3:
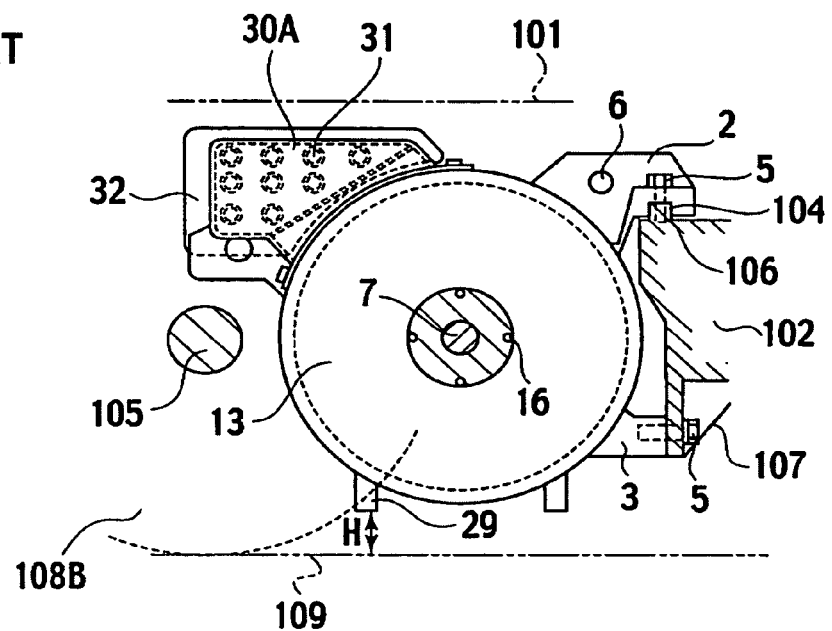
FIG. 3 is a sectional view taken along a line III-III of FIG. 1.
Figure 4:
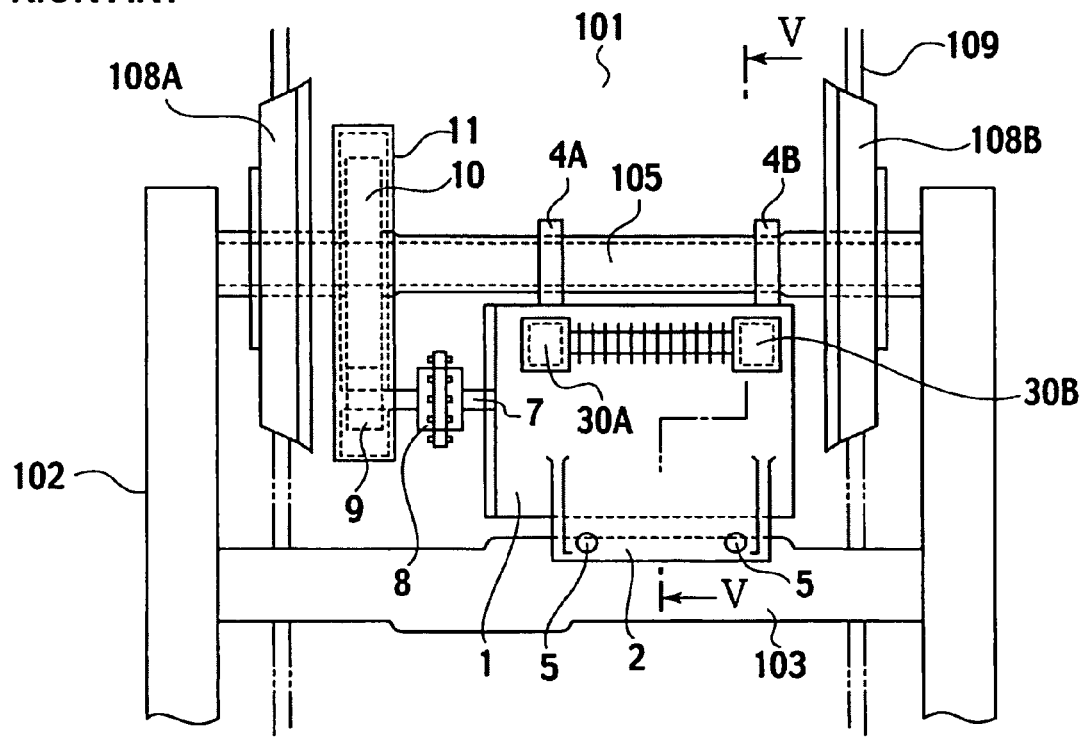
FIG. 4 is a plan view of a condition where the totally enclosed type main drive motor for vehicle of FIG. 1 is mounted on a bogie of a vehicle.
Figure 5:
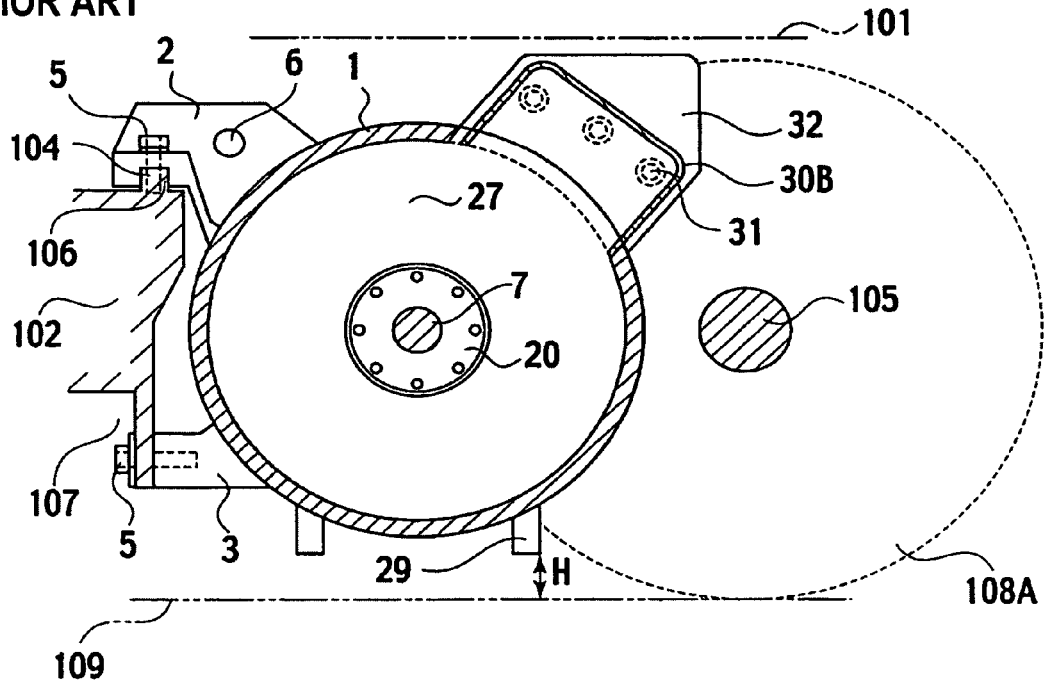
FIG. 5 is a sectional view taken along a line V-V of FIG. 4.
Figure 6:
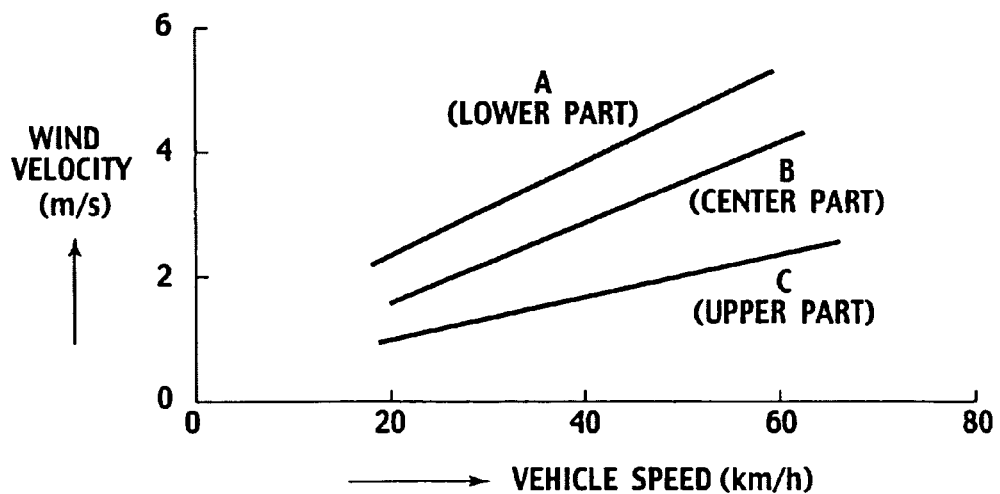
FIG. 6 is a graph showing velocities of traveling winds flowing through upper and lower parts of a main motor under a vehicle floor, which are produced by a vehicle's traveling.

In this way, according to this embodiment, during the operation, the in-motor air flows in circulation by the interior of the cooler. When the in-motor air flows through the ventilation path 230a in the cooling air duct 230, the same duct 230 absorbs heat and further releases it into the atmosphere by means of the radiator fins 200 on the outer circumferential surface of the cooling air duct 230. In the conventional piping structure, vortexes are produced at respective inlets of pipes, causing an entry loss to be increased, as shown in FIG. 2 illustrating the current of winds by arrows. On the contrary, according to the embodiment, no vortex is produced since the cooling air duct 230 is in the form of a single cylinder. Accordingly, as the circulating airflow can be increased due to so-reduced entry loss and ventilation resistance of the cylindrical cooling air duct 230, it is possible to improve the cooling performance of the whole main motor.

Additionally, even when making the ventilation sectional area of the conventional piping structure equal to that of the cooling air duct 230, there is no increase in a dimension of the cooling air duct 230 in the radial direction because of the cylindrical configuration of the cooling air duct 230 in the embodiment. As it allows the total areas of the radiator fins 200 on the outer circumferential surface of the cooling air duct 230 to be increased as much, the cooling efficiency in radiating heat to the atmosphere is enhanced to improve the cooling effect.

During the operation, the cooling outside air flows through spaces among the outer circumferential surface of the cooling air duct 230 and the radiator fins 200. Nevertheless, since the cooling air duct 230 is cylindrical-shaped in this embodiment, it is hard for dust, rag dust, etc. to adhere to the cooling air duct 230 and the radiator fins 200 in spite of longstanding operation of the motor. Therefore, the cooling effect of the radiator fins 200 does not deteriorate in the long run.

Even if dust adheres to the surface due to long-term use, the cylindrical cooling air duct 230 can be cleaned up easily by an air blower or the like in comparison with the conventional piping structure, avoiding the need of maintenance to detach the main motor from the bogie and successively clean up the motor ambitiously.

Although the cooling air duct 230 is generally made from thin sheet metal, there is a case of forming the air duct by aluminum plates in view of weight-saving and improving the cooling performance. However, due to the difficulty of welding the conventional piping structure to aluminum plates, it has been difficult to produce the main motor having a structure with a number of radiator fins 200. On the contrary, as the cooling air duct 230 of this embodiment has straight welding parts due to the cylindrical configuration, it is possible to weld the radiator fins 200 to the outer circumferential surface of the cooling air duct 230 with ease. Therefore, the manufacturing cost can be saved.

In order to confirm the cooling effect of the present invention, we carried out a temperature rise test for a test model. The temperature rise test was performed with respect to each rated speed of respective operating revolutions while using a sinusoidal power as the power source and additionally streaming with dummy traveling wind (2 m/s) around the main motor in order to simulate the effect during a train's traveling.

Figure 24:
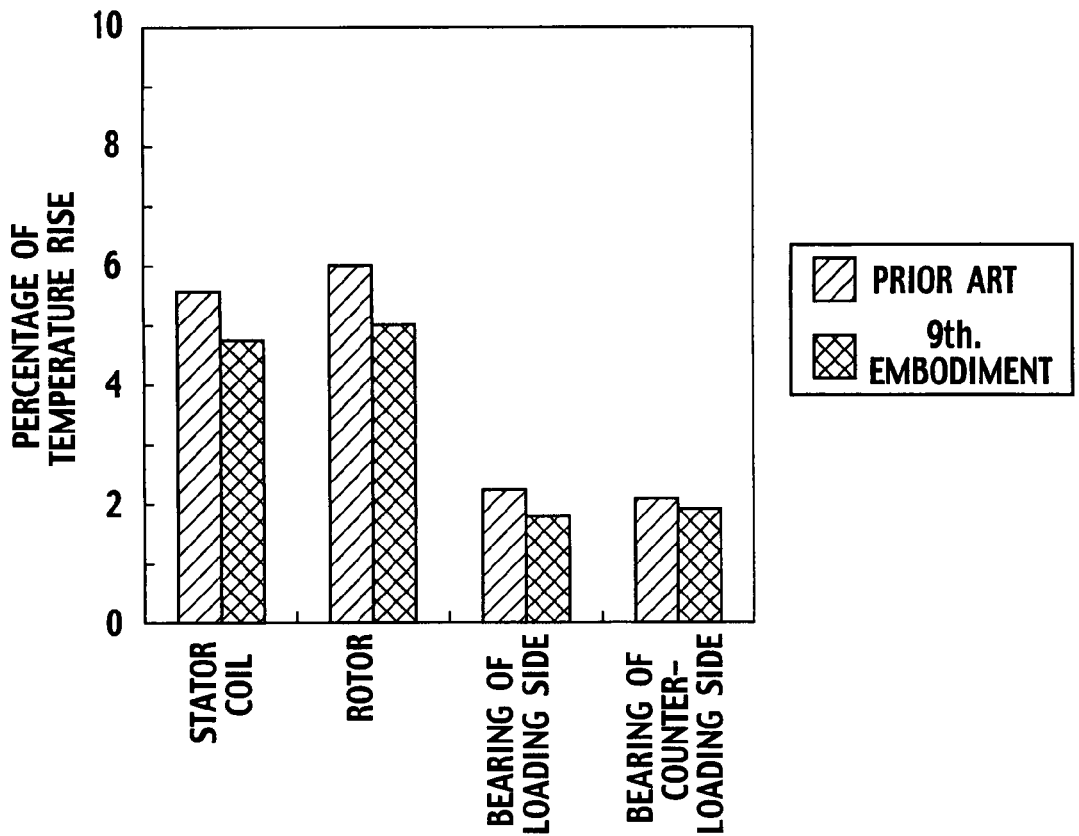
FIG. 24 is a graph showing a temperature reduction effect of the ninth embodiment of the present invention.

The test result is shown in FIG. 24. Scales in the vertical axis represent percentages of temperature rise, while respective points of measurement are shown on the horizontal axis. Comparing with the conventional example, it will be understood that the temperatures of the present invention are reduced as a whole and particularly, the temperature reductions about the rotor and the stator coil are large.

In this way, since the totally enclosed type main drive motor for vehicle of this embodiment is improved in terms of its cooling performance, it is possible to contemplate a reduction in size and weight of the main motor and/or an increasing of its output power. Additionally, the burden of cleaning and maintenance on the cooler can be lightened, allowing the manufacturing cost to be saved.

10$^{th}$. EMBODIMENT

Figure 25:
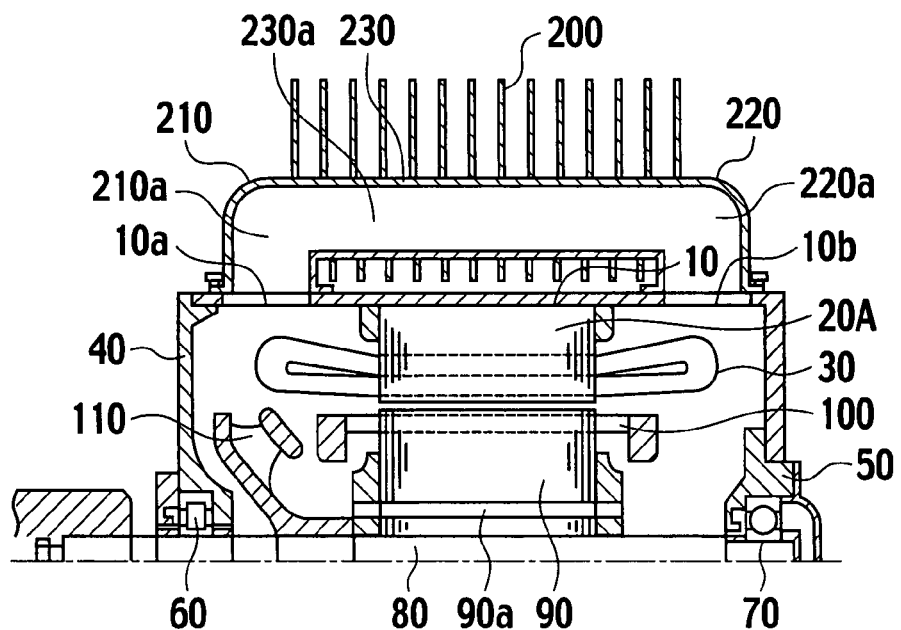
FIG. 25 is a view showing a totally enclosed type main drive motor for vehicle in accordance with a tenth embodiment of the present invention.
Figure 26:
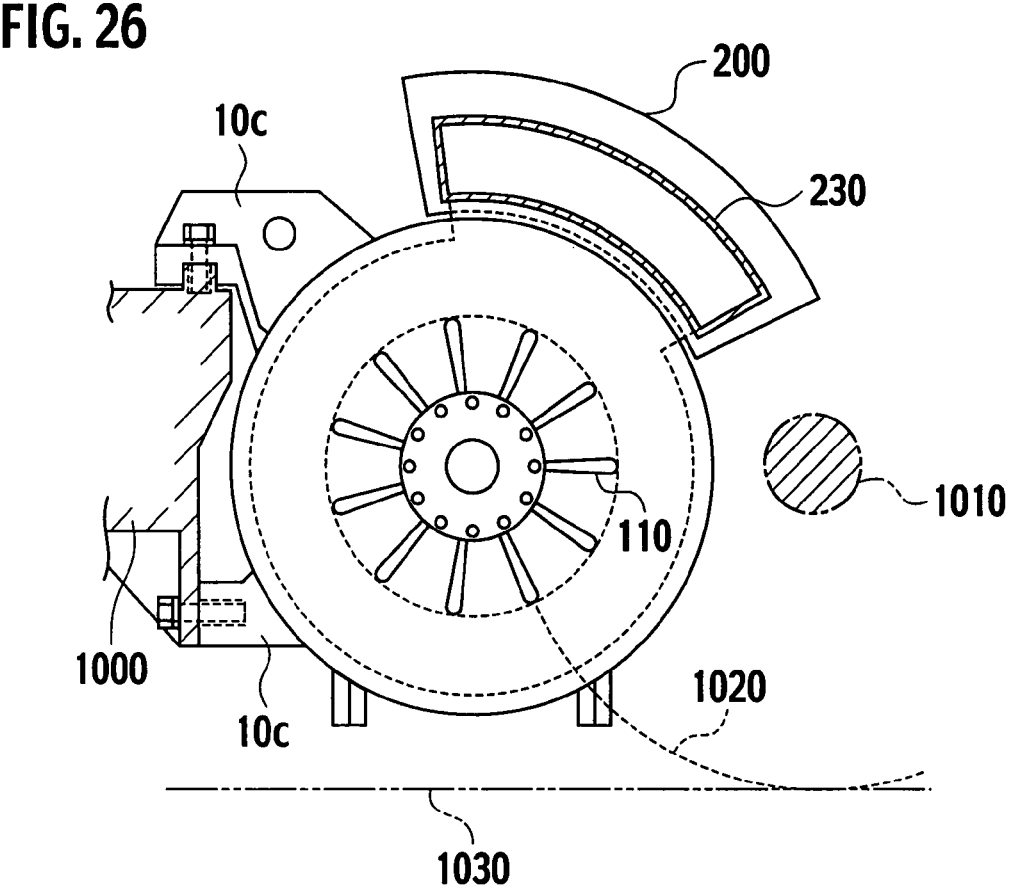
FIG. 26 is a view showing the totally enclosed type main drive motor for vehicle in accordance with the tenth embodiment of the present invention.

Next, a totally enclosed type main drive motor for vehicle in accordance with the tenth embodiment of the present invention will be described with reference to FIGS. 25 and 26.

According to this embodiment, in view from the axial direction of the motor, a substantially fan-shaped configuration is formed on an extension of blades of the circulating fan 110, by the connective air ducts 210, 220, the cooling air duct 230 and the radiator fins 200 in all.

Figure 27:
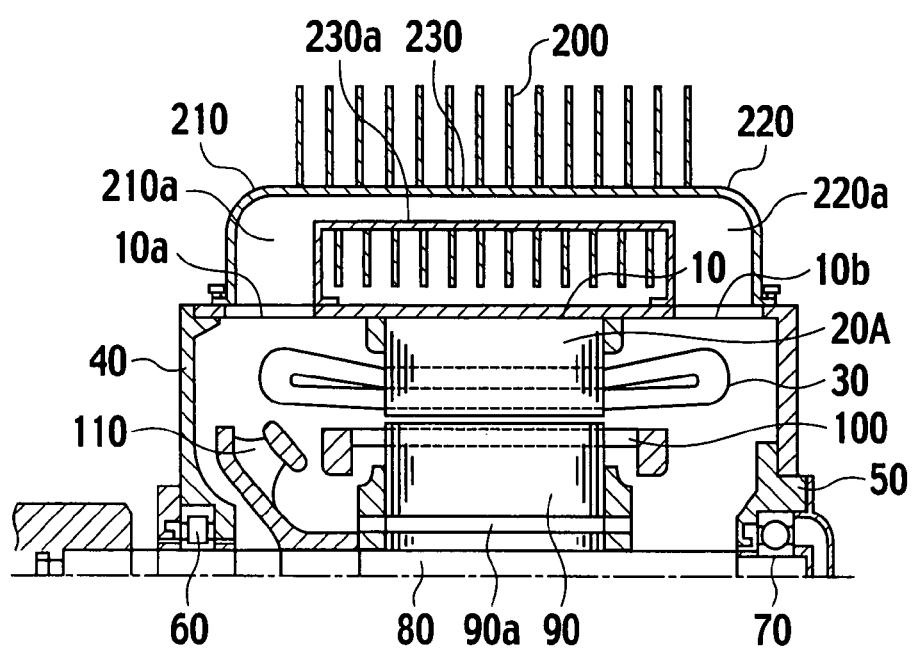
FIG. 27 is a view explaining a wind flow of a radial fan of the tenth embodiment of the present invention.
Figure 28:
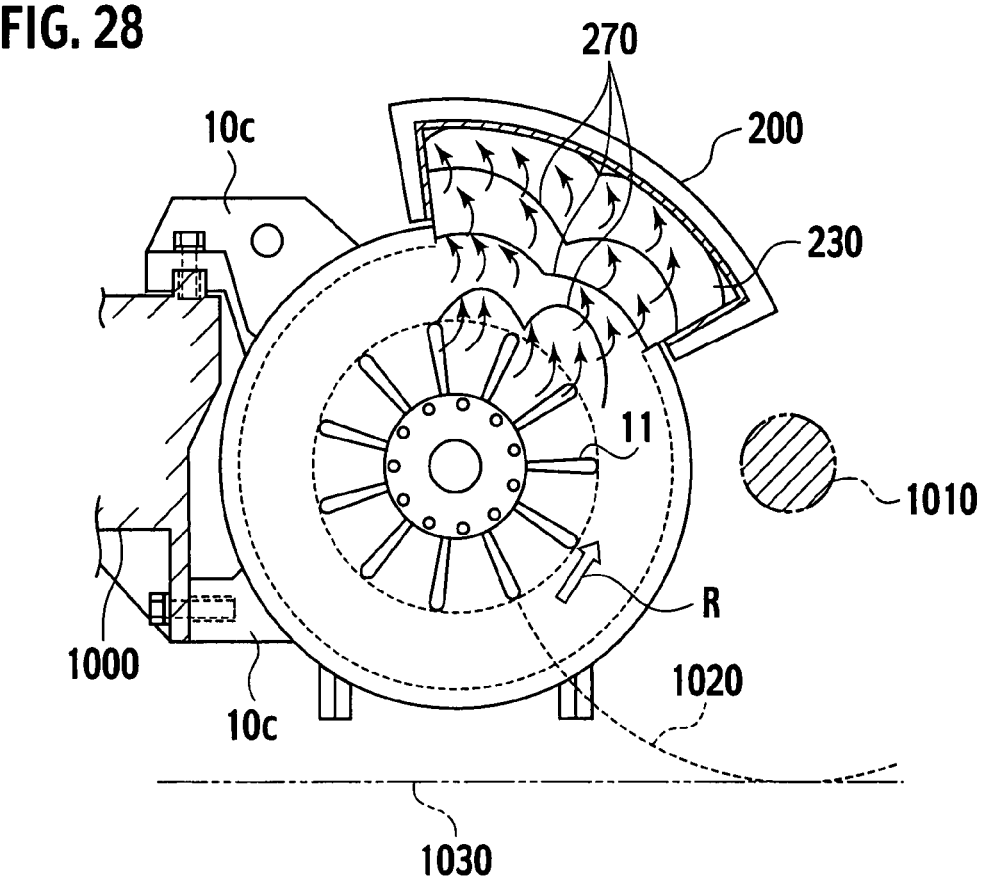
FIG. 28 is a view explaining the wind flow of the radial fan of the tenth embodiment of the present invention.

In FIGS. 27 and 28, respective currents of the inside wind blown up by the circulating fan 110 (indicated by arrow R) are visually shown with change over time. In the figures, reference numeral 270 designates the distribution of pressures of the wind typically. Due to the circulating fan 110 formed by a centrifugal radial fan, the wind is blown up outwardly in the radial direction by centrifugal forces among the blades and further blown up obliquely in the rotating direction. Therefore, the substantially fan-shaped cooling air duct 300 allows the wind blown up by the centrifugal forces to pervade in every corner of the connective air ducts 210, 220.

Thus, as the ventilation efficiency in the cooling air duct 230 rises, the airflow characteristics can be improved to allow the circulating inside air to be discharged to the atmosphere more effectively. Consequently, it is possible to improve the cooling performance of the motor furthermore.

11$^{th}$. EMBODIMENT

Figure 29:
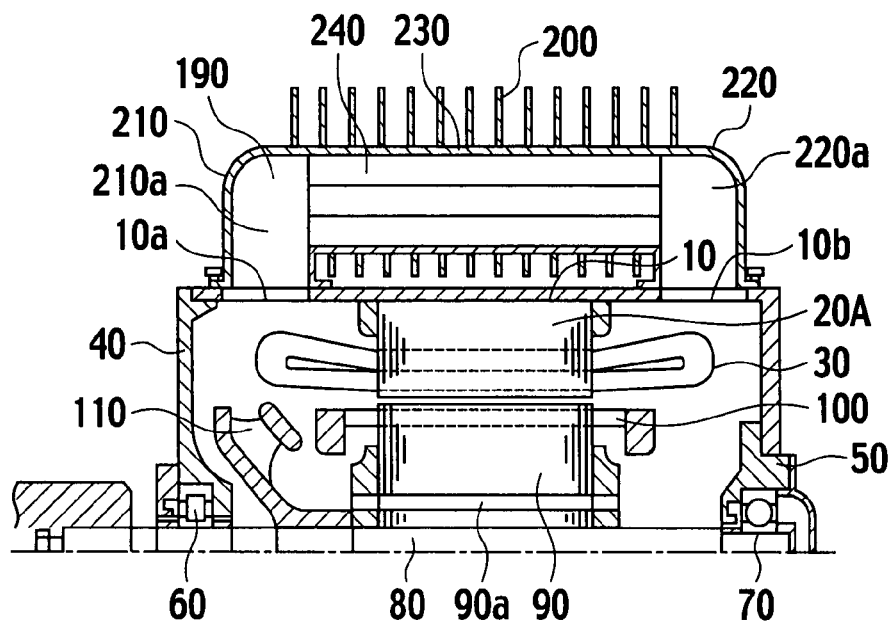
FIG. 29 is a view showing a totally enclosed type main drive motor for vehicle in accordance with an eleventh embodiment of the present invention.
Figure 30:
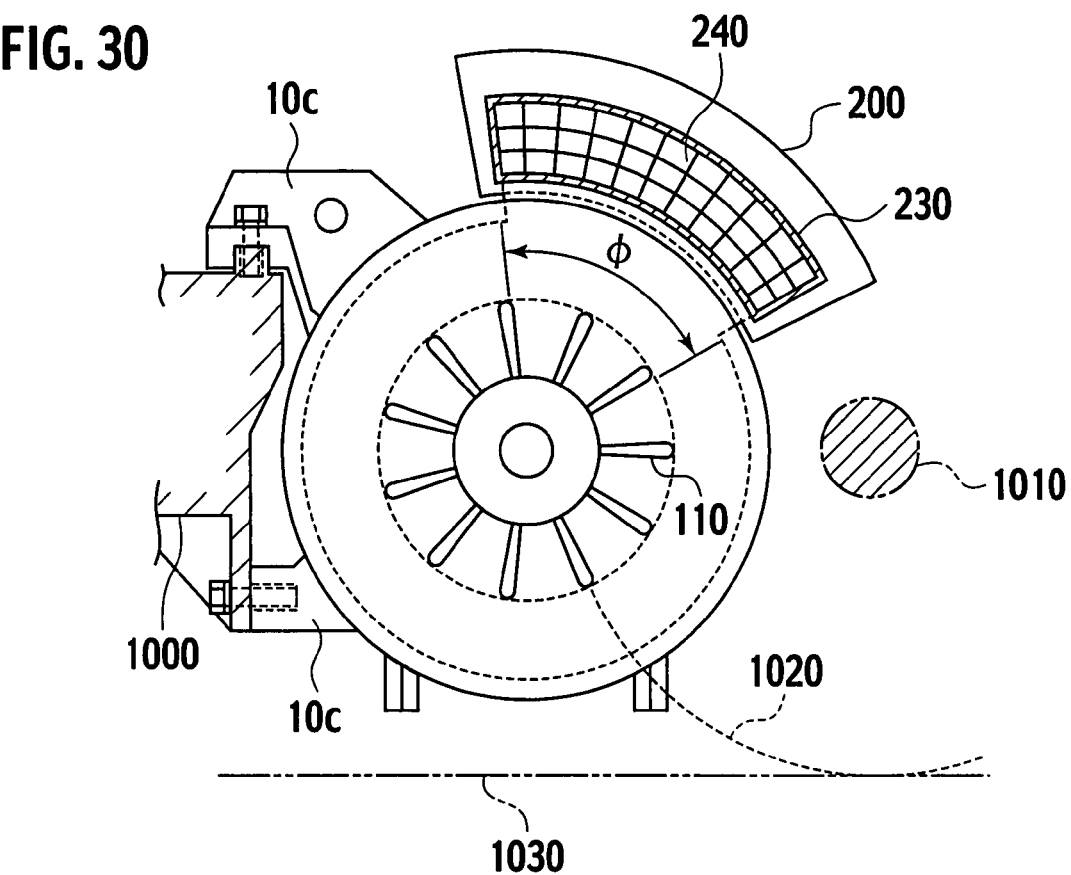
FIG. 30 is a view showing the totally enclosed type main drive motor for vehicle in accordance with the eleventh embodiment of the present invention.

Next, a totally enclosed type main drive motor in accordance with the eleventh embodiment of the present invention will be described with reference to FIGS. 29 and 30.

According to this embodiment, in view from the axial direction of the motor, respective angles of the ventilation openings 10a, 10b as openings on both sides of the stator frame 10, inlet angles of the connective air ducts 210, 220 and a pitch angle of blades of the circulating fan 110 or integral multiples of the pitch angle are equalized to each other (angle f).

According to the embodiment, by making the blade pitch of the circulating fan 110 accord with the inlet angles of the connective air ducts 210, 220, there is produced a harmonization in the phase of wind currents in the cooling air ducts that make a tour of the interior of the motor. Due to the harmonization, a maximum airflow is attained in the circulating fan 110. Consequently, the airflow characteristics can be improved to allow the circulating inside air to be discharged to the atmosphere more effectively, whereby it is possible to improve the cooling performance of the motor furthermore.

12$^{th}$. EMBODIMENT

Figure 31:
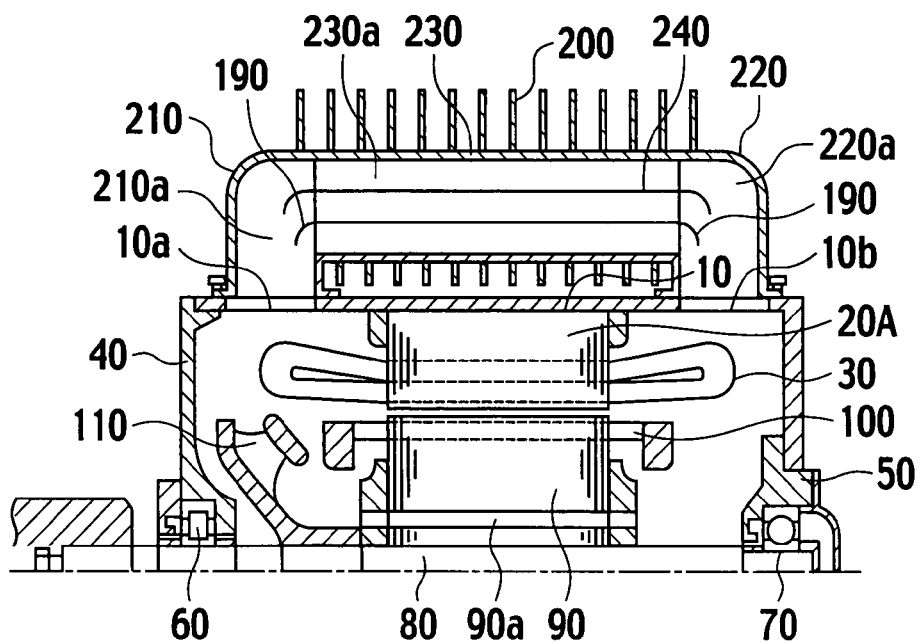
FIG. 31 is a view showing a totally enclosed type main drive motor for vehicle in accordance with a twelfth embodiment of the present invention.
Figure 32:
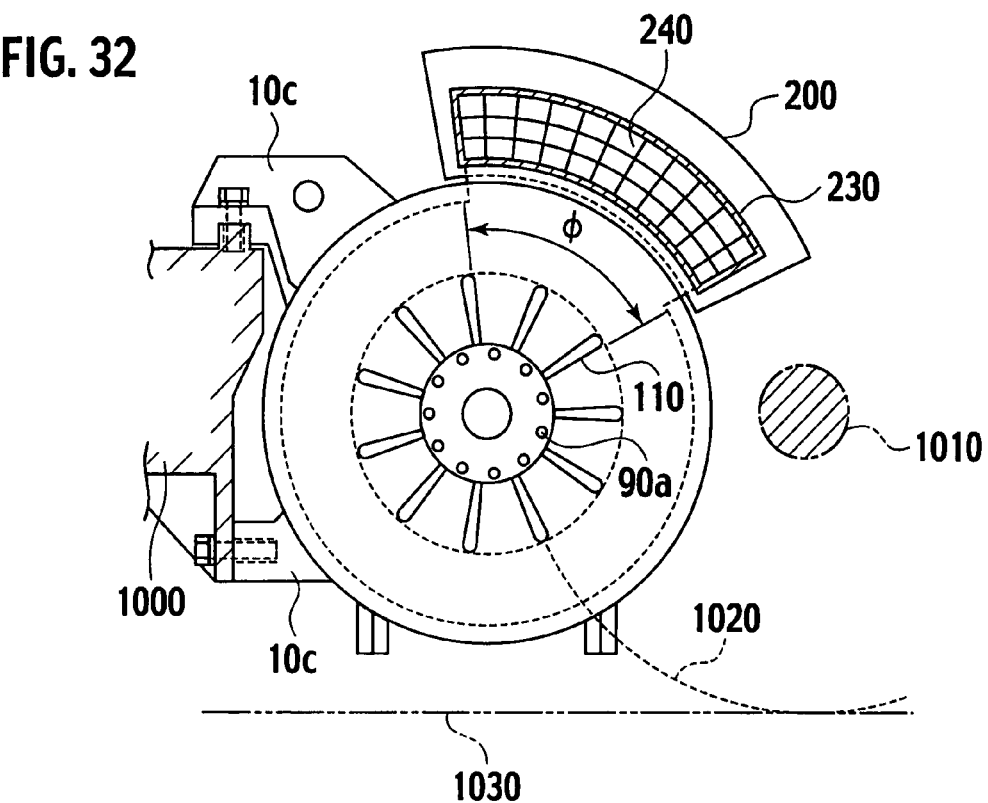
FIG. 32 is a view showing the totally enclosed type main drive motor for vehicle in accordance with the twelfth embodiment of the present invention.

Next, a totally enclosed type main drive motor for vehicle in accordance with the twelfth embodiment of the present invention will be described with reference to FIGS. 31 and 32.

According to this embodiment, in view from the axial direction of the motor, inlet angles of the connective air ducts 210, 220, a blade pitch-angle of the circulating fan 110 or integral multiples of the pitch angle, and a circumferential pitch angle of the rotor ventilation holes 90a are equalized to each other (angle f). In the inside space 230a of the cooling air duct 230, additionally, a lattice-shaped body 240, such as partition plate, is arranged so as to form a window against a draft direction. Further, guide plates 190 having arc-shaped sections are arranged on both ends of the lattice-shaped body 240.

According to the embodiment, by equalizing the inlet angles of the connective air ducts 210, 220, the blade pitch-angle of the circulating fan 110 or the integral multiples of the pitch angle and the circumferential pitch angle of the rotor ventilation holes 90a to each other, there is produced a harmonization in the phase of wind currents in the cooling air ducts that make a tour of the interior of the motor. Due to the harmonization, a maximum airflow is attained in the circulating fan 110. Consequently, the airflow characteristics can be improved to allow the circulating inside air to be discharged to the atmosphere more effectively, whereby it is possible to improve the cooling performance of the motor furthermore.

Figure 33:
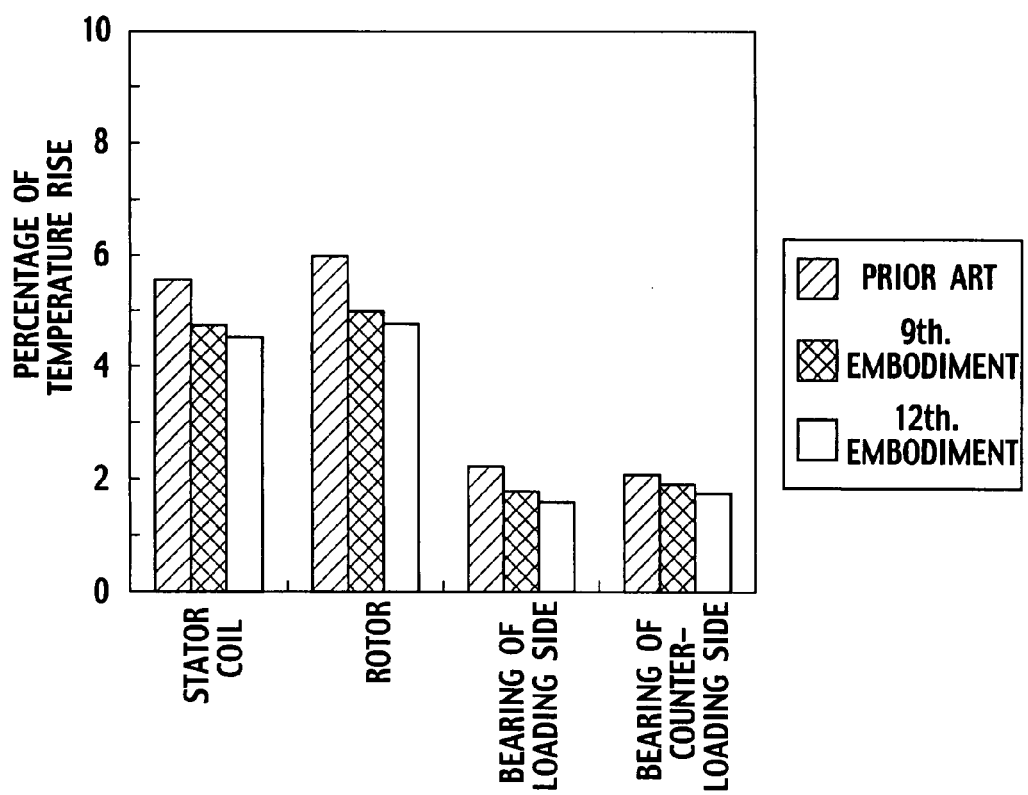
FIG. 33 is a graph showing a temperature reduction effect of the twelfth embodiment of the present invention.

In order to confirm the cooling effect of the present invention, we carried out a temperature rise test for a test model. The temperature rise test was performed under the same condition as that of the ninth embodiment. The test result is shown in FIG. 33. From the test result, it will be understood that the motor of the twelfth embodiment has an effect to reduce the overall temperature in comparison with that of the conventional example and the ninth embodiment of the present invention.

13th. EMBODIMENT

Next, a totally enclosed type main drive motor for vehicle in accordance with the thirteenth embodiment of the present invention will be described with reference to FIGS. 34 to 39.

Figure 34:
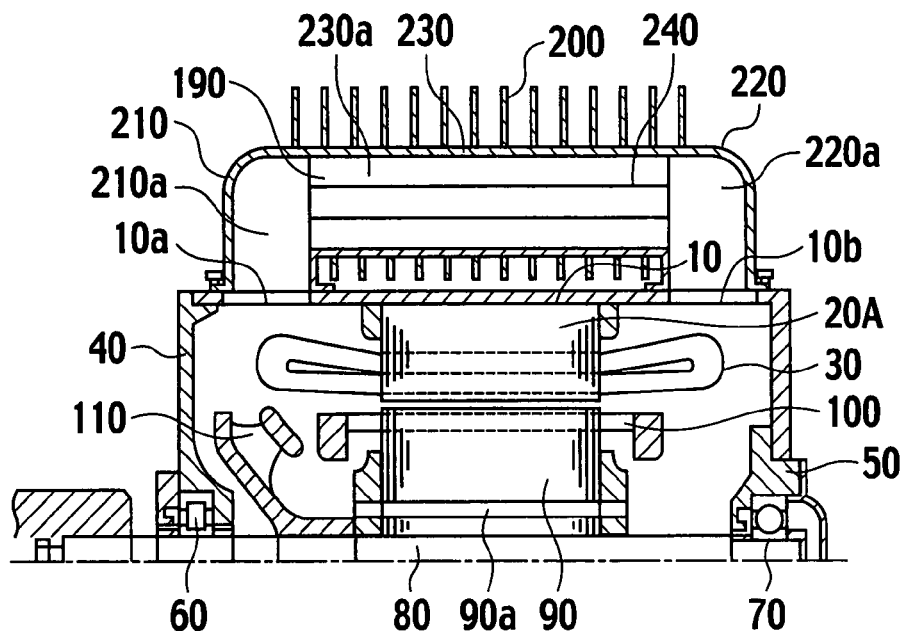
FIG. 34 is a view showing a totally enclosed type main drive motor for vehicle in accordance with a thirteenth embodiment of the present invention.
Figure 35:
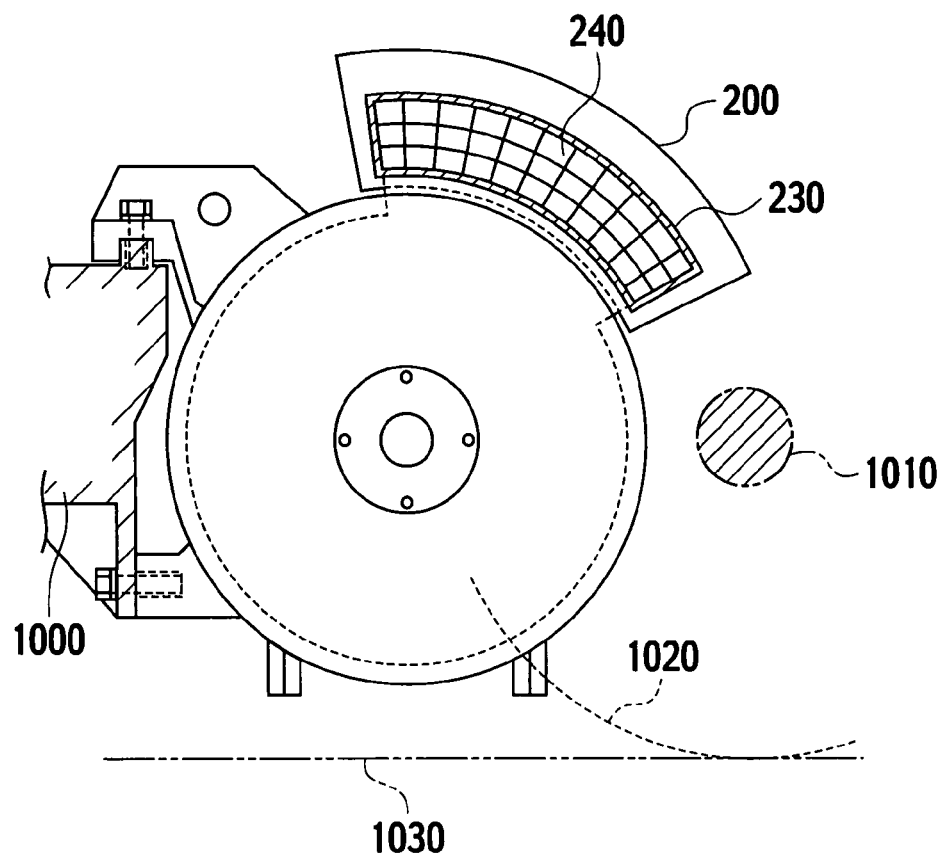
FIG. 35 is a view showing the totally enclosed type main drive motor for vehicle in accordance with the thirteenth embodiment of the present invention.

In this embodiment, as shown in FIGS. 34 and 35, the lattice-shaped body 240, such as partition plates, is arranged in the inside space 230a of the cooling air duct 230 so as to form a window against a draft direction.

According to the embodiment, owing to the provision of the lattice-shaped body 240 in the cooling air duct 230, the lattice-shaped body 240 serves as radiator fins to increase an endothermic area. Thus, the cooler's performance to cool the circulating inside air is enhanced to suppress the temperature rise of the motor, whereby it is possible to reduce both size and weight of the motor and/or possible to increase an output power of the motor.

Figure 36:
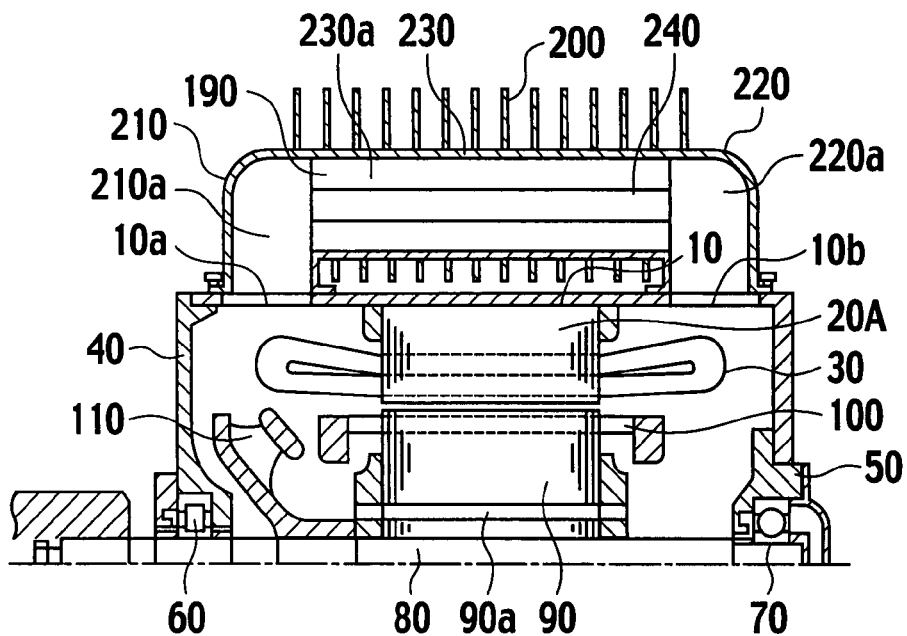
FIG. 36 is a view showing the totally enclosed type main drive motor for vehicle in accordance with the thirteenth embodiment of the present invention.
Figure 37:
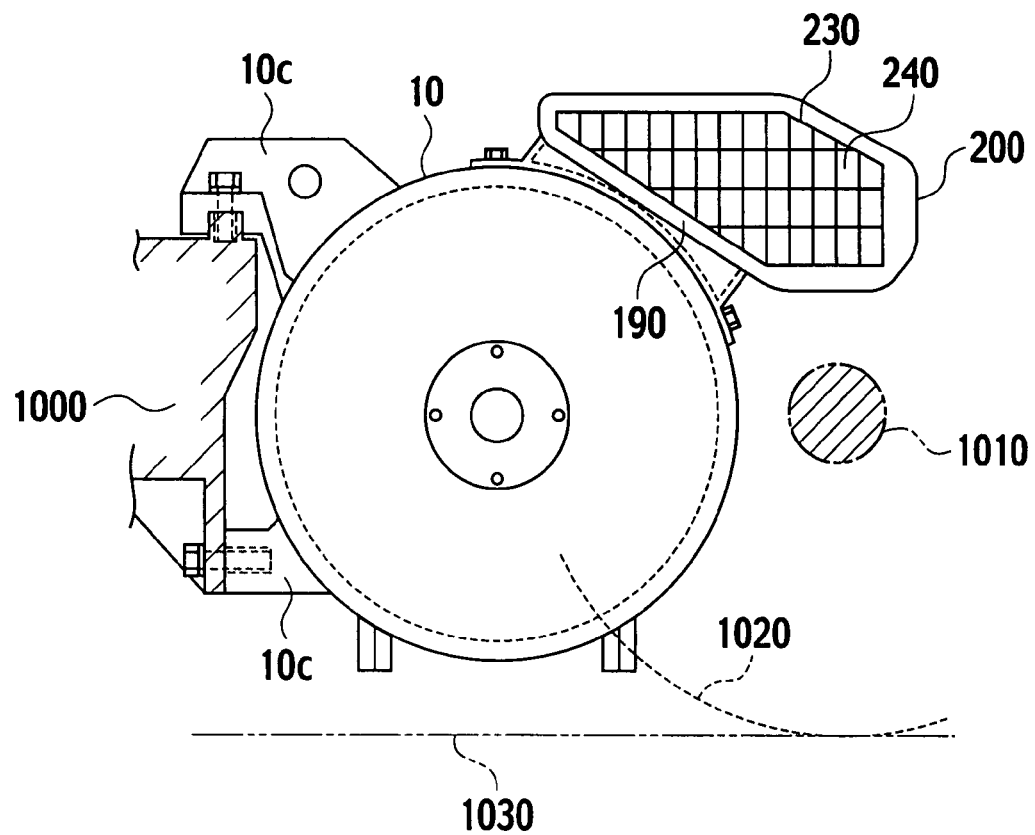
FIG. 37 is a view showing the totally enclosed type main drive motor for vehicle in accordance with the thirteenth embodiment of the present invention.
Figure 38:
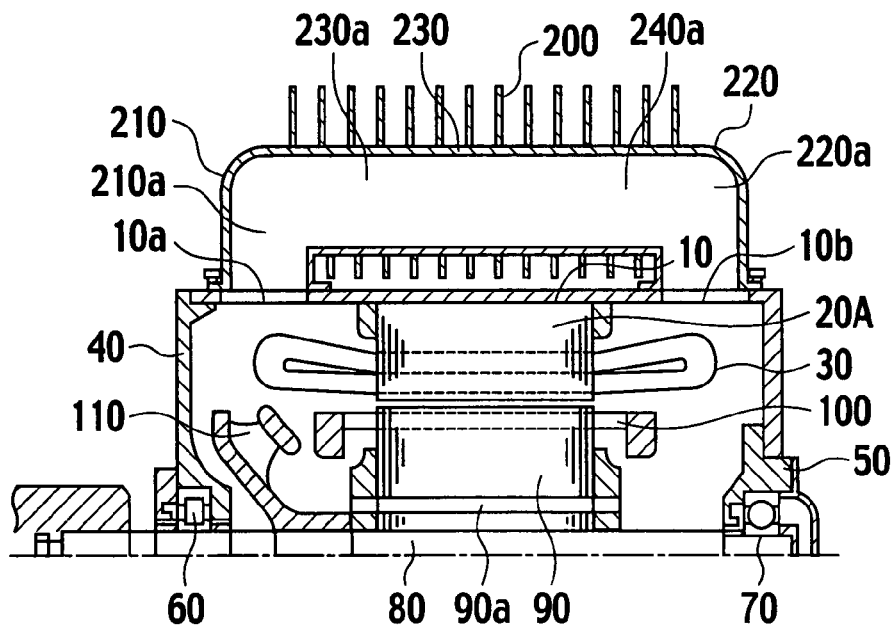
FIG. 38 is a view showing the totally enclosed type main drive motor for vehicle in accordance with the thirteenth embodiment of the present invention.
Figure 39:
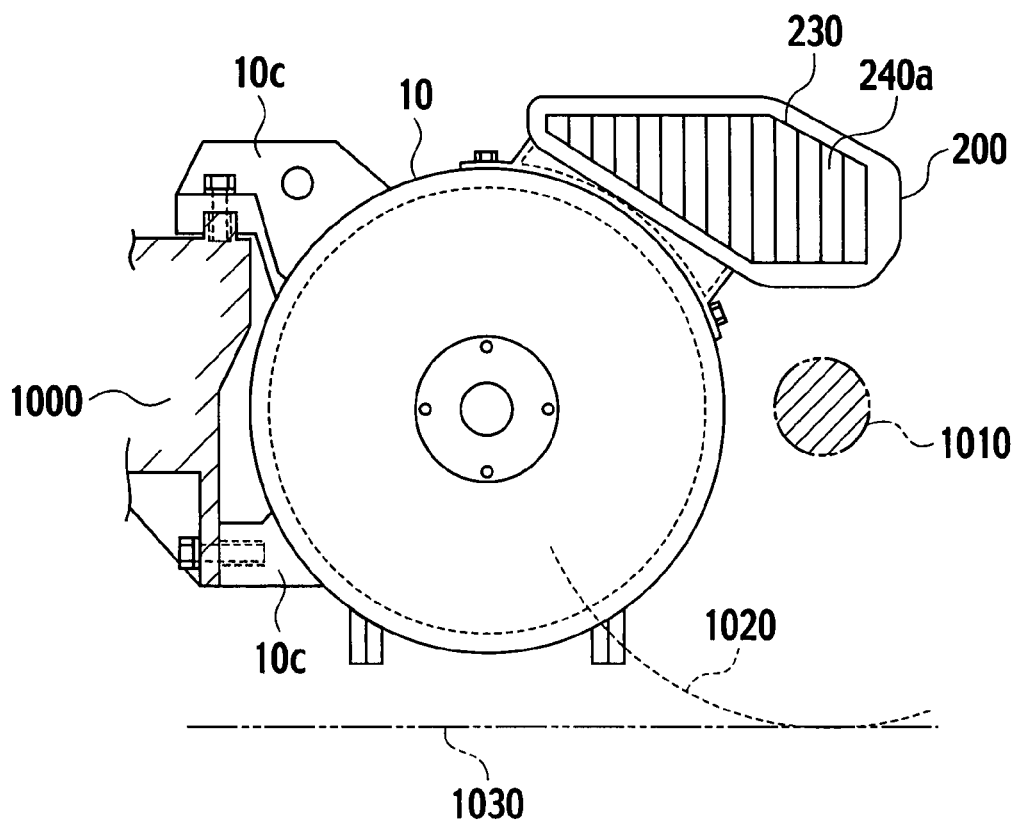
FIG. 39 is a view showing the totally enclosed type main drive motor for vehicle in accordance with the thirteenth embodiment of the present invention.

FIGS. 36 and 37 show an arrangement where the lattice-shaped body 240 is arranged in the inside space 230a of the cooling air duct 230, similarly to the above-mentioned arrangement. However, the cooling air duct 230 is not fan-shaped substantially. FIGS. 38 and 39 show an arrangement where a vertical lattice-shaped body 240a having partition plates in vertical arrangement is arranged in the inside space 230a of the cooling air duct 230. However, similarly to FIGS. 29A and 29B, the cooling air duct 230 is not fan-shaped substantially. In common with the above-mentioned arrangements, it is possible to accomplish sufficient cooling performance.

14th. EMBODIMENT

Next, a totally enclosed type main drive motor for vehicle in accordance with the fourteenth embodiment of the present invention will be described with reference to FIGS. 40 to 43.

Figure 40:
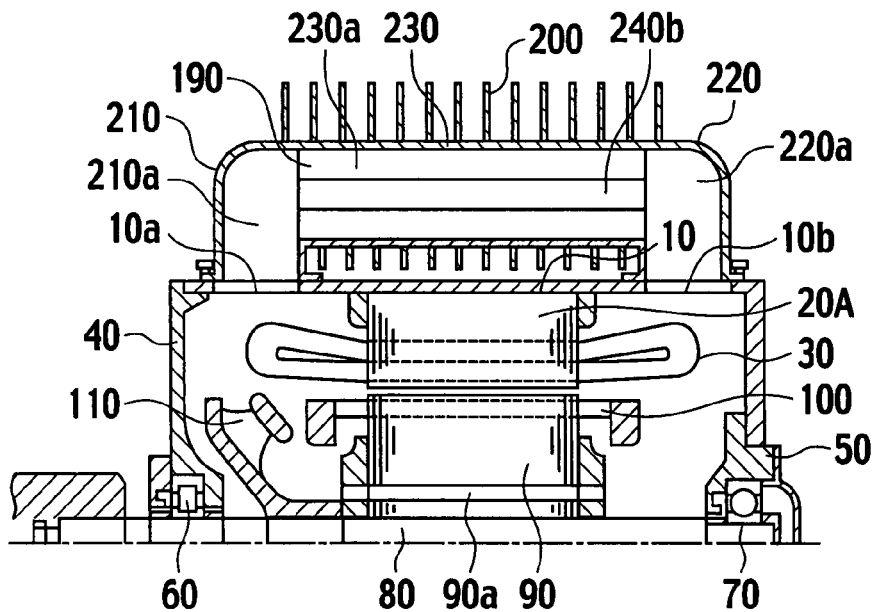
FIG. 40 is a view showing a totally enclosed type main drive motor for vehicle in accordance with a fourteenth embodiment of the present invention.
Figure 41:
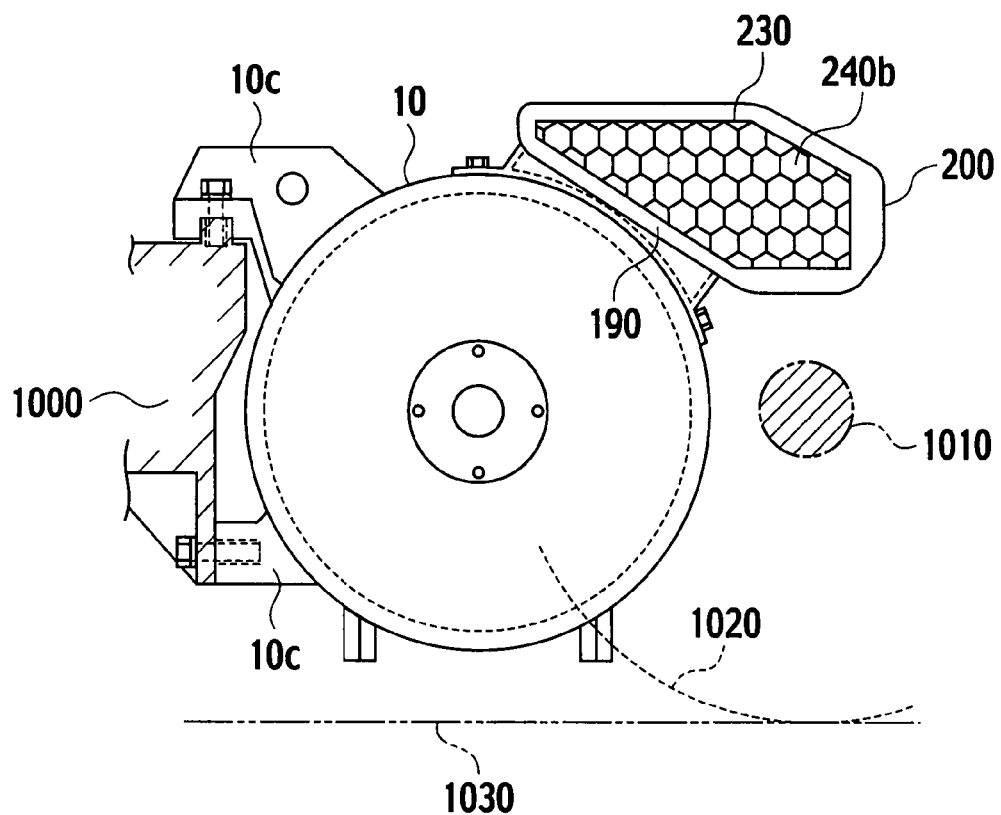
FIG. 41 is a view showing the totally enclosed type main drive motor for vehicle in accordance with the fourteenth embodiment of the present invention.

In the embodiment, as shown in FIG. 40 (longitudinal sectional view) and FIG. 41 (front sectional view), a honeycomb-shaped body 240b is arranged in the inside space 230a of the cooling air duct 230.

With this constitution, the mechanical rigidity of the cooler is increased so as to enable an outer frame casing of the cooler to be formed by thinned plates, allowing weight-saving of the cooler.

Again, since the honeycomb-shaped body 240b is arranged in the inside space 230a of the cooling air duct 230, it is possible to increase an endothermic area. Thus, the cooler's performance to cool the circulating inside air is enhanced to suppress the temperature rise of the motor, whereby it is possible to reduce both size and weight of the motor and/or possible to increase an output power of the motor.

Figure 42:
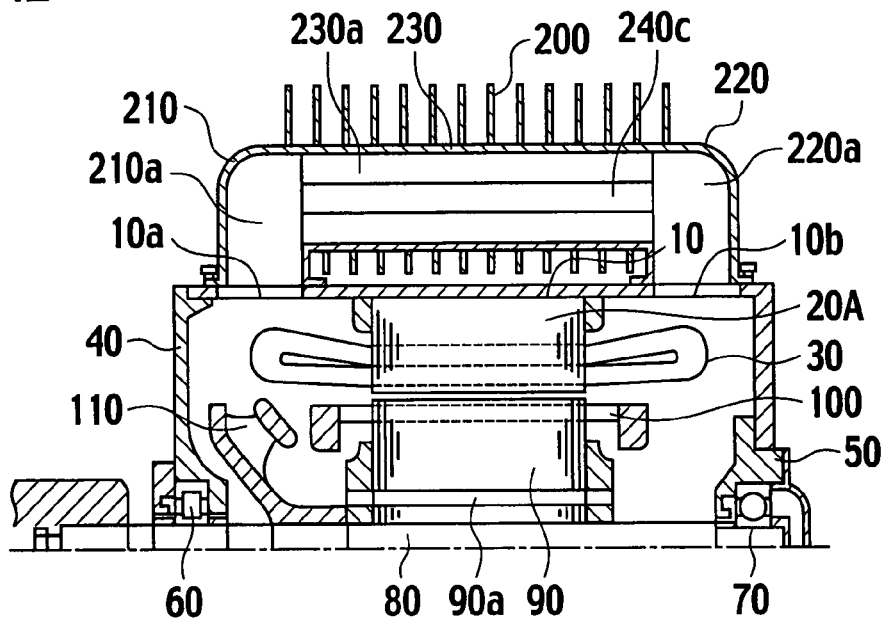
FIG. 42 is a view showing the totally enclosed type main drive motor for vehicle in accordance with the fourteenth embodiment of the present invention.
Figure 43:
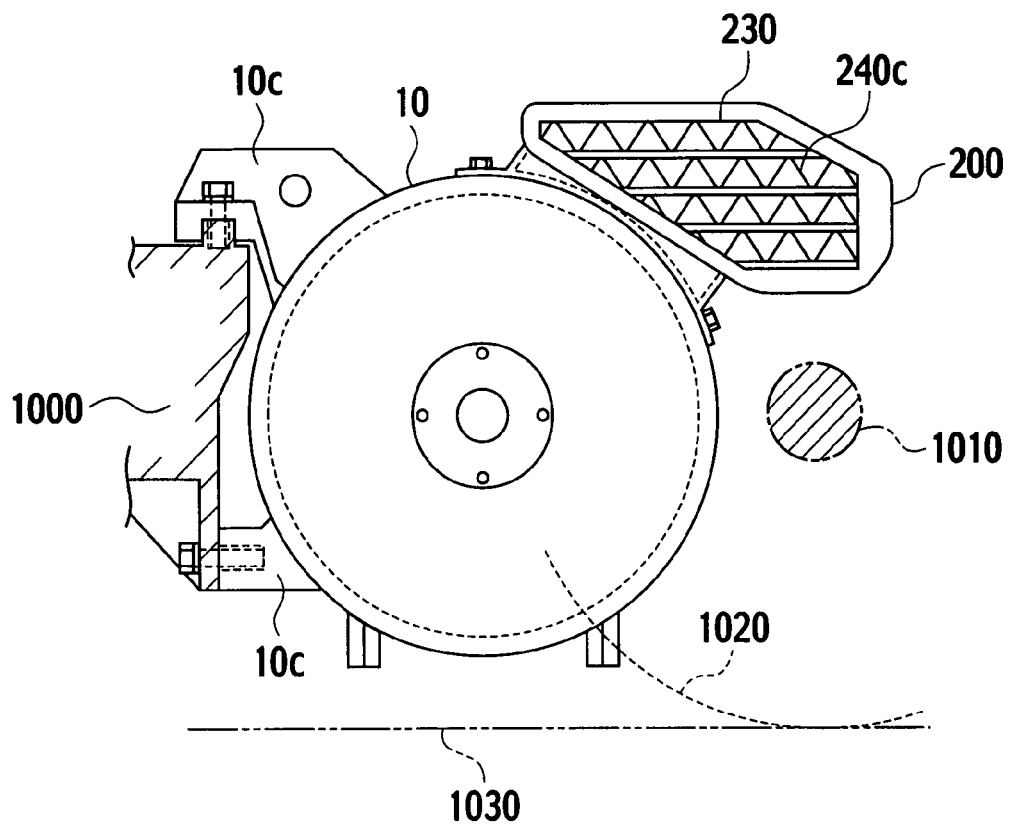
FIG. 43 is a view showing the totally enclosed type main drive motor for vehicle in accordance with the fourteenth embodiment of the present invention.

In the constitution of this embodiment, as shown in FIG. 42 (longitudinal sectional view) and 43 (front sectional view), the cooling air duct 230 is provided, in the inside space 230a with a corrugate-shaped body 240c where respective summits of the corrugate-shape 240e on a certain level are not overlaid on each summit on different levels. Consequently, the heat concentration in endothermic fins is modified to enhance their thermal conductivity. Therefore, the cooler's performance to cool the circulating inside air is enhanced to suppress the temperature rise of the motor, whereby it is possible to reduce both size and weight of the motor and/or possible to increase an output power of the motor.

15th. EMBODIMENT

Figure 44:
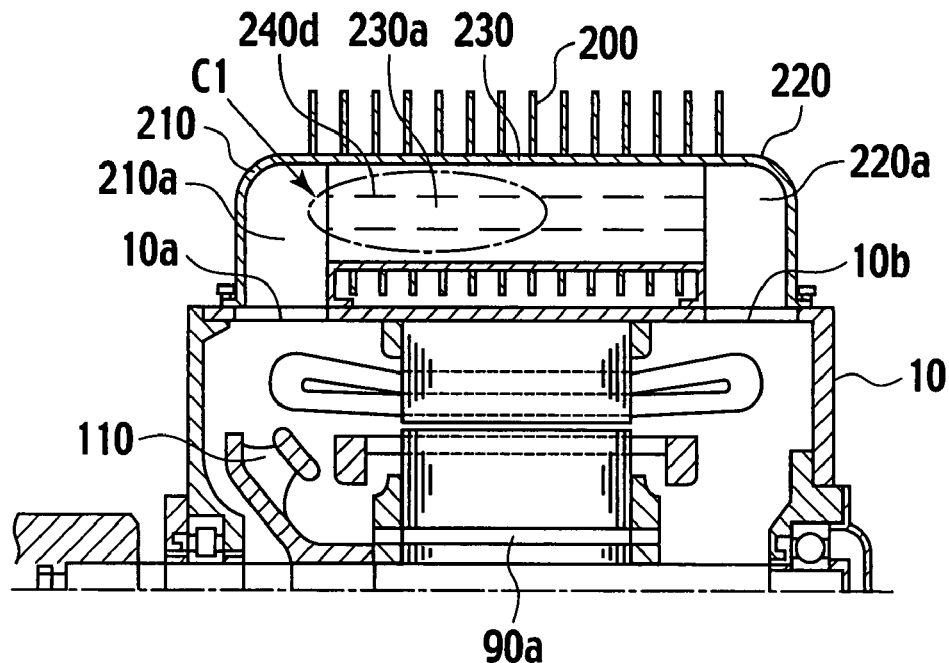
FIG. 44 is a view showing a totally enclosed type main drive motor for vehicle in accordance with a fifteenth embodiment of the present invention.
Figure 45:
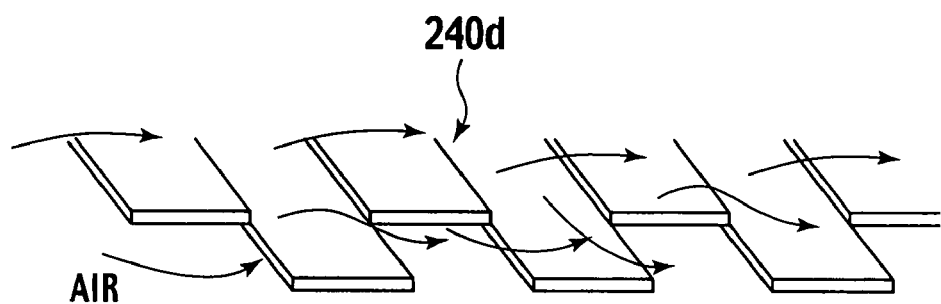
FIG. 45 is an enlarged view of a part surrounded by C1 of FIG. 44.

Next, a totally enclosed type main drive motor for vehicle in accordance with the fifteenth embodiment of the present invention will be described with reference to FIG. 44 as a longitudinal sectional view of the motor and FIG. 45 showing details of discontinued endothermic fins.

As shown in FIGS. 44 and 45, according to the embodiment, the cooling air duct 230 is provided, in place of the above-mentioned body in the inside space 230a, with divided endothermic bodies (discontinued endothermic fins) 240d which is obtained by dividing an endothermic plate into a plurality of pieces.

In this way, owing to the provision of the divided endothermic bodies 240d in the inside space 230a of the cooling air duct 230, air is reshuffled between an upper stage in the airflow and the under stage, so that turbulence eddy flows are induced to improve the heat transfer. Consequently, as the cooling performance of the cooler for the circulating inside air is improved to allow the temperature rise of the motor to be held down, it is possible to promote the reduction in both size and weight of the motor and/or the increase of an output power of the motor.

16th. EMBODIMENT

Figure 46:
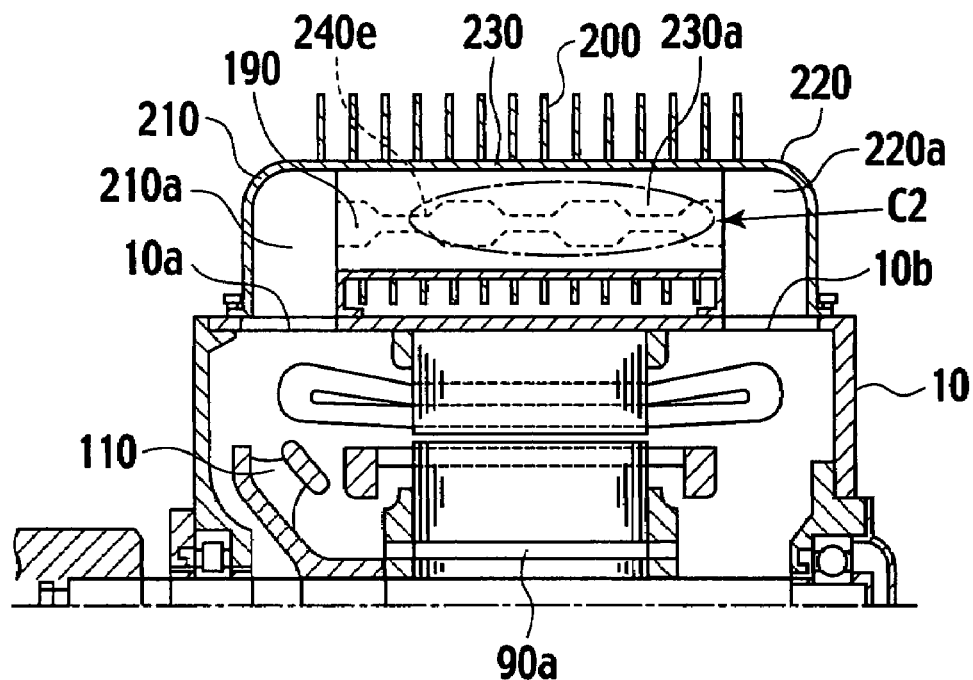
FIG. 46 is a view showing a totally enclosed type main drive motor for vehicle in accordance with a sixteenth embodiment of the present invention.
Figure 47:
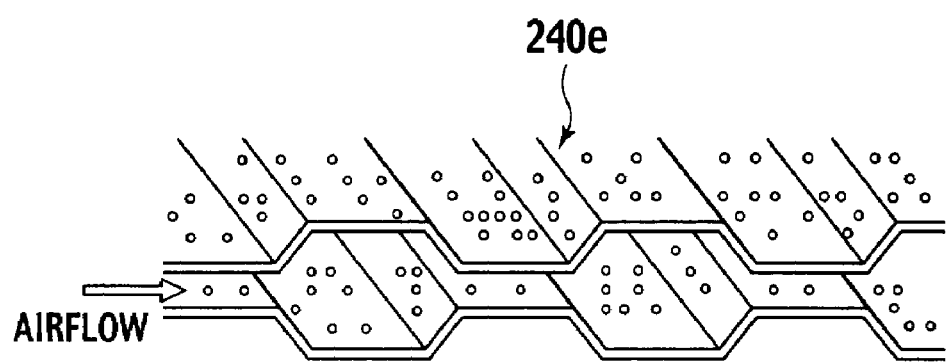
FIG. 47 is an enlarged view of a part surrounded by C2 of FIG. 46.

Next, a totally enclosed type main drive motor for vehicle in accordance with the sixteenth embodiment of the present invention will be described with reference to FIG. 46 as a longitudinal sectional view of the motor and FIG. 47 showing details of blow-in/blow-out endothermic fins.

As shown in FIGS. 46 and 47, according to the embodiment, the cooling air duct 230 is provided, in place of the above-mentioned body in the inside space 230a, with blow-in/blow-out endothermic bodies (blow-in/blow-out endothermic fins) 240e of corrugated plates having a number of porosities formed therein.

In this way, owing to the provision of the blow-in/blow-out endothermic bodies 240e in the inside space 230a of the cooling air duct 230, air is reshuffled between an upper stage in the airflow and the under stage, so that turbulence eddy flows are induced to improve the heat transfer. Consequently, as the cooling performance of the cooler for the circulating inside air is improved to allow the temperature rise of the motor to be held down, it is possible to promote the reduction in both size and weight of the motor and/or the increase of an output power of the motor.

17th. EMBODIMENT

Figure 48:
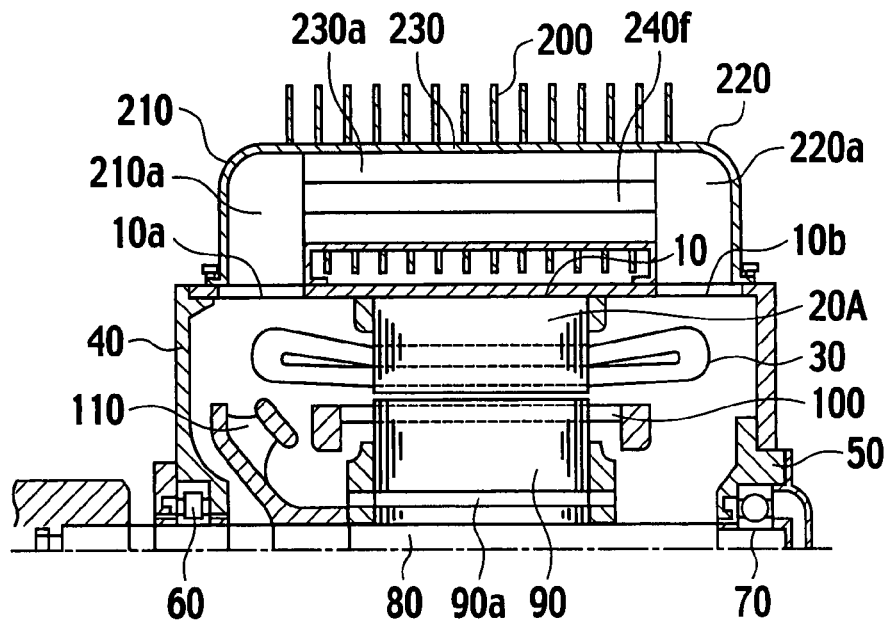
FIG. 48 is a view showing a totally enclosed type main drive motor for vehicle in accordance with a seventeenth embodiment of the present invention.
Figure 49:
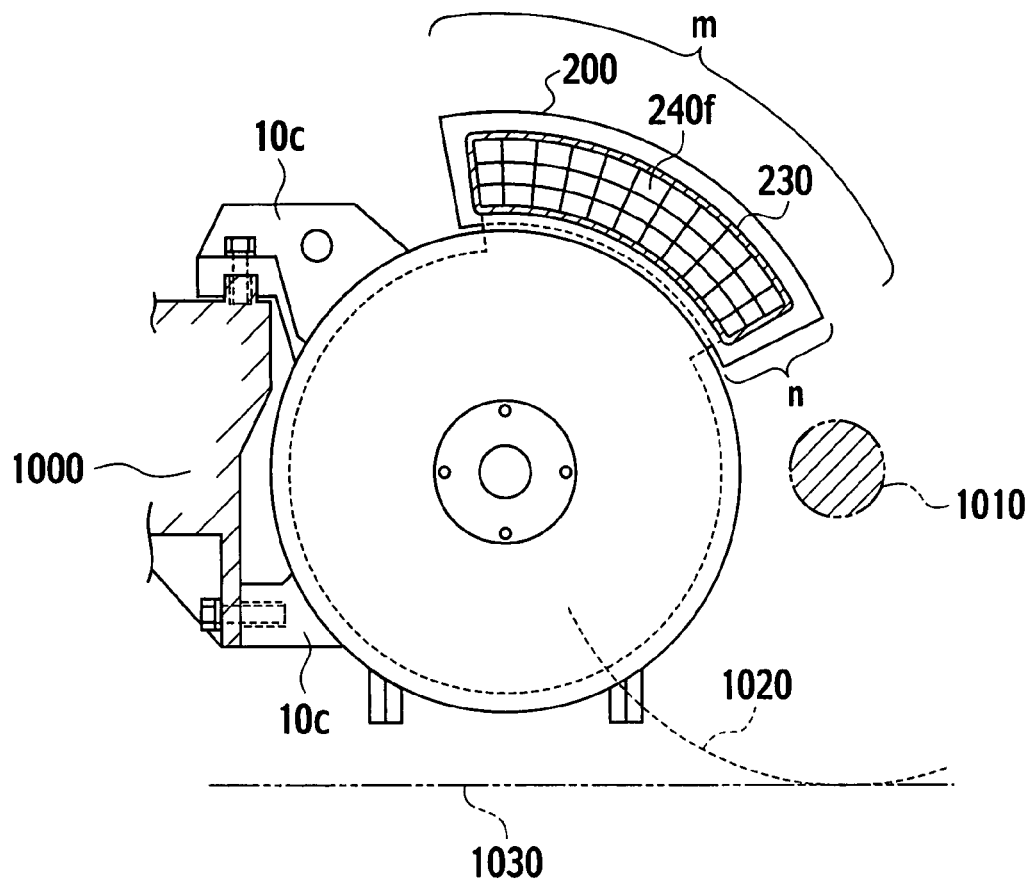
FIG. 49 is a view showing the totally enclosed type main drive motor for vehicle in accordance with the seventeenth embodiment of the present invention.

Next, a totally enclosed type main drive motor for vehicle in accordance with the seventeenth embodiment of the present invention will be described with reference to FIG. 48 as a longitudinal sectional view of the motor and FIG. 49 as a front sectional view of the motor.

In the constitution of this embodiment, the cooling air duct 230 is provided, in the cooling air duct 230, with the lattice-shaped body 240f that is obtained by dividing the above-mentioned lattice-shaped body into n pieces equally in the radial direction and m pieces equally in the circumferential direction so as to equalize respective areas of lattice windows to each other.

With this constitution, since the areas of respective lattice windows in the inside space 230a of the cooling air duct 230 are equal to each other, the wind currents in the lattice windows are uniformed. Therefore, as the cooling performance of the cooler for the circulating inside air is improved to allow the temperature rise of the motor to be held down, it is possible to promote the reduction in both size and weight of the motor and/or the increase of an output power of the motor.

18th. EMBODIMENT

Figure 50:
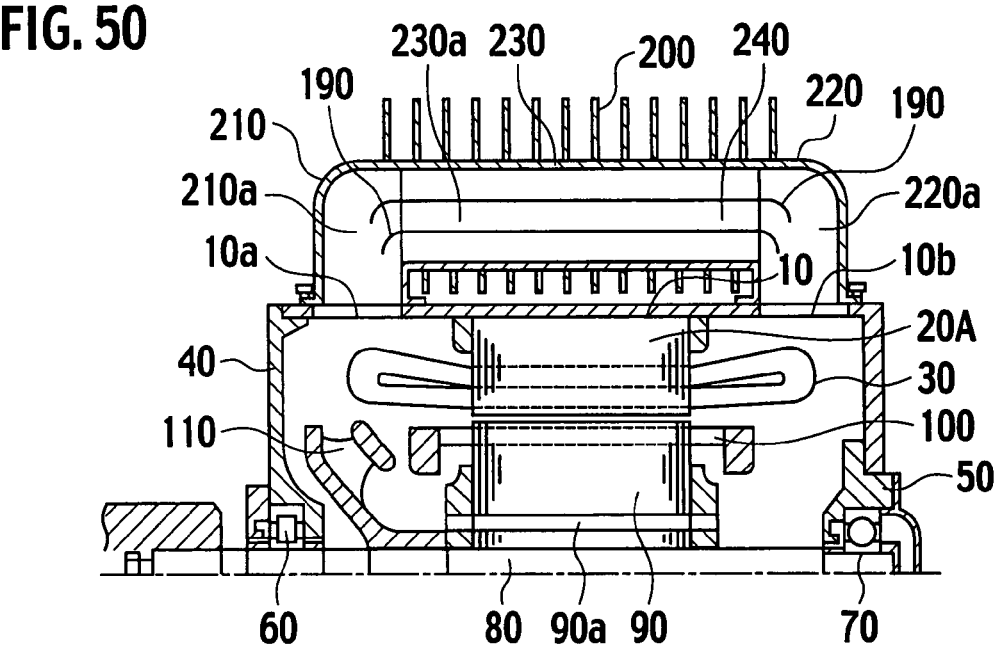
FIG. 50 is a view showing a totally enclosed type main drive motor for vehicle in accordance with an eighteenth embodiment of the present invention.
Figure 51:
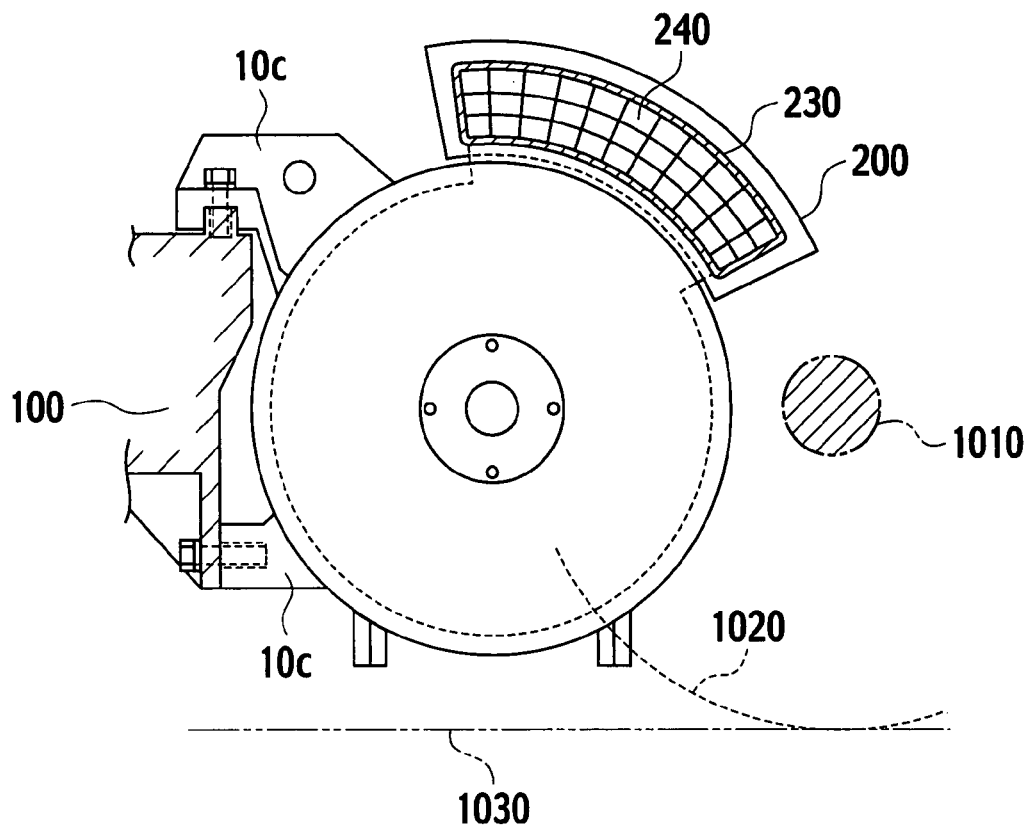
FIG. 51 is a view showing the totally enclosed type main drive motor for vehicle in accordance with the eighteenth embodiment of the present invention.

Next, a totally enclosed type main drive motor for vehicle in accordance with the eighteenth embodiment of the present invention will be described with reference to FIG. 50 as a longitudinal sectional view of the motor and FIG. 51 as a front sectional view of the motor.

In this embodiment, the lattice-shaped body 240, such as partition plates, is arranged in the inside space 230a of the cooling air duct 230 so as to form a window against a draft direction and additionally, the guide plates 190 having arc-shaped sections are arranged on both ends of the lattice-shaped body 240. Provided that, in view from a shaft center of the motor, the lattice in the cooling air duct 230 contains p-stage partition plates in the radial direction of the motor, (p−1) guide plates 240 would be arranged at the inlet/outlet of the lattice respectively.

With the constitution, as the provision of the guide plates 240 allows the airflow to be adjusted, it is possible to uniform respective airflows passing through all windows forming the lattice. Thus, as the cooling performance of the cooler for the circulating inside air is improved to allow the temperature rise of the motor to be held down, it is possible to promote the reduction in both size and weight of the motor and/or the increase of an output power of the motor.

19th. EMBODIMENT

Figure 52:
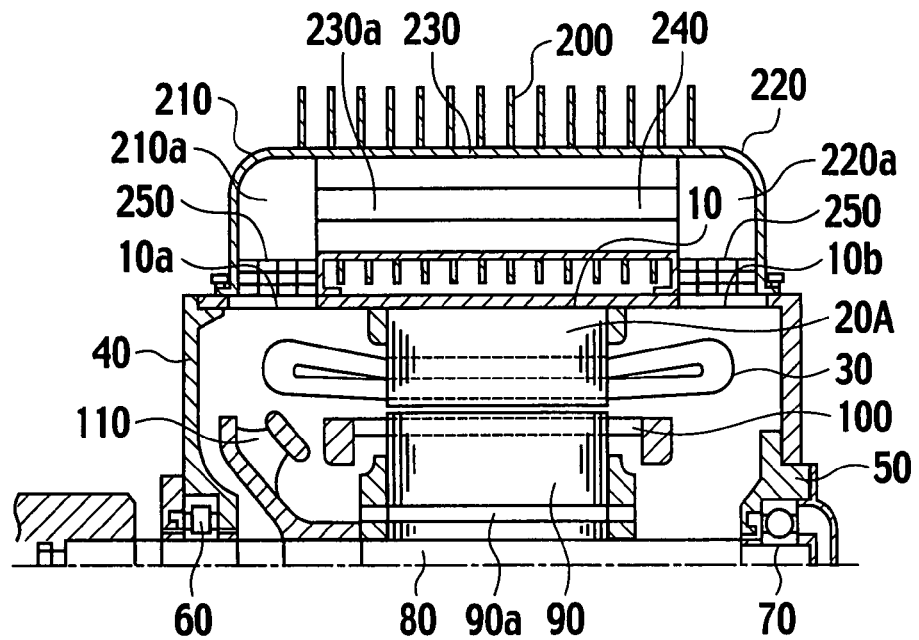
FIG. 52 is a view showing a totally enclosed type main drive motor for vehicle in accordance with a nineteenth embodiment of the present invention.
Figure 53:
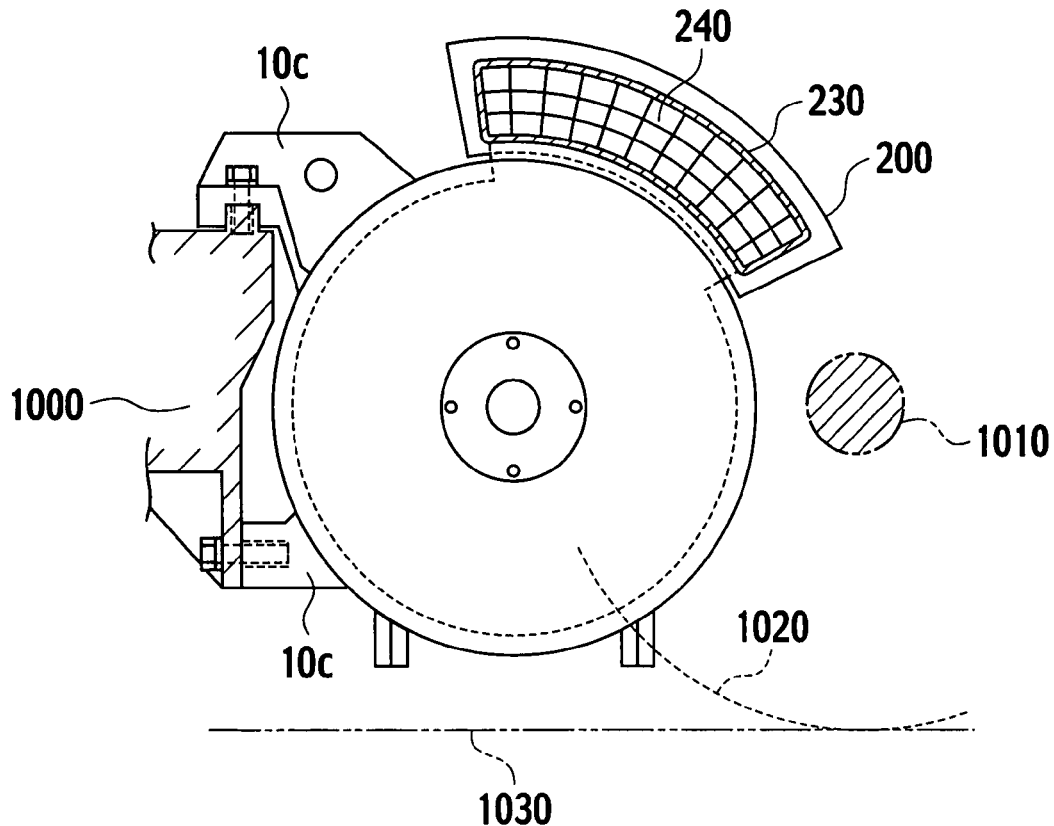
FIG. 53 is a view showing the totally enclosed type main drive motor for vehicle in accordance with the nineteenth embodiment of the present invention.

Next, a totally enclosed type main drive motor for vehicle in accordance with the nineteenth embodiment of the present invention will be described with reference to FIG. 52 as a longitudinal sectional view of the motor and FIG. 53 as a front sectional view of the motor.

In the constitution of the embodiment, rectifying lattices 250 are arranged in inside spaces 210a, 220a of the connective air ducts 210, 220, at the ventilation openings 10a, 10b in the stator frame 10.

With the constitution, it is possible to supply every lattice windows in the inside space 230a of the cooling air duct 230 with uniform airflows. Thus, as the cooling performance of the cooler for the circulating inside air is improved to allow the temperature rise of the motor to be held down, it is possible to promote the reduction in both size and weight of the motor and/or the increase of an output power of the motor.

20th. EMBODIMENT

Figure 54:
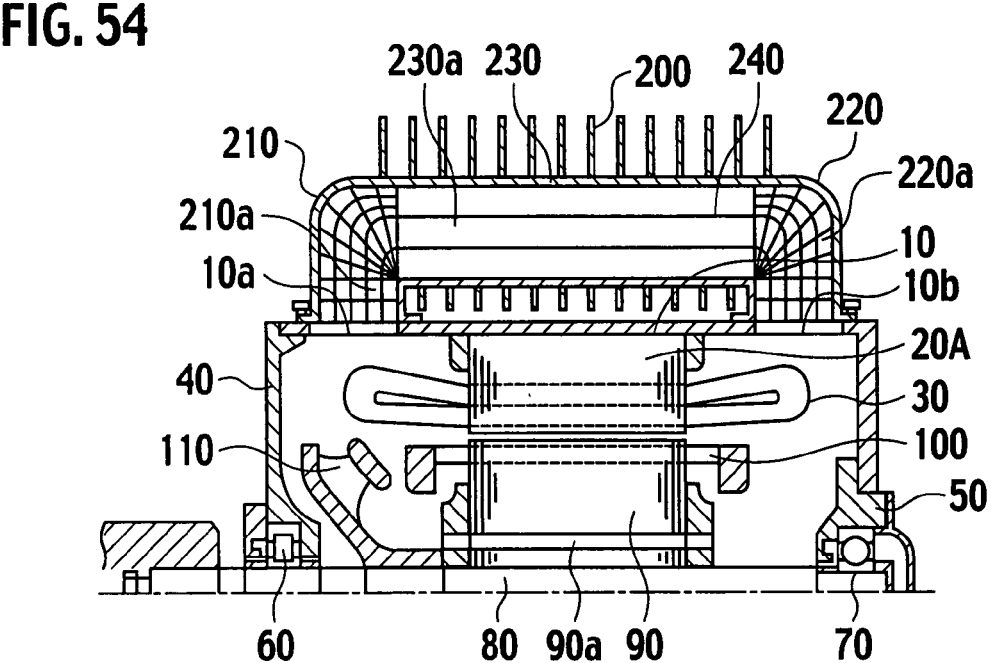
FIG. 54 is a view showing a totally enclosed type main drive motor for vehicle in accordance with a twentieth embodiment of the present invention.
Figure 55:
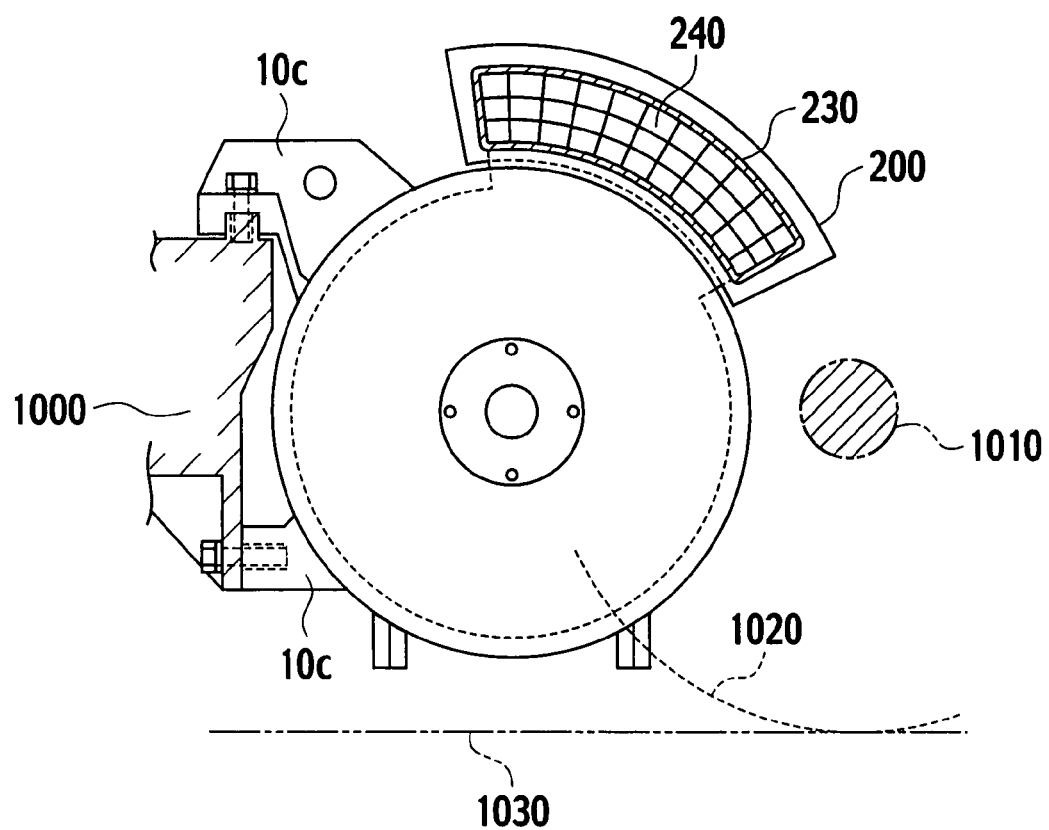
FIG. 55 is a view showing the totally enclosed type main drive motor for vehicle in accordance with the twentieth embodiment of the present invention.

Next, a totally enclosed type main drive motor for vehicle in accordance with the twentieth embodiment of the present invention will be described with reference to FIG. 54 as a longitudinal sectional view of the motor and FIG. 55 as a front sectional view of the motor.

In the constitution of the embodiment, any one of the lattice-shaped body, the honeycomb-shaped body, the corrugate-shaped body and the corrugated plates or their optional combinations are arranged, on the sides of the ventilation openings of the stator frame 10, in the inside spaces of the connective air ducts 210, 220 and also arranged in the cooling air duct 230, successively.

With the above constitution, the inside space 230a of the cooling air duct 230 is equalized with respect to each lattice window. Thus, as the cooling performance of the cooler for the circulating inside air is improved to allow the temperature rise of the motor to be held down, it is possible to promote the reduction in both size and weight of the motor and/or the increase of an output power of the motor.

21st. EMBODIMENT

Next, a totally enclosed type main drive motor for vehicle in accordance with the twenty-first embodiment of the present invention will be described with reference to FIG. 56 as a longitudinal sectional view of the motor and FIG. 57 as a front sectional view of the motor.

In the constitution of the embodiment, in view from a direction perpendicular to the motor shaft, a cooler 260 is constructed as follows. In the previously-mentioned embodiments, in view from the axial direction, the connective air ducts 210, 220 and the cooling air duct 230 are substantial-C shaped as a whole. While, in view from the direction perpendicular to the motor shaft, the connective air ducts 210, 220 and the cooling air duct 230 are substantially arc-shaped as a whole. Additionally, in view from the direction perpendicular to the motor shaft, the overall contours of the radiator fins 200 are partially shaped to be substantially circular.

The operation of the above-constructed totally enclosed type main drive motor for vehicle will be described below.

Figure 56:
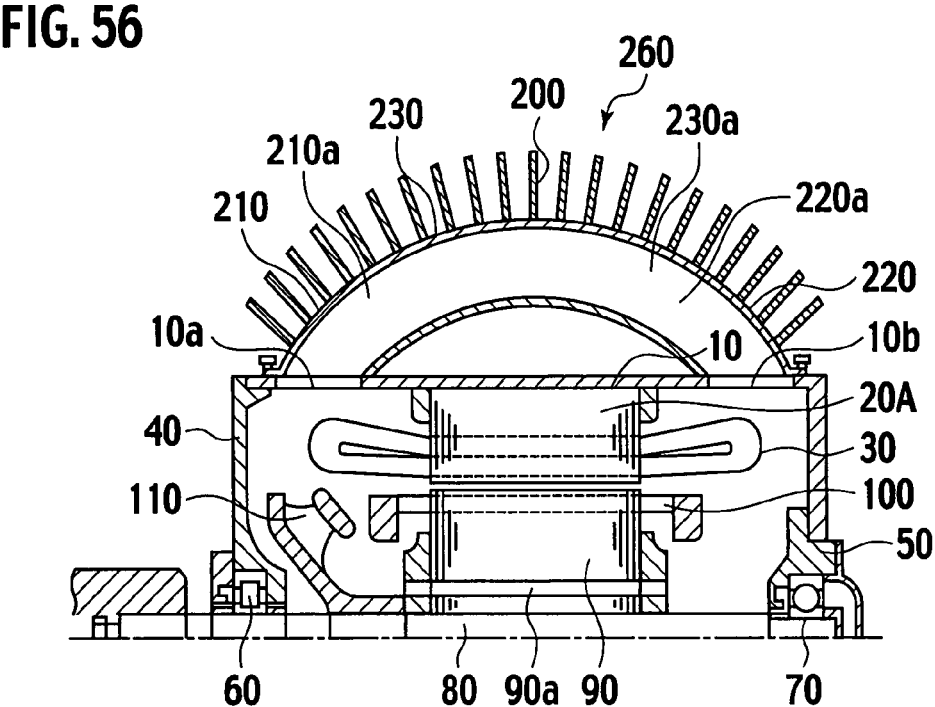
FIG. 56 is a view showing a totally enclosed type main drive motor for vehicle in accordance with a twenty-first embodiment of the present invention.
Figure 57:
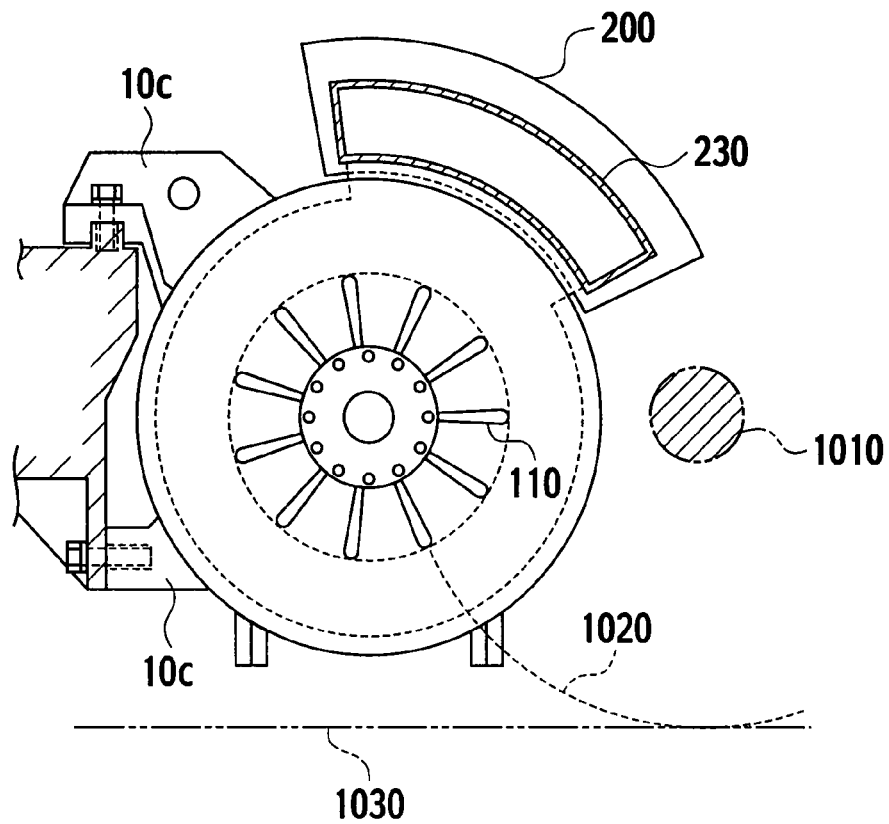
FIG. 57 is a view showing the totally enclosed type main drive motor for vehicle in accordance with the twenty-first embodiment of the present invention.

As shown in FIGS. 56 and 57, when the motor operates, in-motor air is blown up into an outer circumferential space of the circulating fan 110 in the radial direction due to the rotation of the circulating fan 110 and subsequently enters into the inside space 210a in the connective air duct 210 via the ventilation opening 10a. Thereafter, the air flows in the inside space 230a of the cooling air duct 230 and subsequently enters from the ventilation opening 10b into an in-motor space on the counter-driving side via the inside space 230a of the cooling air duct 230.

With the constitution of the cooler, since the loss of the inside airflow resistance due to the rotation of the circulating fan 110 is reduced in comparison with that of the right-angled pipe of the ninth embodiment, the radiator cooling efficiency is improved to release heat to the outside air. Thus, the cooling action of the cooler is improved furthermore.

Since the connective air ducts 210, 220 and the cooling air duct 230 are substantially arc-shaped as a whole, hot air is discharged from the inside-air circulating fan by centrifugal force to hit against the cooling air duct 230 with a wider area in comparison with the right-angled pipe of the ninth embodiment. Consequently, the radiator fins on the outer circumferential surface of the cooling air duct 230 are heated to allow an exhibition of effective action. Thus, as the cooling efficiency in radiation is improved to release heat to the outside air, it is possible to improve the cooling action furthermore.

In order to confirm the effect of the present invention, we carried out a temperature rise test for a test model. The temperature rise test was performed with respect to each rated speed of respective operating revolutions while using a sinusoidal power as the power source and additionally streaming with dummy traveling wind (2 m/s) around the main motor in order to simulate the effect during a train's traveling.

Figure 58:
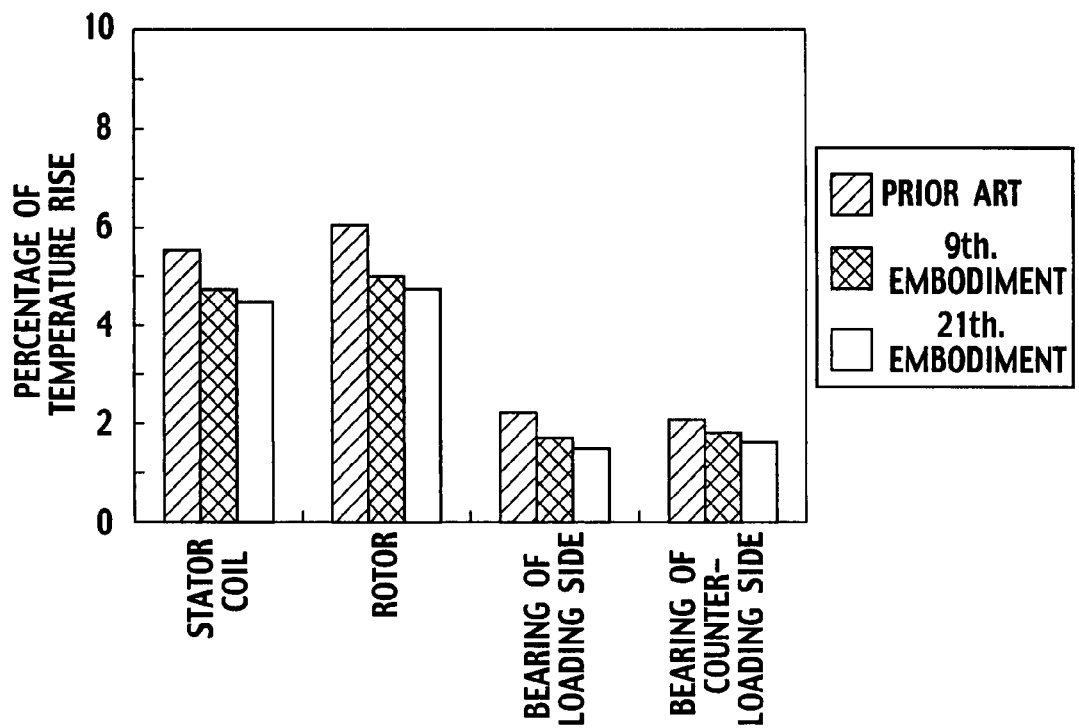
FIG. 58 is a graph showing a temperature reduction effect of the twenty-first embodiment of the present invention.

The test result is shown in FIG. 58. Scales in the vertical axis represent percentages of temperature rise, while respective points of measurement are shown on the horizontal axis.

From this result, the overall temperature reduction effect is confirmed in comparison with the conventional motor and the motor of the ninth embodiment. Particularly, the temperature reduction is enhanced in the rotor and the stator coil.

Since the connective air ducts 210, 220 and the cooling air duct 230 are substantially arc-shaped as a whole, the loss of flowing resistance is reduced in comparison with that of the right-angled pipe of the ninth embodiment. In the totally enclosed type main drive motor for vehicle of this embodiment, with the improvement in cooling performance, it is possible to promote the reduction in both size and weight of the motor or the increase of an output power of the motor. Additionally, since the cooler is formed with no rectangular corner but slow curves, it is possible to promote a reduction in the burden of cleaning/maintenance, saving the manufacturing cost.

22$^{nd}$. EMBODIMENT

Figure 59:
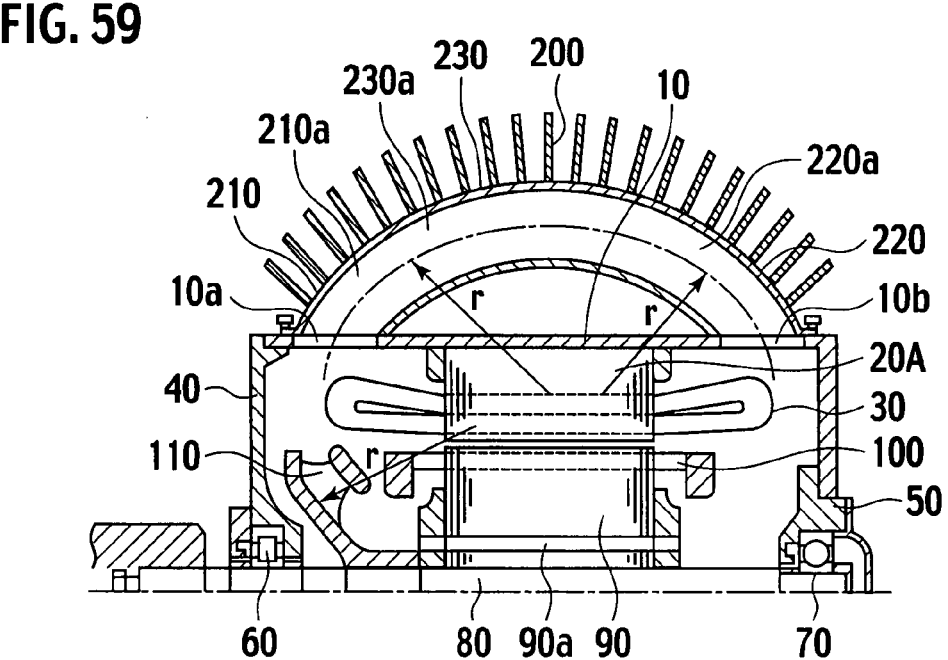
FIG. 59 is a view showing a totally enclosed type main drive motor for vehicle in accordance with a twenty-second embodiment of the present invention.
Figure 60:
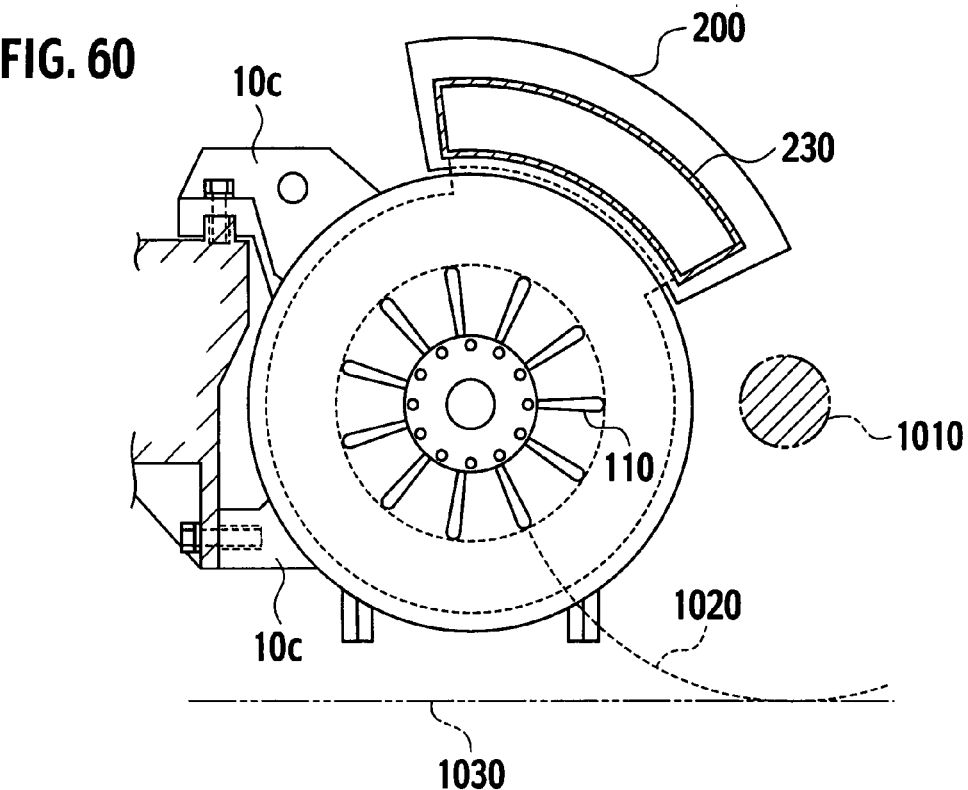
FIG. 60 is a view showing the totally enclosed type main drive motor for vehicle in accordance with the twenty-second embodiment of the present invention.

Next, a totally enclosed type main drive motor for vehicle in accordance with the twenty-second embodiment of the present invention will be described with reference to FIG. 59 as a longitudinal sectional view of the motor and FIG. 60 as a front sectional view of the motor.

In the constitution of the embodiment, the above "inside-air" circulating fan 110 has a main board formed with a curvature radius r, while the arc of the above conductive air ducts 210, 220 and the above cooling air duct 230 is substantially equal to r.

On the outer circumferential surfaces of the connective air duct 210 and cooling air duct 230, additionally, the radiator fins 200 are formed so that their overall contour is substantially and partially circular in view from the longitudinal direction to the shaft of the motor.

The operation of the above-constructed totally enclosed type main drive motor for vehicle will be described below.

The connective air ducts 210, 220 and the cooling air duct 230 are substantially arc-shaped and additionally, the main board of the "inside-air" circulating fan 110 is generally shaped with a curvature radius r, while the conductive air ducts and the cooling air duct are formed with a curvature radius r. Consequently, the loss of flowing resistance is further reduced in comparison with the curved pipe of the ninth embodiment. Thus, as the cooling efficiency in radiation is improved to release heat to the outside air, it is possible to improve the cooling action furthermore.

In order to confirm the effect of the present invention, we carried out a temperature rise test for a test model. The temperature rise test was performed with respect to each rated speed of respective operating revolutions while using a sinusoidal power as the power source and additionally streaming with dummy traveling wind (approx. 2 m/s) around the main motor in order to simulate the effect during a train's traveling.

Figure 61:
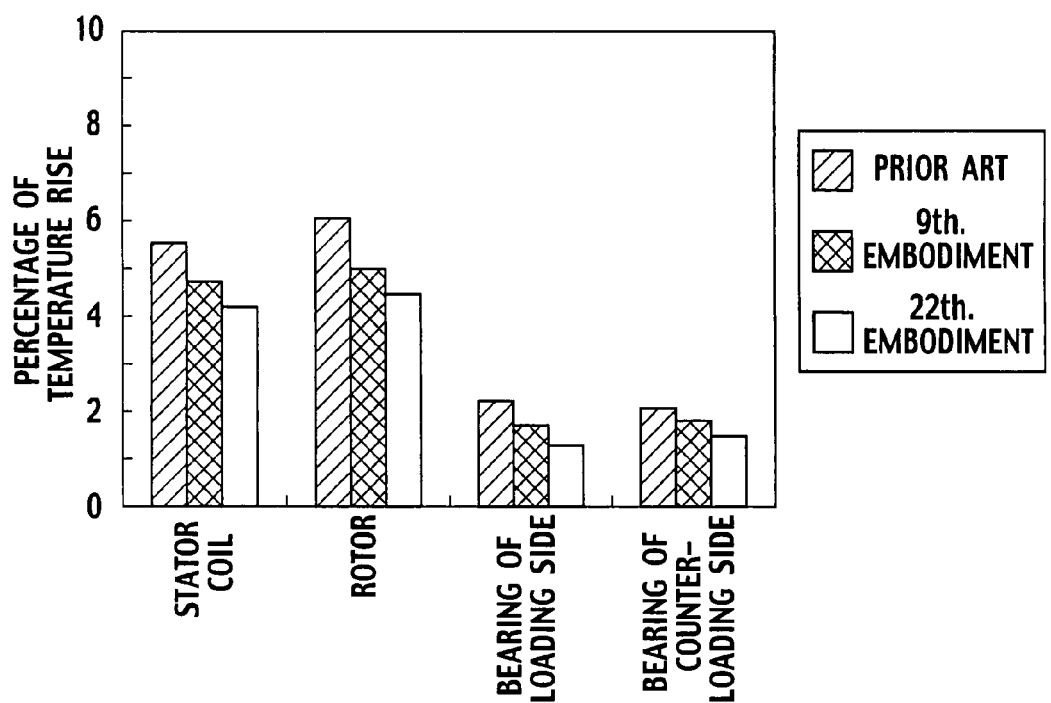
FIG. 61 is a graph showing a temperature reduction effect of the twenty-second embodiment of the present invention.

The test result is shown in FIG. 61. Scales in the vertical axis represent percentages of temperature rise, while respective points of measurement are shown on the horizontal axis. From this result, the overall temperature reduction effect is confirmed in comparison with the conventional motor and the motor of the ninth embodiment. Particularly, the temperature reduction is enhanced in the rotor and the stator coil.

In this way, by forming the connective air ducts 210, 220 and the cooling air duct 230 in a substantial arc on the base of the center of a curvature radius r of the main board of the inside-air circulating fan 110, the loss of flowing resistance is reduced due to the curved-pipe structure composed of the inlet connective air duct and the cooling air duct, in comparison with the curved pipe of the twenty-first embodiment, allowing a maximum airflow of the circulating fan 110. Consequently, the airflow characteristic is improved to allow the circulating inside air to be discharged into the outside air more effectively. Thus, it is possible to improve the cooling performance of the motor furthermore.

23$^{rd}$. EMBODIMENT

Figure 62:
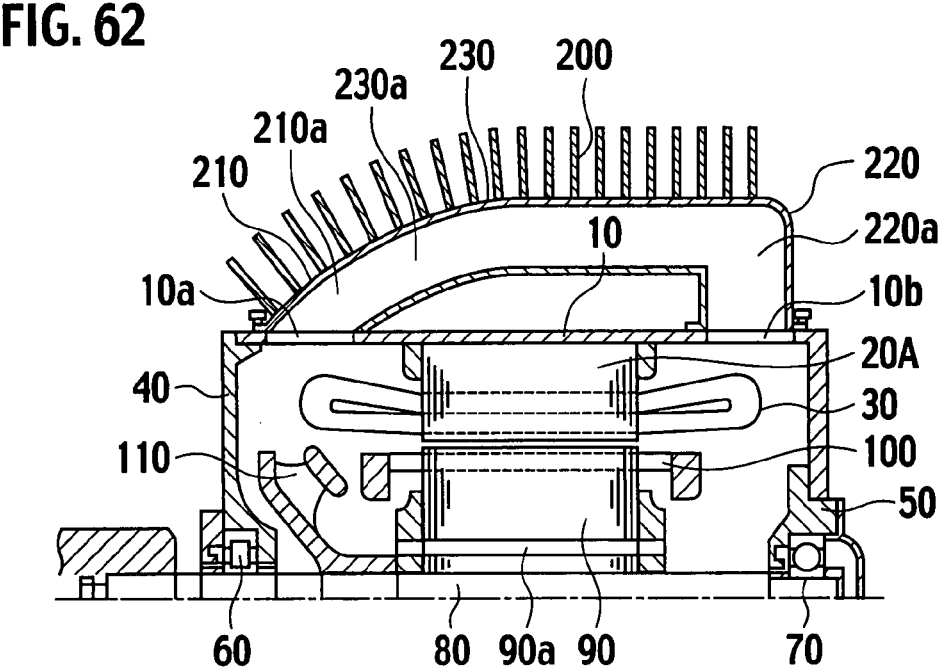
FIG. 62 is a view showing a totally enclosed type main drive motor for vehicle in accordance with a twenty-third embodiment of the present invention.
Figure 63:
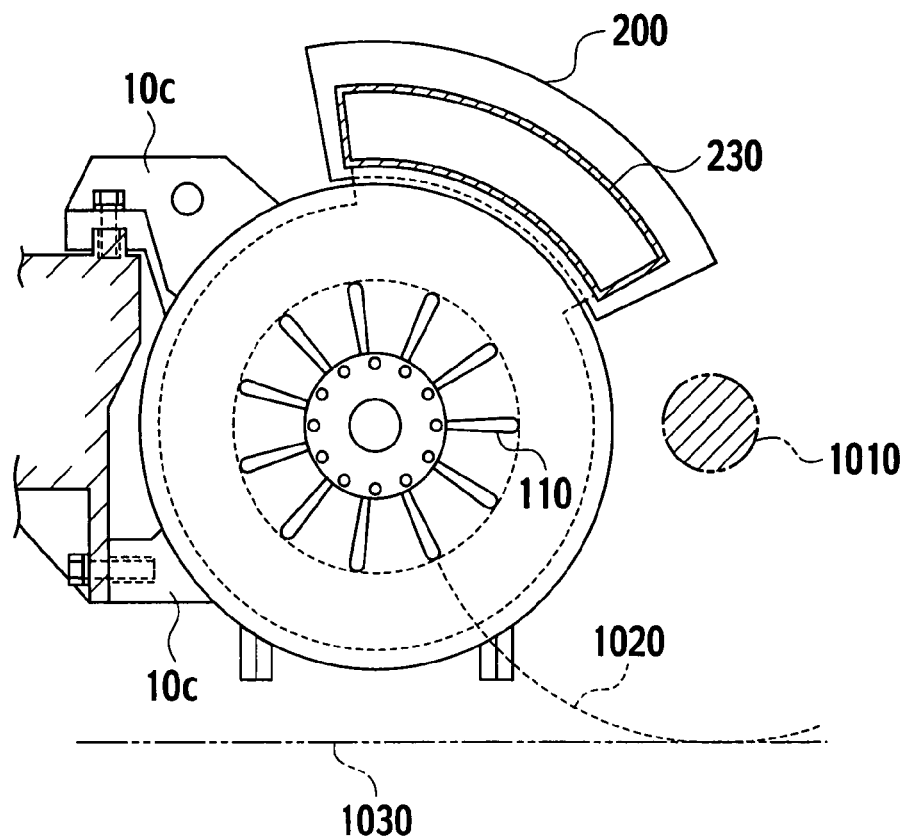
FIG. 63 is a view showing the totally enclosed type main drive motor for vehicle in accordance with the twenty-third embodiment of the present invention.

Next, a totally enclosed type main drive motor for vehicle in accordance with the twenty-third embodiment of the present invention will be described with reference to FIG. 62 as a longitudinal sectional view of the motor and FIG. 63 as a front sectional view of the motor.

In the constitution of the embodiment, the totally enclosed type main drive motor for vehicle has the connective air duct 210 and the cooling air duct 230 substantially arc-shaped in view from the perpendicular direction to the shaft of the motor.

With the constitution, owing to the connective air duct 210 and the cooling air duct 230 in the form of a substantial arc, the loss of flowing resistance is reduced in comparison with that of the twenty-first embodiment, allowing a maximum airflow of the circulating fan 110.

Consequently, the airflow characteristics is improved to allow the circulating inside air to be discharged into the outside air more effectively. Thus, it is possible to improve the cooling performance of the motor furthermore.

24$^{th}$. EMBODIMENT

Figure 64:
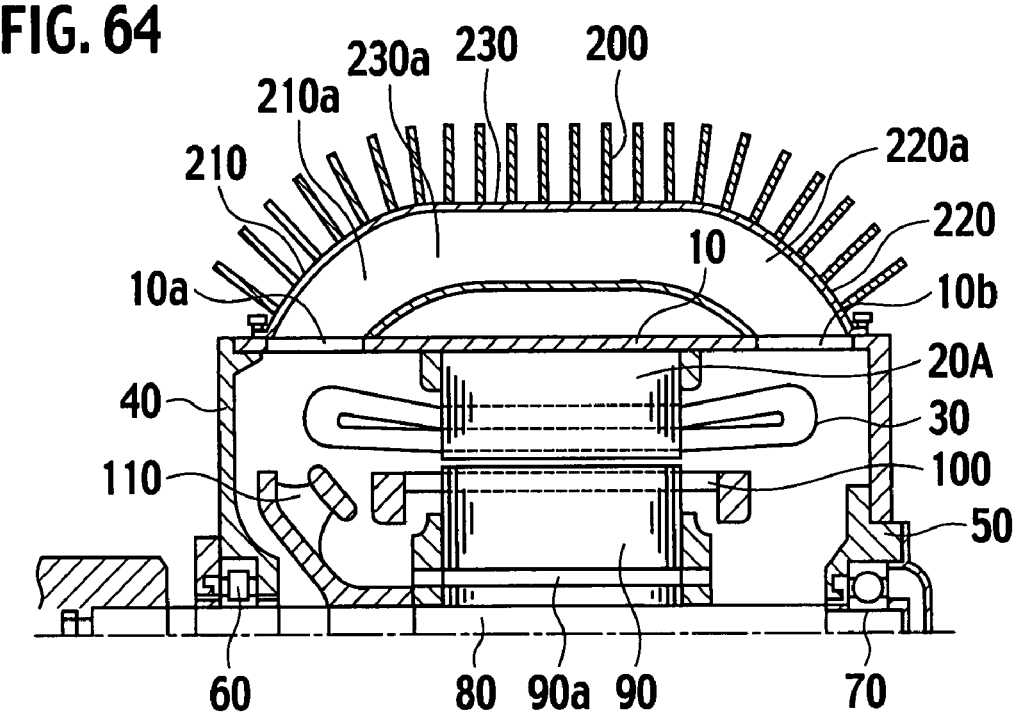
FIG. 64 is a view showing a totally enclosed type main drive motor for vehicle in accordance with a twenty-fourth embodiment of the present invention.
Figure 65:
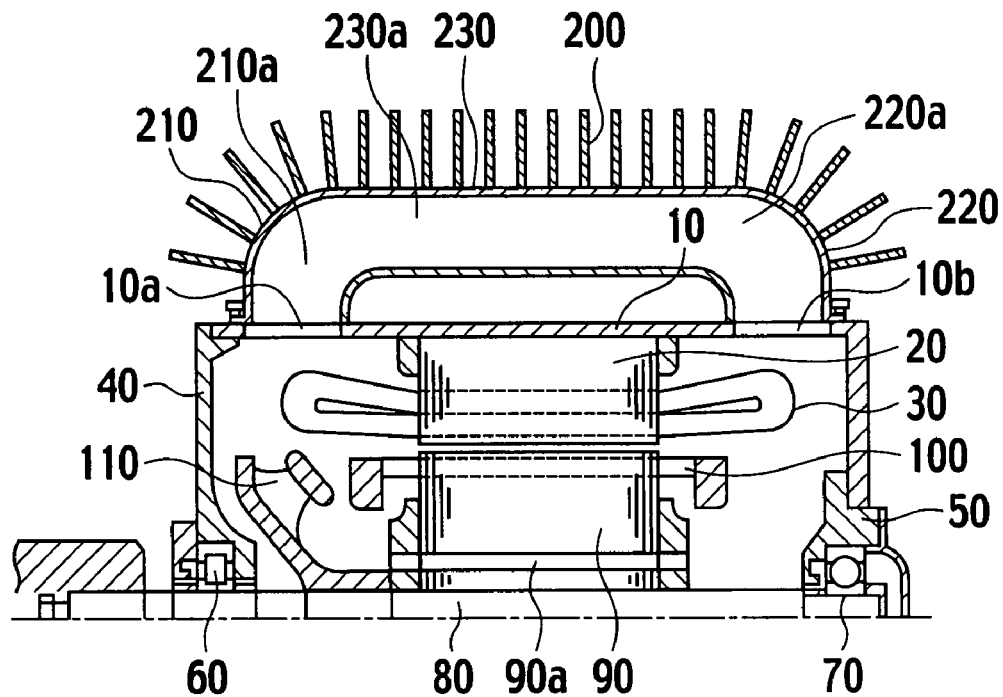
FIG. 65 is a view showing the totally enclosed type main drive motor for vehicle in accordance with the twenty-fourth embodiment of the present invention.

Next, a totally enclosed type main drive motor for vehicle in accordance with the twenty-fourth embodiment of the present invention will be described with reference to FIG. 64 as a longitudinal sectional view of the motor and FIG. 65 as a front sectional view of the motor.

In the constitution of the embodiment, the totally enclosed type main drive motor for vehicle has the connective air duct 210 and the cooling air duct 230 partially and substantially arc-shaped in view from the perpendicular direction to the shaft of the motor.

With the constitution, since the connective air duct 210 and the cooling air duct 230 are substantially arc-shaped in part, the loss of flowing resistance is reduced in comparison with that of the twenty-third embodiment, allowing a maximum airflow of the circulating fan 110. Consequently, the airflow characteristic is improved to allow the circulating inside air to be discharged into the outside air more effectively. Thus, it is possible to improve the cooling performance of the motor furthermore.

25$^{th}$. EMBODIMENT

Figure 66:
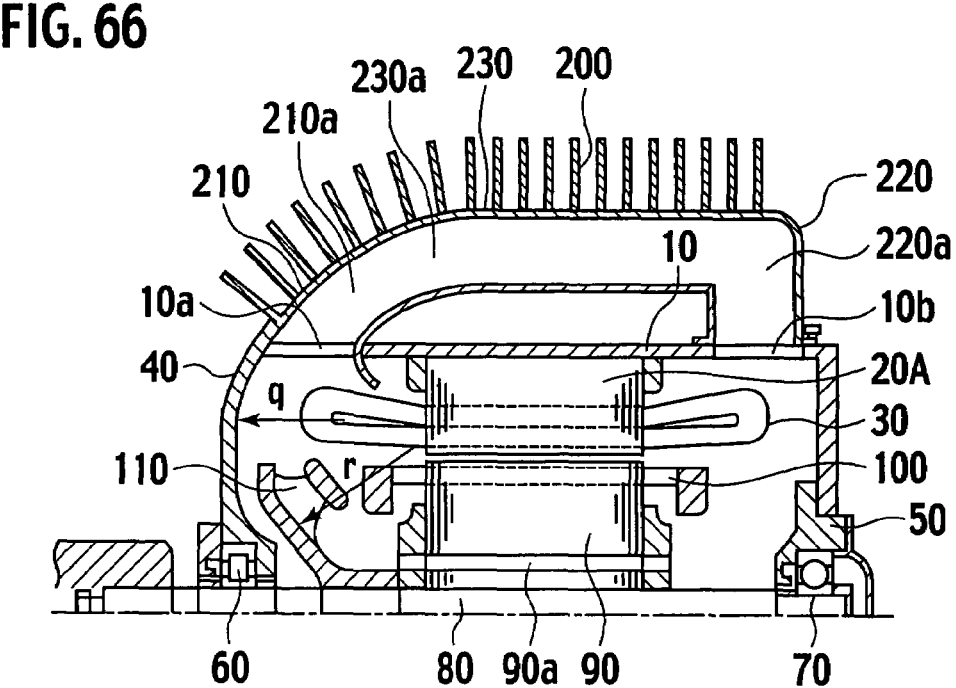
FIG. 66 is a view showing a totally enclosed type main drive motor for vehicle in accordance with a twenty-fifth embodiment of the present invention.
Figure 67:
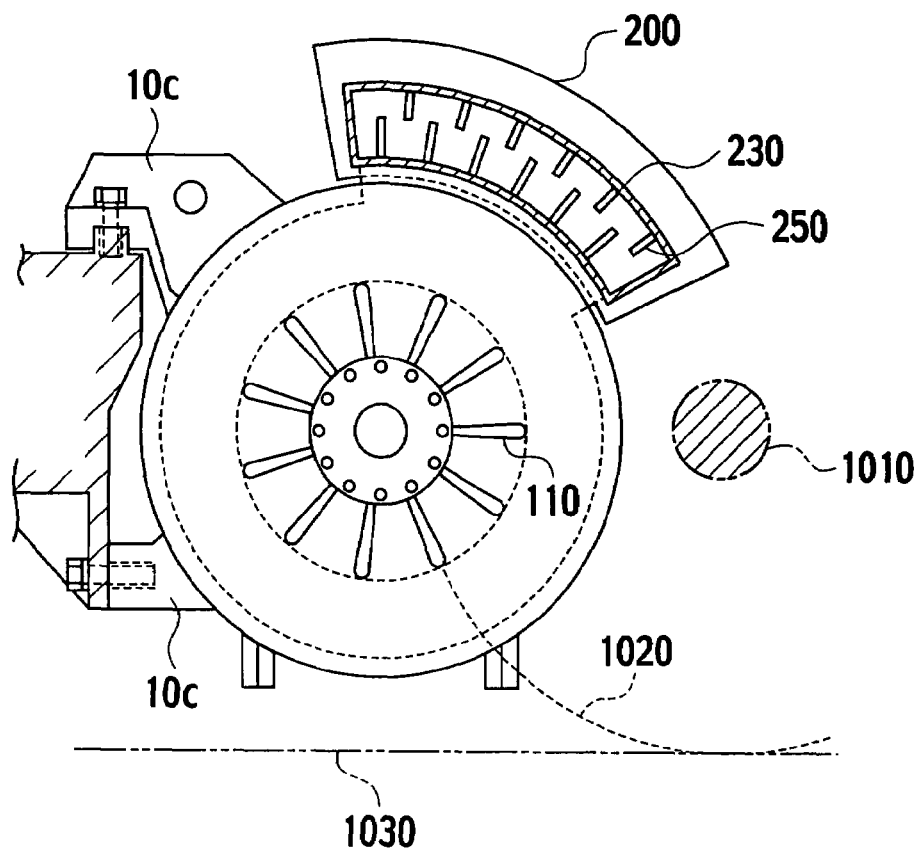
FIG. 67 is a view showing the totally enclosed type main drive motor for vehicle in accordance with the twenty-fifth embodiment of the present invention.

Next, a totally enclosed type main drive motor for vehicle in accordance with the twenty-fifth, embodiment of the present invention will be described with reference to FIG. 66 as a longitudinal sectional view of the motor and FIG. 67 as a front sectional view of the motor.

The totally enclosed type main drive motor for vehicle of this embodiment is constructed as follows. Assuming that the main board of the inside-air circulating fan 110 is formed with a general radius r, the bearing bracket 4 rotatably supporting the rotor shaft 80 on the side of the inside-air circulating fan has an inner wall formed with a general radius q which is 1.2 to 1.4 times as large as the general radius r of the main board of the inside-air circulating fan. Note that the cooling air duct 230 is provided, on its inner wall, with a plurality of rectifying lattices 250.

By forming the inner wall of the bearing bracket with the curvature radius r, the loss of flowing resistance is reduced in comparison with the twenty-fourth embodiment, allowing a maximum airflow of the circulating fan 110. Consequently, the airflow characteristic is improved to allow the circulating inside air to be discharged into the outside air more effectively. Thus, it is possible to improve the cooling performance of the motor furthermore.

26th. EMBODIMENT

Figure 68:
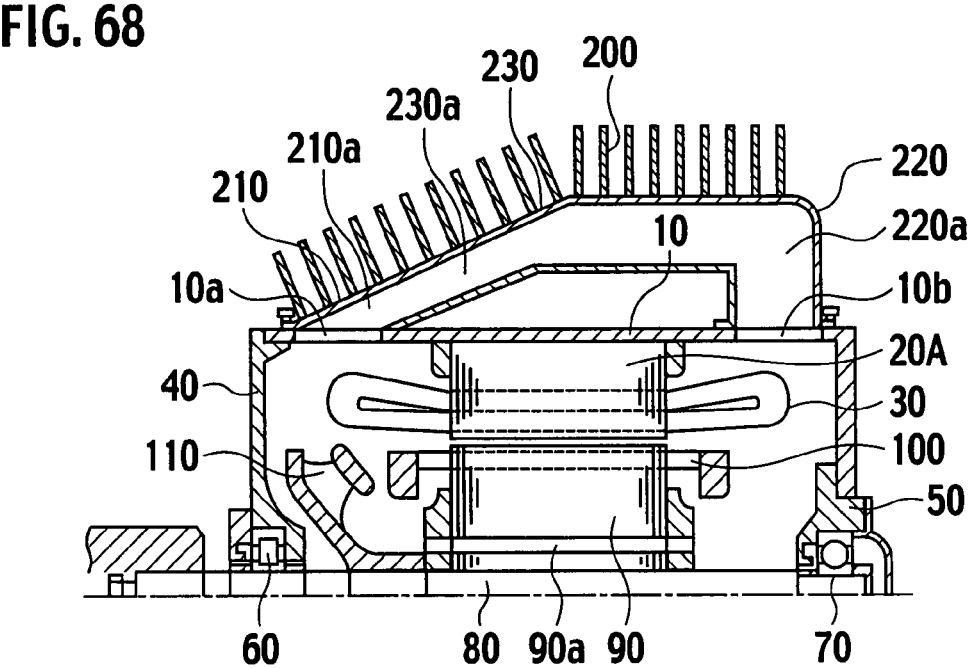
FIG. 68 is a view showing a totally enclosed type main drive motor for vehicle in accordance with a twenty-sixth embodiment of the present invention.
Figure 69:
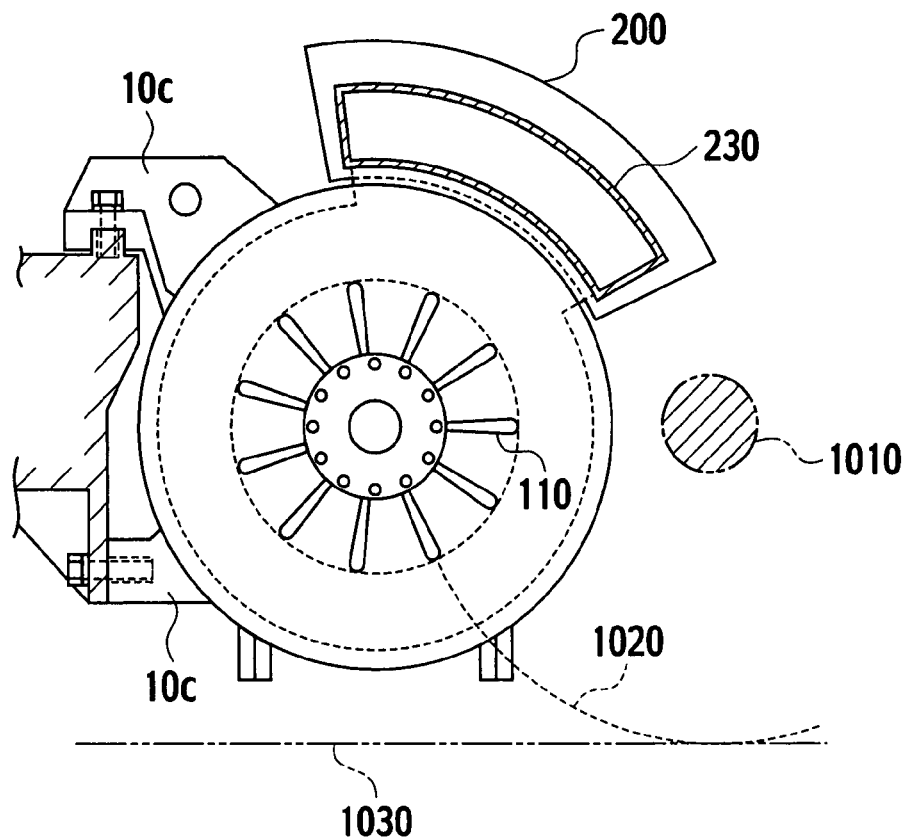
FIG. 69 is a view showing the totally enclosed type main drive motor for vehicle in accordance with the twenty-sixth embodiment of the present invention.

Next, a totally enclosed type main drive motor for vehicle in accordance with the twenty-sixth embodiment of the present invention will be described with reference to FIG. 68 as a longitudinal sectional view of the motor and FIG. 69. In the totally enclosed type main drive motor for vehicle of the embodiment, the contour consisting of the connective air duct 210 and the cooling air duct 230 is slanted in straight succession in view from a direction perpendicular to the shaft of the motor.

With the constitution, since the loss of flowing resistance of the inside air by the rotation of the circulating fan 110 is reduced in comparison with that of the ninth embodiment, heat is released to the outside air with the improved cooling efficiency in heat radiation. Thus, the cooling action of the motor can be improved furthermore.

27th. EMBODIMENT

Figure 70:
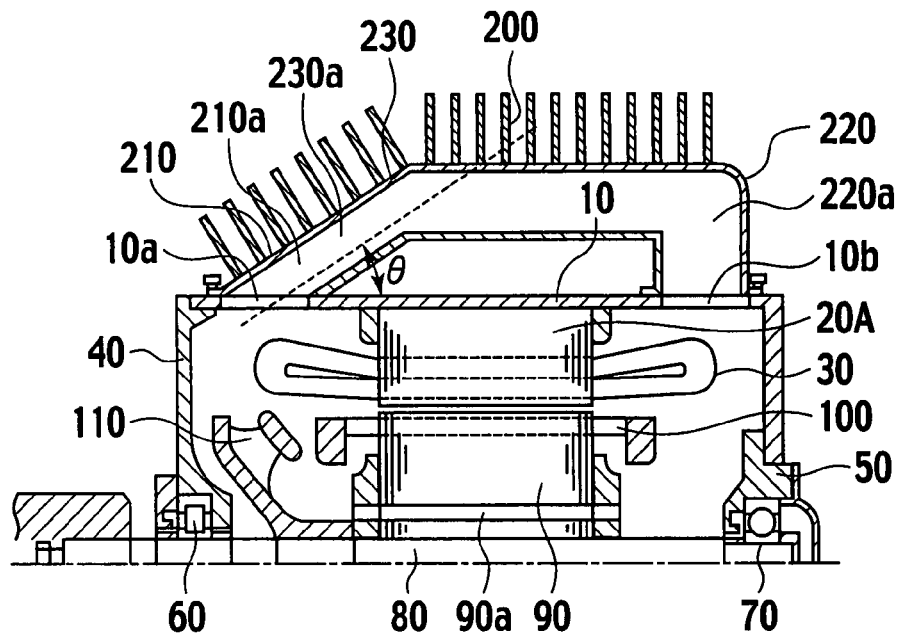
FIG. 70 is a view showing a totally enclosed type main drive motor for vehicle in accordance with a twenty-seventh embodiment of the present invention.
Figure 71:
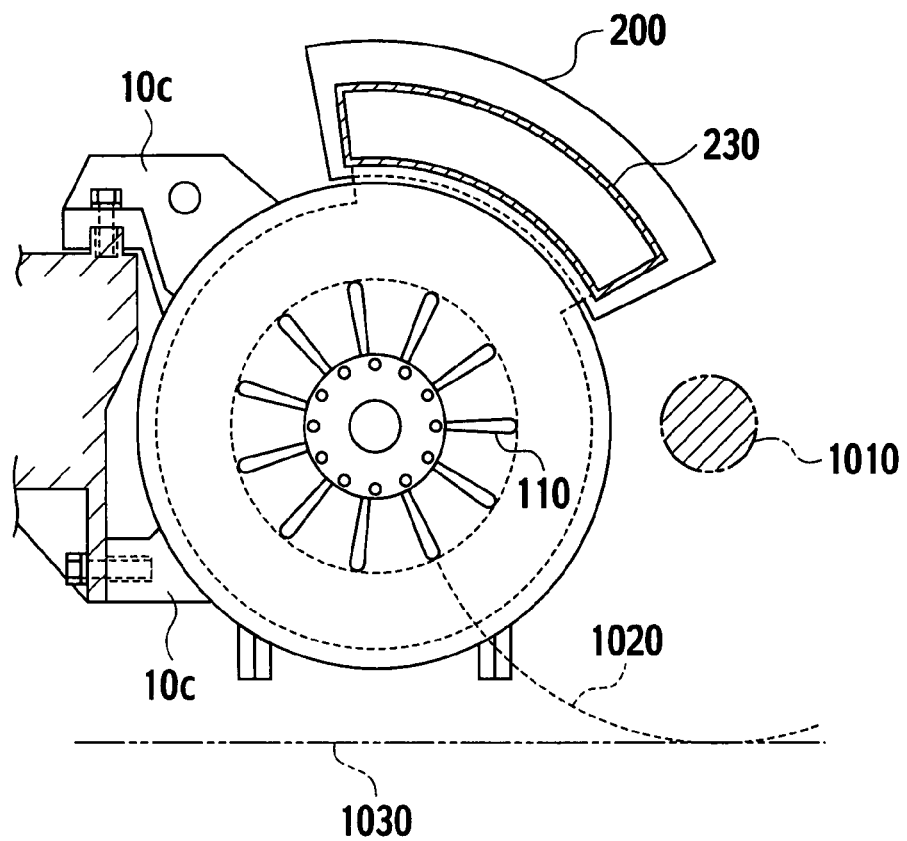
FIG. 71 is a view showing the totally enclosed type main drive motor for vehicle in accordance with the twenty-seventh embodiment of the present invention.

Next, a totally enclosed type main drive motor for vehicle in accordance with the twenty-seventh embodiment of the present invention will be described with reference to FIG. 70 as a longitudinal sectional view of the motor and FIGS. 71 and 72.

The totally enclosed type main drive motor for vehicle of this embodiment is obtained by establishing an angle of gradient of the straightly-slanted contour of the above-mentioned twenty-sixth embodiment within the range from approx. 30° to 60°, based on a reference axis of the rotor shaft 80.

Figure 72:
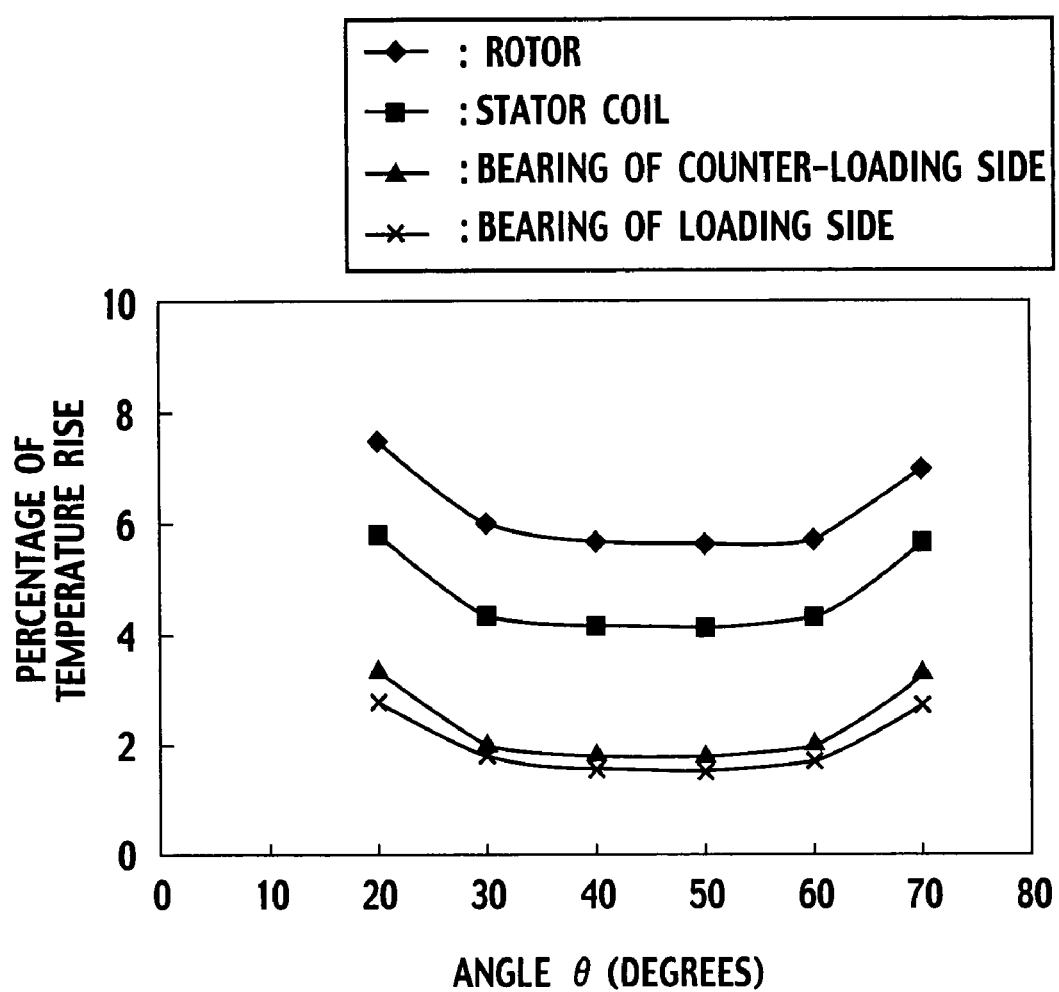
FIG. 72 is a view explaining a cooling effect in case that a cooler of the twenty-seventh embodiment of the present invention is formed by a slanting tube.

FIG. 72 shows the result of a test specifying angles of an oblique pipe as parameters.

From this result, it will be understood that, owing to the formation of the cooler 240 by an oblique pipe, the loss of flowing resistance of the inside air by the rotation of the circulating fan 110 is reduced in comparison with the right-angled pipe in the ninth embodiment and further, heat is released to the outside air with the improved cooling efficiency in heat radiation. Thus, the cooling action of the motor can be improved furthermore. In these angles of gradient, when the angle θ is established within the range from approx. 30° to 60°, the cooling action is proved to be more effective.

The present invention is not limited to the above-mentioned embodiments and therefore, the invention may be provided with all of the following constitutions.

1) The arrangement where the above connective air ducts and the above cooling air duct are substantial-C shaped in view from the axial direction of the motor may be combined with the arrangement where the above radiator fins are substantially fan-shaped in view from the axial direction.

2) The arrangement where the above connective air ducts and the above cooling air duct are substantially arc-shaped in view from the perpendicular direction to the shaft of the motor may be combined with the arrangement where the above radiator fins are substantially fan-shaped.

3) There may be optionally combined: in view from the axial direction of the motor, the arrangement where the radiator fins as a whole are substantially rectangular shaped or substantially circular shaped in part; the arrangement where the above connective air ducts and the above cooling air duct are substantial-C shaped; and the arrangement where the above connective air ducts and the above cooling air duct are substantially arc-shaped in view from the perpendicular direction to the shaft of the motor.

4) There may be optionally combined: in view from the axial direction of the motor, the arrangement where at least one of the above connective air ducts is substantially arc-shaped; the arrangement where the radiator fins are substantially fan-shaped; and the arrangement where the outer profile of the radiator fins as a whole are substantially rectangular shaped or substantially circular shaped in part.

5) There may be optionally combined: in view from the axial direction of the motor, the arrangement where either the above connective air ducts or the connective air ducts and the cooling air duct are taper-shaped straightly; the arrangement where the radiator fins are substantially fan-shaped; and the arrangement where the outer profile of the radiator fins as a whole are substantially rectangular shaped or substantially circular shaped in part.

6) Although we heretofore illustrate the embodiments by citing the example of the cooling air duct 230 having a rectangular-shaped section, the cooling air duct 230 is not limited to this and therefore, it may be provided with any one of elliptical, oval and modified-polygonal sections or a combination of these profiles.

7) As for the quantities of the connective air duct and the cooling air duct, two or three ducts may be provided besides the provision of a single duct, respectively.

8) The radiator fins 200 to be formed on the outer circumferential surface of the cooling air duct 230 may be arranged on a part of the circumference of the cooling air duct 230 without being limited to the formation throughout the whole circumference only.

9) Without being limited to the profiles shown in the embodiments, the radiator fins 200 may be shaped to have other profiles.

Additionally, the present invention in execution phases may be modified to various forms within the scope of contents of the invention. Further, the embodiments of the invention may be combined with each other for its execution appropriately as possible. In such a case, combined effects would be obtained. Additionally, as the above-mentioned embodiments contain the inventions in various phases, a variety of inventions could be extracted by an appropriate combination among a plurality of disclosed constituents. For instance, if an invention is extracted by deleting some constituents from all constituents shown in the embodiment, the deleted constituents have to be appropriately compensated at the stage of embodying the so-extracted invention, by common techniques known in the art.

INDUSTRIAL APPLICABILITY

As the totally enclosed type main drive motor for vehicle of the present invention is capable of leading the traveling wind, which has not passed through the cooler conventionally, to the cooler owing to the provision of the traveling-wind guiding means for collecting the traveling wind flowing around the outer casing frame to the cooler, the cooling performance is improved to promote the longer lasting operation.

According to the present invention, since the temperature rise of respective parts in the motor is suppressed by the improvement in the cooling performance of the cooler for circulating inside air, it is possible to provide a totally enclosed type main drive motor for vehicle, which is capable of promoting the reduction in both size and weight of the motor or the increasing of its capacity (output power) and simultaneously promoting the laborsaving in maintenance of the cooler.

What is claimed is:

1. A totally enclosed type main drive motor for a vehicle, comprising:
   a cylindrical outer casing frame attached to the vehicle so that a central axis of the outer casing frame extends horizontally and intersects with a vehicle's traveling direction at right angles;
   a stator core arranged on an inner circumference of the outer casing frame;
   a bracket having a bearing built-in, the bearing being arranged on one end of the outer casing frame;
   a housing having a bearing built-in, the bearing being arranged on the other end of the outer casing frame;
   a rotor shaft having its both ends supported by the bearing of the bracket and the bearing of the housing;
   a rotor core arranged in a substantially central part of the rotor shaft in a longitudinal direction thereof;
   openings formed in both axial ends of a peripheral wall of the outer casing frame, respectively;
   a pair of connective air ducts arranged outside the peripheral wall so as to communicate with the openings;
   a ventilation pipe connecting the connective air ducts with each other;
   a cooler containing the ventilation pipe and also releasing heat of air flowing in the ventilation pipe to outside air;
   a fan arranged on one end of the rotor shaft to allow air in the outer casing frame to flow into the cooler in circulation thereby cooling the air; and
   traveling-wind guiding means for collecting traveling wind flowing around the outer casing frame to the cooler, the traveling-wind guiding means comprising guide plates arranged above and below the cooler horizontally;
   wherein the upper guide plate has an end formed so as to project ahead of the cooler in the vehicle's traveling direction, and
   the end is bent at an angle within a range from 10° to 45° upwardly to the vehicle's traveling direction.

2. A totally enclosed type main drive motor for a vehicle, comprising:
   a cylindrical outer casing frame attached to the vehicle so that a central axis of the outer casing frame extends horizontally and intersects with a vehicle's traveling direction at right angles;
   a stator core arranged on an inner circumference of the outer casing frame;
   a bracket having a bearing built-in, the bearing being arranged on one end of the outer casing frame;
   a housing having a bearing built-in, the bearing being arranged on the other end of the outer casing frame;
   a rotor shaft having its both ends supported by the bearing of the bracket and the bearing of the housing;
   a rotor core arranged in a substantially central part of the rotor shaft in a longitudinal direction thereof;
   openings formed in both axial ends of a peripheral wall of the outer casing frame, respectively;
   a pair of connective air ducts arranged outside the peripheral wall so as to communicate with the openings;
   a ventilation pipe connecting the connective air ducts with each other;
   a cooler containing the ventilation pipe and also releasing heat of air flowing in the ventilation pipe to outside air;
   a fan arranged on one end of the rotor shaft to allow air in the outer casing frame to flow into the cooler in circulation thereby cooling the air; and
   traveling-wind guiding means for collecting traveling wind flowing around the outer casing frame to the cooler, the traveling-wind guiding means comprising guide plates arranged above and below the cooler horizontally;
   wherein the lower guide plate has an end formed so as to project ahead of the cooler in the vehicle's traveling direction, and
   the end is bent at an angle within a range from 10° to 60° downwardly to the vehicle's traveling direction.

3. A totally enclosed type main drive motor for a vehicle, comprising:
   a cylindrical outer casing frame attached to the vehicle so that a central axis of the outer casing frame extends horizontally and intersects with a vehicle's traveling direction at right angles;
   a stator core arranged on an inner circumference of the outer casing frame;
   a bracket having a bearing built-in, the bearing being arranged on one end of the outer casing frame;
   a housing having a bearing built-in, the bearing being arranged on the other end of the outer casing frame;
   a rotor shaft having its both ends supported by the bearing of the bracket and the bearing of the housing;
   a rotor core arranged in a substantially central part of the rotor shaft in a longitudinal direction thereof;
   openings formed in both axial ends of a peripheral wall of the outer casing frame, respectively;
   a pair of connective air ducts arranged outside the peripheral wall so as to communicate with the openings;
   a ventilation pipe connecting the connective air ducts with each other;
   a cooler containing the ventilation pipe and also releasing heat of air flowing in the ventilation pipe to outside air;
   a fan arranged on one end of the rotor shaft to allow air in the outer casing frame to flow into the cooler in circulation thereby cooling the air; and
   traveling-wind guiding means for collecting traveling wind flowing around the outer casing frame to the cooler, the traveling-wind guiding means comprising guide plates arranged above and below the cooler horizontally;
   wherein the guide plates are arranged ahead and rearward of the cooler in the vehicle's traveling direction, and
   the front guide plate is formed so that its width increases toward its front side continuously, while the rear guide plate is formed so that its width increases toward its rear side continuously, and both lateral edges of the front guide plate and both lateral edges of the rear guide plate are slanted at an angle within a range from 10° to 60° to the vehicle's traveling direction.

4. The totally enclosed type main drive motor for the vehicle of claim 1, wherein
   the guide plates have trapezoidal ends formed so as to project ahead of the cooler in the vehicle's traveling direction and increase toward their front sides continuously.

5. The totally enclosed type main drive motor for the vehicle of claim 1, wherein
   the guide plates have fan-shaped ends formed so as to project ahead of the cooler in the vehicle's traveling direction and increase toward their front sides continuously.

6. The totally enclosed type main drive motor for the vehicle of claim 1, wherein
   the outer casing frame has an upper attachment seat formed so as to project from an upper part of a peripheral wall of the outer casing frame toward a rear side in the vehicle's traveling direction, and the upper guide plate is formed so as to extend up to the upper attachment seat.

7. The totally enclosed type main drive motor for the vehicle of claim 1, wherein
the pair of connective air ducts have mutually-opposing inside surfaces arc-shaped in cross sections so as to project in a direction to approach each other, the inside surfaces constituting the traveling-wind guiding means.

8. The totally enclosed type main drive motor for the vehicle of claim 7, wherein
the outer casing frame has an upper attachment seat formed so as to project from an upper part of a peripheral wall of the outer casing frame toward a rear side in the vehicle's traveling direction, and
the pair of connective air ducts are formed so that the inside surfaces extend up to the upper attachment seat.

9. The totally enclosed type main drive motor for the vehicle of claim 7 or 8, further comprising
guide plates which are arranged above and below the cooler horizontally, for collecting traveling wind flowing around the outer casing frame to the cooler.

* * * * *